(12) United States Patent
Ng et al.

(10) Patent No.: US 11,483,542 B2
(45) Date of Patent: Oct. 25, 2022

(54) PRECISION MULTI-VIEW DISPLAY

(71) Applicant: Misapplied Sciences, Inc., Redmond, WA (US)

(72) Inventors: Albert Han Ng, Redmond, WA (US); Paul Henry Dietz, Redmond, WA (US); William Jerry Duncan, Seattle, WA (US); Matthew Steele Lathrop, Kirkland, WA (US); David Steven Thompson, Redmond, WA (US)

(73) Assignee: Misapplied Sciences, Inc., Pasadena, CA (US)

( * ) Notice: Subject to any disclaimer, the term of this patent is extended or adjusted under 35 U.S.C. 154(b) by 0 days.

(21) Appl. No.: 16/945,705

(22) Filed: Jul. 31, 2020

(65) Prior Publication Data

US 2020/0366885 A1 Nov. 19, 2020

Related U.S. Application Data

(62) Division of application No. 15/809,147, filed on Nov. 10, 2017, now Pat. No. 10,778,962.

(51) Int. Cl.
*H04N 13/32* (2018.01)
*H04N 13/327* (2018.01)
(Continued)

(52) U.S. Cl.
CPC ........... *H04N 13/327* (2018.05); *G02B 30/27* (2020.01); *G06F 3/04847* (2013.01);
(Continued)

(58) Field of Classification Search
CPC .. H04N 13/327; H04N 13/307; H04N 13/305; H04N 13/398; H04N 13/324;
(Continued)

(56) References Cited

U.S. PATENT DOCUMENTS

| 5,855,425 A | 1/1999 | Hamagishi |
| 5,949,581 A | 9/1999 | Kurtenbach et al. |

(Continued)

FOREIGN PATENT DOCUMENTS

| EP | 2 685 735 A1 | 1/2014 |
| JP | 2002-34057 A | 1/2002 |

(Continued)

OTHER PUBLICATIONS

Japanese Office Action, dated Sep. 15, 2020, for Japanese Application No. 2019-547401, 13 pages, (with English machine translation).

(Continued)

*Primary Examiner* — Girumsew Wendmagegn
(74) *Attorney, Agent, or Firm* — Seed IP Law Group LLP

(57) ABSTRACT

A precision multi-view (MV) display system can accurately and simultaneously display different content to different viewers over a wide field of view. The MV display system may include features that enable individual MV display devices to be easily and efficiently tiled to form a larger MV display. A graphical interface enables a user to graphically specify viewing zones and associate content that will be visible in those zones in a simple manner. A calibration procedure enables the specification of content at precise viewing locations.

20 Claims, 36 Drawing Sheets

(51) Int. Cl.
- *G06F 3/04847* (2022.01)
- *H04N 13/305* (2018.01)
- *H04N 13/398* (2018.01)
- *H04N 13/307* (2018.01)
- *G02B 30/27* (2020.01)
- *H04N 13/324* (2018.01)

(52) U.S. Cl.
CPC ......... *H04N 13/305* (2018.05); *H04N 13/307* (2018.05); *H04N 13/398* (2018.05); *H04N 13/324* (2018.05); *H04N 2213/001* (2013.01)

(58) Field of Classification Search
CPC ........... H04N 2213/001; H04N 13/351; G02B 30/27; G02B 1/11; G02B 2207/123; G02B 3/0031; G06F 3/04847; G09F 19/14; G09F 9/3026
See application file for complete search history.

(56) References Cited

U.S. PATENT DOCUMENTS

| | | | |
|---|---|---|---|
| 6,169,632 | B1 | 1/2001 | Kurtenbach et al. |
| 6,339,421 | B1 | 1/2002 | Puckeridge |
| 6,377,295 | B1 | 4/2002 | Woodgate et al. |
| 7,001,023 | B2 | 2/2006 | Lee et al. |
| 7,462,104 | B2 | 12/2008 | Cesare |
| 7,602,395 | B1 | 10/2009 | Diard |
| 7,990,498 | B2 | 8/2011 | Hong |
| 8,461,995 | B1 | 6/2013 | Thornton |
| 9,069,519 | B1 | 6/2015 | Hall |
| 9,080,279 | B2 | 7/2015 | Jun et al. |
| 9,396,588 | B1 | 7/2016 | Li |
| 9,715,827 | B2 | 7/2017 | Ng et al. |
| 9,743,500 | B2 | 8/2017 | Dietz et al. |
| 9,792,712 | B2 | 10/2017 | Ng et al. |
| 10,269,279 | B2 | 4/2019 | Ng et al. |
| 10,404,974 | B2 | 9/2019 | Dietz et al. |
| 10,427,045 | B2 | 10/2019 | Thompson et al. |
| 10,565,616 | B2 | 2/2020 | Thompson et al. |
| 2002/0008674 | A1 | 1/2002 | Son et al. |
| 2003/0065805 | A1 | 4/2003 | Barnes, Jr. |
| 2003/0115096 | A1 | 6/2003 | Reynolds et al. |
| 2003/0156260 | A1 | 8/2003 | Putilin et al. |
| 2004/0184145 | A1 | 9/2004 | Fridman et al. |
| 2004/0252374 | A1 | 12/2004 | Saishu et al. |
| 2005/0093986 | A1 | 5/2005 | Shinohara et al. |
| 2005/0195330 | A1 | 9/2005 | Zacks et al. |
| 2008/0144174 | A1 | 6/2008 | Lucente et al. |
| 2009/0109126 | A1 | 4/2009 | Stevenson et al. |
| 2009/0273486 | A1 | 11/2009 | Sitbon |
| 2010/0002079 | A1 | 1/2010 | Krijn et al. |
| 2010/0085517 | A1 | 4/2010 | Hong |
| 2010/0207961 | A1 | 8/2010 | Zomet |
| 2010/0214537 | A1 | 8/2010 | Thomas |
| 2010/0246018 | A1 | 9/2010 | Yu |
| 2010/0283838 | A1 | 11/2010 | Tomisawa et al. |
| 2011/0159929 | A1 | 6/2011 | Karaoguz et al. |
| 2011/0169863 | A1 | 7/2011 | Kawai |
| 2011/0216171 | A1 | 9/2011 | Barre et al. |
| 2011/0242298 | A1 | 10/2011 | Bathiche et al. |
| 2011/0304613 | A1 | 12/2011 | Thoresson |
| 2012/0026157 | A1 | 2/2012 | Unkel et al. |
| 2012/0062565 | A1 | 3/2012 | Fuchs et al. |
| 2012/0105445 | A1 | 5/2012 | Sakai et al. |
| 2012/0140048 | A1 | 6/2012 | Levine |
| 2012/0218253 | A1 | 8/2012 | Clavin |
| 2012/0268451 | A1 | 10/2012 | Tsai et al. |
| 2013/0013412 | A1 | 1/2013 | Altman et al. |
| 2013/0093752 | A1 | 4/2013 | Yuan |
| 2013/0114019 | A1 | 5/2013 | Ijzerman et al. |
| 2013/0169765 | A1 | 7/2013 | Park et al. |
| 2013/0182083 | A1 | 7/2013 | Grossman |
| 2013/0282452 | A1 | 10/2013 | He |
| 2013/0298173 | A1 | 11/2013 | Couleaud et al. |
| 2014/0015829 | A1 | 1/2014 | Park et al. |
| 2014/0035877 | A1 | 2/2014 | Cai et al. |
| 2014/0061531 | A1 | 3/2014 | Faur et al. |
| 2014/0111101 | A1 | 4/2014 | McRae |
| 2014/0300711 | A1 | 10/2014 | Kroon et al. |
| 2014/0313408 | A1 | 10/2014 | Sharma et al. |
| 2014/0316543 | A1 | 10/2014 | Sharma et al. |
| 2015/0020135 | A1 | 1/2015 | Frusina et al. |
| 2015/0042771 | A1 | 2/2015 | Jensen et al. |
| 2015/0049176 | A1 | 2/2015 | Hinnen et al. |
| 2015/0062314 | A1 | 3/2015 | Itoh |
| 2015/0085091 | A1 | 3/2015 | Varekamp |
| 2015/0092026 | A1 | 4/2015 | Baik et al. |
| 2015/0198940 | A1 | 7/2015 | Hwang et al. |
| 2015/0229894 | A1 | 8/2015 | Dietz |
| 2015/0279321 | A1 | 10/2015 | Falconer et al. |
| 2015/0293365 | A1 | 10/2015 | Van Putten et al. |
| 2015/0334807 | A1 | 11/2015 | Gordin et al. |
| 2015/0356912 | A1 | 12/2015 | Dietz |
| 2016/0012726 | A1 | 1/2016 | Wang |
| 2016/0210100 | A1 | 7/2016 | Ng et al. |
| 2016/0212417 | A1* | 7/2016 | Ng ................. H04N 13/307 |
| 2016/0224122 | A1 | 8/2016 | Dietz et al. |
| 2016/0227201 | A1 | 8/2016 | Ng et al. |
| 2016/0261837 | A1* | 9/2016 | Thompson ........... H04N 13/376 |
| 2016/0261856 | A1 | 9/2016 | Ng et al. |
| 2016/0293003 | A1 | 10/2016 | Ng et al. |
| 2016/0341375 | A1 | 11/2016 | Baker |
| 2016/0341377 | A1 | 11/2016 | Eddins |
| 2016/0364087 | A1 | 12/2016 | Thompson et al. |
| 2016/0366749 | A1 | 12/2016 | Dietz et al. |
| 2016/0371866 | A1 | 12/2016 | Ng et al. |
| 2017/0155891 | A1 | 6/2017 | Hu et al. |
| 2017/0205889 | A1 | 7/2017 | Ng et al. |
| 2018/0115772 | A1 | 4/2018 | Thompson et al. |
| 2018/0277032 | A1 | 9/2018 | Ng et al. |
| 2018/0357981 | A1 | 12/2018 | Ng et al. |
| 2019/0015747 | A1 | 1/2019 | Thompson et al. |
| 2019/0019218 | A1 | 1/2019 | Thompson et al. |
| 2019/0028696 | A1 | 1/2019 | Dietz et al. |

FOREIGN PATENT DOCUMENTS

| | | |
|---|---|---|
| JP | 2008-134617 A | 6/2008 |
| JP | 2010-536069 A | 11/2010 |
| JP | 2015-507756 A | 3/2015 |
| JP | 2016-505870 A | 2/2016 |
| KR | 10-2015-0085012 A | 7/2015 |
| WO | 02/24470 A1 | 3/2002 |
| WO | 2005/083660 | 9/2005 |
| WO | 2007/013215 | 2/2007 |
| WO | 2013/183108 A1 | 12/2013 |
| WO | 2016/118622 A1 | 7/2016 |
| WO | 2016/141248 A1 | 9/2016 |

OTHER PUBLICATIONS

International Search Report, dated May 12, 2016, for International Application No. PCT/US2016/020784, 4 pages.
International Search Report, dated Jun. 3, 2016, for International Application No. PCT/US2016/014122, 3 pages.
International Search Report, dated Sep. 29, 2016, for International Application No. PCT/US2016/037185, 4 pages.
International Search Report, dated Jun. 21, 2018, for International Application No. PCT/US2018/024024, 3 pages.
International Search Report, dated Feb. 25, 2019, for International Application No. PCT/US2018/059859, 14 pages.
Japanese Decision to Grant a Patent, dated Feb. 9, 2021, for Japanese Application No. 2019-547401, 5 pages, (with English machine translation).
Korean Office Action, dated Sep. 9, 2020, for Korean Application No. 10-2019-7028521, 14 pages, (with English machine translation).

(56) References Cited

OTHER PUBLICATIONS

Partial Supplementary European Search Report, dated Aug. 27, 2020, for European Application No. 18875146,5, 13 pages.

* cited by examiner

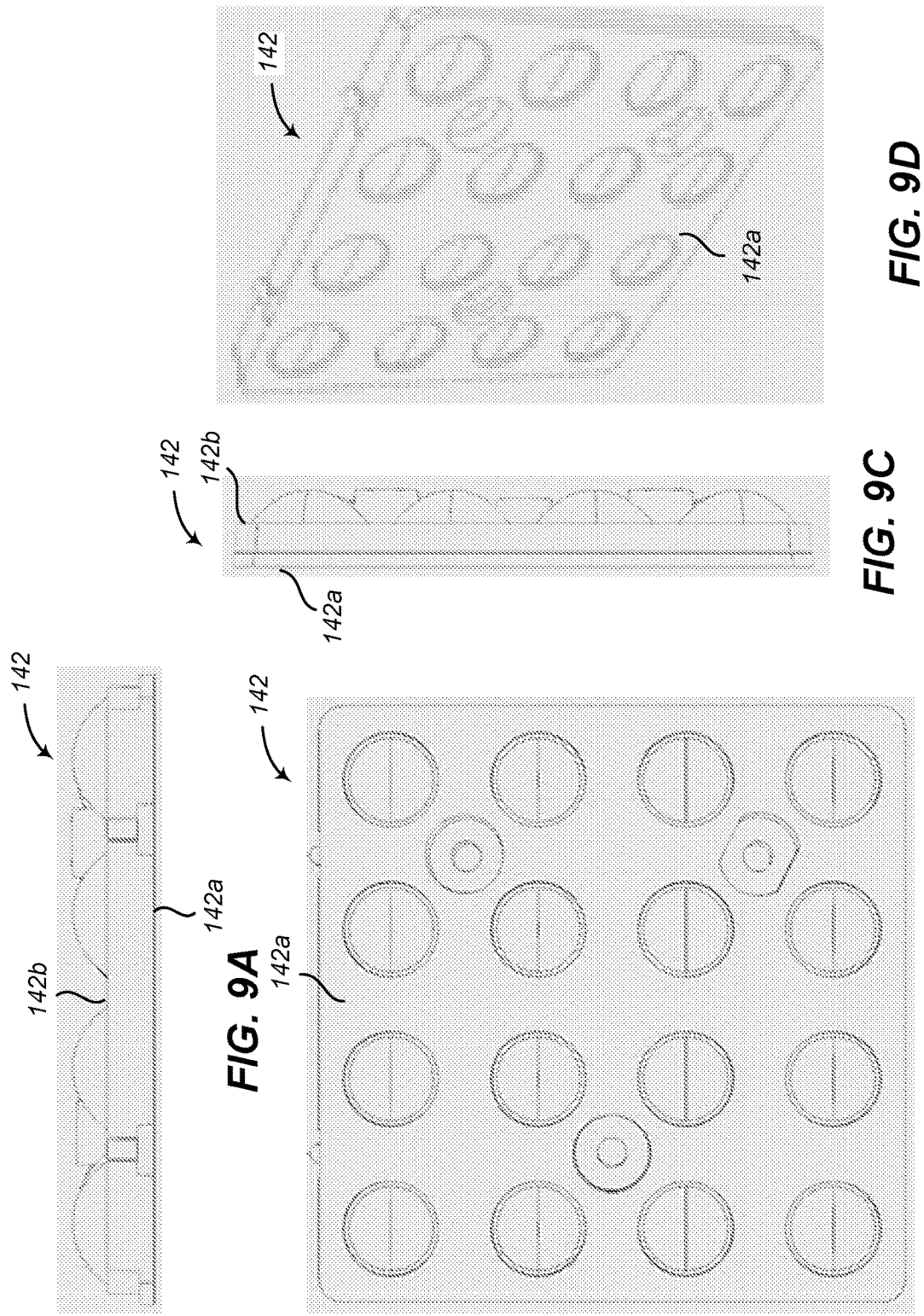

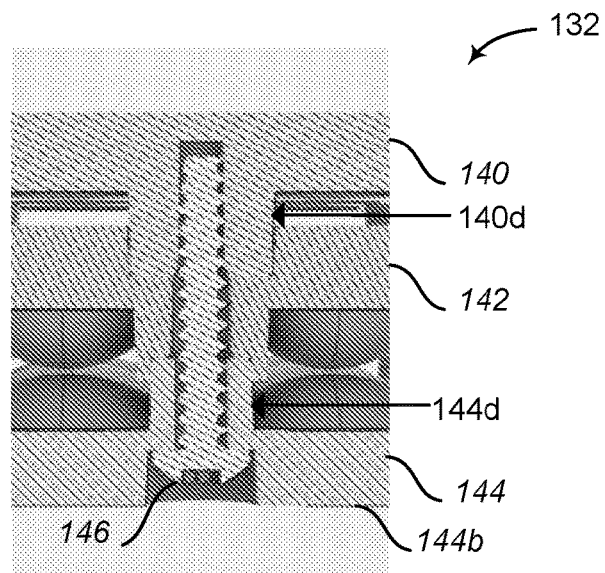
FIG. 14
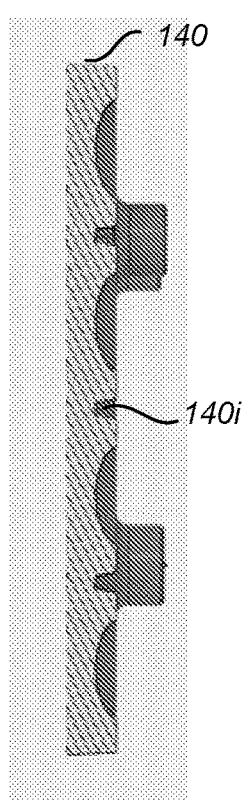 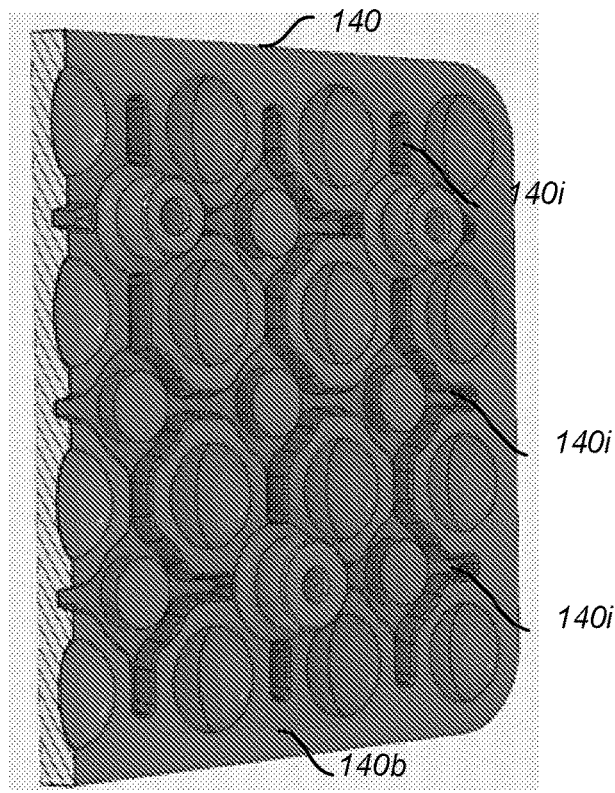
FIG. 15A          FIG. 15B

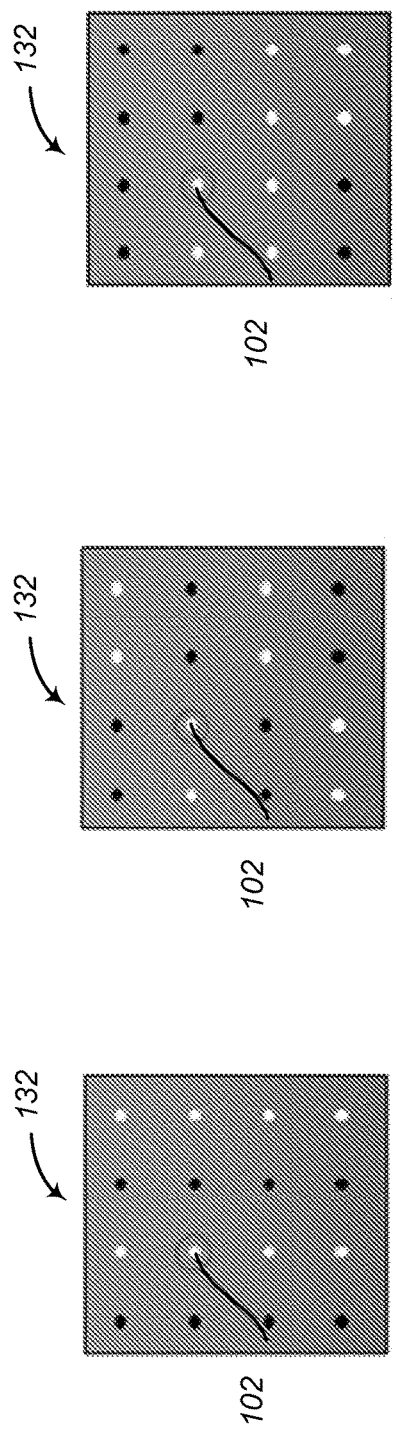
*FIG. 23A*  *FIG. 23B*  *FIG. 23C*
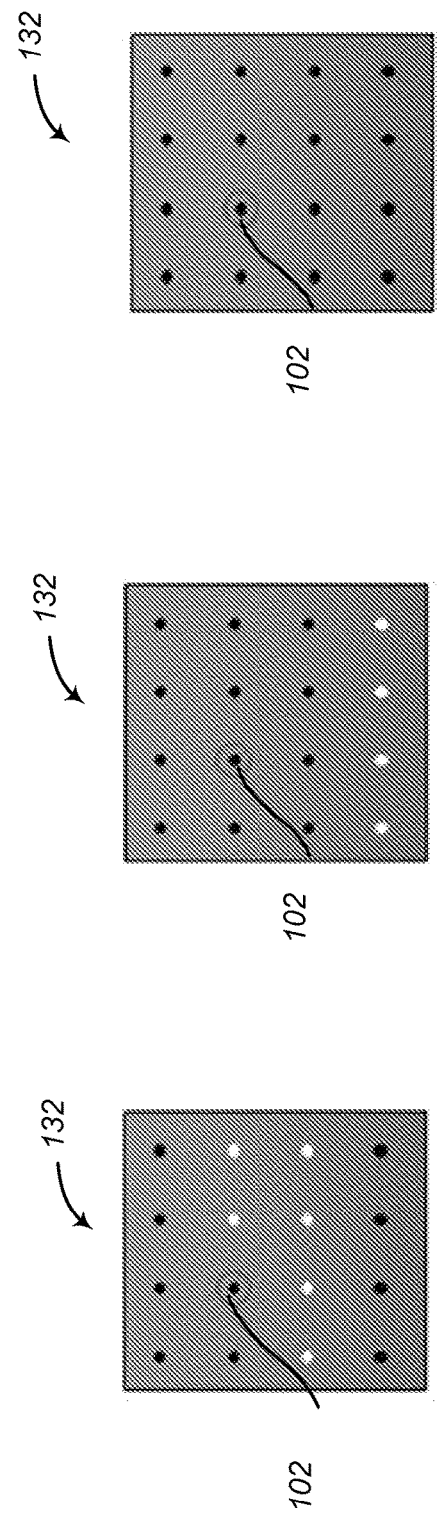
*FIG. 23D*  *FIG. 23E*  *FIG. 23F*

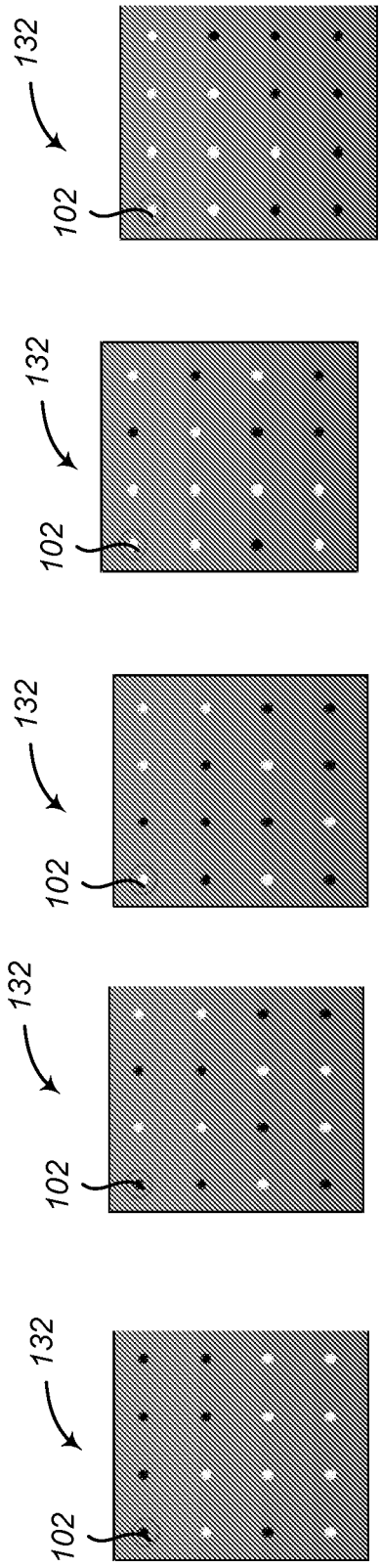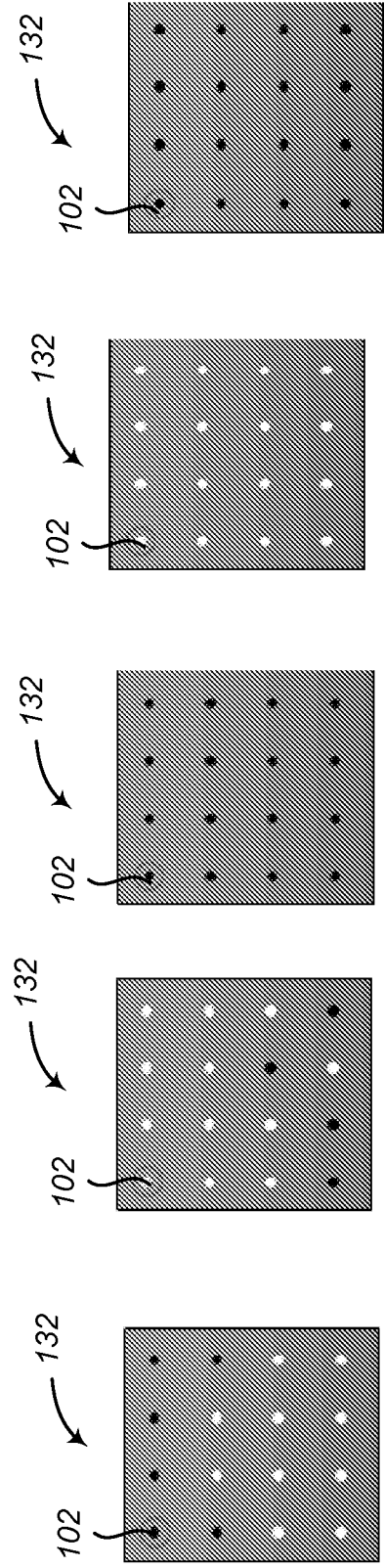

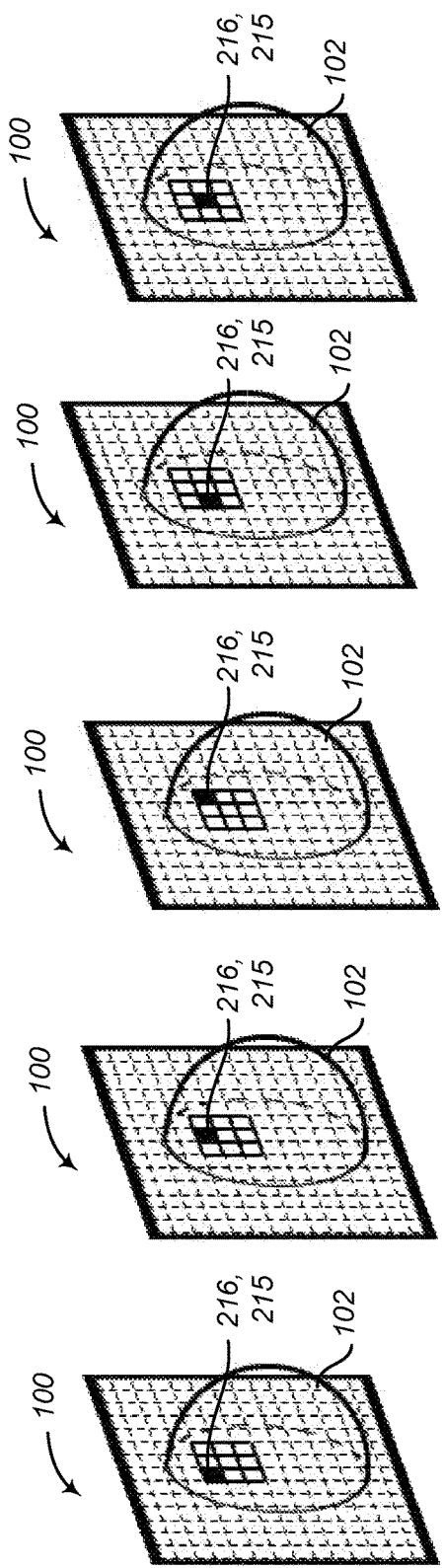
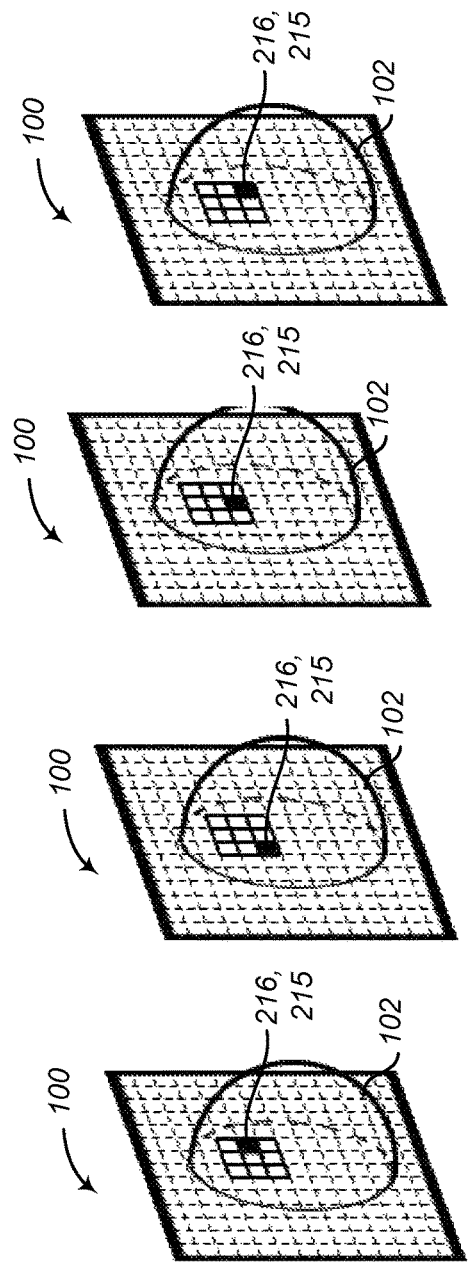
FIG. 25A  FIG. 25B  FIG. 25C  FIG. 25D  FIG. 25E
FIG. 25F  FIG. 25G  FIG. 25H  FIG. 25I

PRECISION MULTI-VIEW DISPLAY

BACKGROUND

Technical Field

The present disclosure relates to multi-view (MV) display systems, and more particularly, to extensible, precision MV display systems that can provide arbitrary (e.g., different) content to easily specified locations.

Description of the Related Art

A multi-view display simultaneously presents different content to different viewers based on the location of each viewer relative to the display. Novelty lenticular cards are a simple example of a multi-view system. When viewed from different angles they can reveal different images. They use a series of cylindrical lenslets placed over stripes of content to direct each content stripe in a unique angular range. A complete image is formed by having the stripes from a single image placed in the right locations under the lenslets. The stripe images can be provided by a printed sheet, or by a flat panel display.

FIG. 26 shows the basic operation of a lenticular display system 2700. The lenticular display system 2700 includes two cylindrical lenses or lenticules 2702, which are shown in cross section, placed above an array of stripes of content 2704. The array of stripes of content 2704 includes content stripes 1, 2, 3, 4, A, B, C, and D. In a viewing zone 4D, a viewer would see an image of stripe 4 next to stripe D. Simultaneously, a viewer in a viewing zone 3C would see an image of stripe 3 next to stripe C. Accordingly, distinct images can be provided simultaneously to different viewers at different locations.

There are significant limitations to the display system 2700. A viewer in a viewing zone 3D would see the stripe-3 part of the zone 3C image and the stripe-D part of the zone 4D image. Far away from the array of stripes of content 2704, the zones 4D, 3C, 2B, and 1A are respectively wide. Nearer to the array of stripes of content 2704, viewers in zones 3D, 2C and 1B would see a combination of parts of the multiple images intended for zones 4D, 3C, 2B, and 1A. When designing a printed lenticular display, one needs to know the expected viewing distance so that image stripes can be arranged to provide consistent images to the intended viewing zones, as opposed to providing a combination of parts of multiple images. For an electronic display, one may assign the stripes dynamically so as to create a consistent image at the locations where viewers currently are located.

If one attempts to increase the number of viewing zones by increasing the number of stripes underneath each lenticule, the number of distinct viewing zones grows rapidly, and the size of each shrinks. Targeting images to a particular location becomes increasingly challenging. Due to these and other limitations, current multi-view displays are typically limited to a very small number of viewing zones. Two to four viewing zones is common, and commercial units that are intended for three-dimensional (3D) viewing applications tend to max out in the small tens of stripes per lenslet.

Flat panel electronic display pixels are typically comprised of sub-pixels (e.g., red, green, and blue sub-pixels) which are spatially distinct to create a range of colors. This technique depends on the limited ability of the human eye to resolve this level of detail. Unfortunately, the lenticules act as magnifiers, and can make the sub-pixels quite evident. For example, if the red sub-pixels line up as a stripe under a lenticule, viewers at the locations that this images to might only be able to see red in the region of that lenticule. To overcome the sub-pixel problem, the lenticules may be angled relative to the underlying panel, so as to cover different color sub-pixels along the long axis of the lens. Because the cylindrical lenticules do not magnify in that dimension, color mixing works appropriately.

Lenticular displays that use cylindrical lenses are limited to creating views in a single dimension, e.g., strictly horizontal or strictly vertical. So-called "Dot" or "Fly Eye" lenticulars use a 2-dimensional array of lenses to allow content to be directed in both dimensions. Unfortunately, there is no equivalent trick to angling the lenticules to allow sub-pixel mixing because both dimensions are magnified.

There are alternative techniques to traditional lensing. For example, one company, LEIA, uses diffractive optics to create a display with sixty-four views (8 in each dimension). There are also techniques using parallax barriers, but those techniques lose significant brightness. Steerable backlights combined with time division multiplexed display have also been disclosed, but the number of views of such a system is limited by the lack of high speed liquid crystal display (LCD) panels. Up to 4 independent views have been reported using such systems.

To make large displays, it is common practice to tile smaller displays in the form of a grid. Video walls and large light emitting diode (LED) signs are often architected in this fashion. There are many advantages to this approach, including that the tiles are easier to ship, store, and generally handle than a single large display. Also, the tiles can be arranged in many different configurations. In addition, the tiles can be individually serviced or replaced without having to deal with the entire display. Moreover, the tiles are easier to manufacture because, given a certain defect density, a small tile has a much better chance of being defect free than a very large display. There are disadvantages to tiling a display versus simply building a larger one. For example, power and video signals must be created for, and routed to, each tile. In addition, each tile may have a different brightness or color, which may need to be corrected through calibration.

Specialized equipment has been created to address the needs of traditional tiled displays. For example, video wall controllers can rescale and segment a standard video stream for playback across tiled monitors. Color calibrators are used to maintain consistent brightness and color from tile to tile. Specialized mechanical mounting systems hold the tiles in place, and provide channels to manage the many electrical cables.

Although independent multi-view displays can be arranged to create the appearance of a larger display, the multi-view displays used to make such a tiled display do not include any features to make this sort of tiled display easier to construct or less costly.

Finally, most electronic multi-view displays are targeted at auto-stereo applications, and do not provide an interface for arbitrarily directing arbitrary content to multiple locations simultaneously.

What is needed is an extensible, precision multi-view display system that can provide arbitrary (e.g., different) content to easily specified locations to support location specific media experiences.

BRIEF SUMMARY

Various aspects of a precision multi-view display system are disclosed, which can accurately and simultaneously target content to individual viewers over a wide field of view. Larger displays may be created by tiling individual units, and various techniques are disclosed that are designed to make tiling easy and efficient. Also disclosed are a calibration procedure that enables the specification of content at precise viewing locations, as well as a simple interface that allows a user to graphically specify viewing zones and associate content that will be visible in those zones.

BRIEF DESCRIPTION OF THE SEVERAL VIEWS OF THE DRAWINGS

FIGS. 9A-9D are orthographic views of a second lens array according to one or more embodiments of the present disclosure.

FIG. 14 is a partial, cross-sectional view of a lens assembly according to one or more embodiments of the present disclosure.

FIGS. 15A and 15B are cross-sectional views of a first lens array according to one or more embodiments of the present disclosure.

FIGS. 23A-23F are each a front view of a lens assembly during a calibration procedure according to one or more embodiments of the present disclosure.

FIGS. 25A-25I are refinement images according to one or more embodiments of the present disclosure.

DETAILED DESCRIPTION

Figure 1:
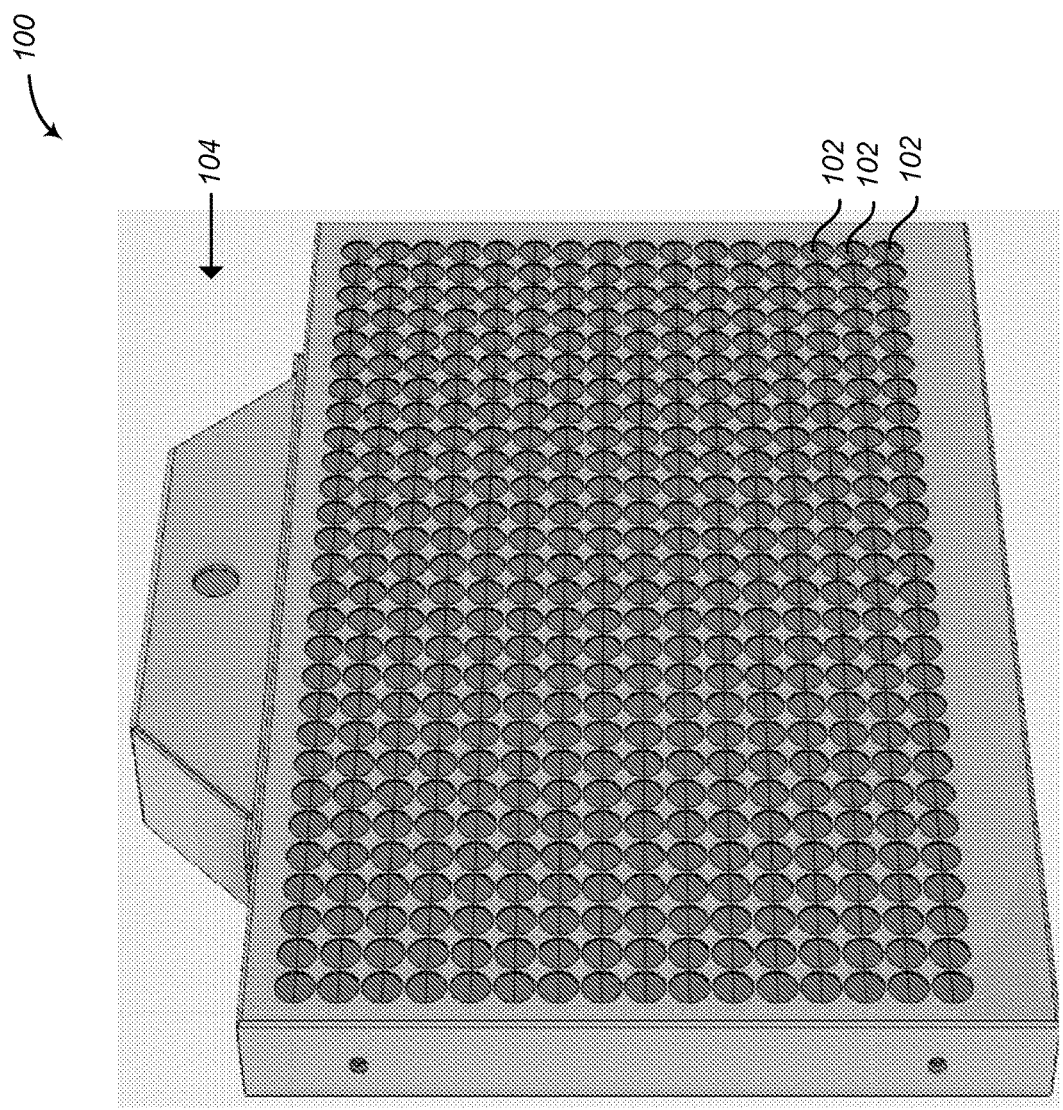
FIG. 1 is a front, perspective view of a precision MV display device according to one or more embodiments of the present disclosure.

FIG. 1 is a front, perspective view of a precision MV display device 100 according to one or more embodiments of the present disclosure. The MV display device 100 includes a grid of multi-view pixels 102 and has a quadrilateral (e.g., rectangular) shape. Other shapes and configurations are within the scope of the present disclosure. To a viewer, the MV display device 100 resembles an ordinary light emitting diode (LED) display. In one or more embodiments, the MV display device 100 includes an integrated camera 104 disposed over the grid of multi-view pixels 102. The camera 104 is an example of a sensing system that is used to monitor activity in the field of view of the MV display device 100. In one or more embodiments, such a sensing system includes, or consists entirely of, sensors that are not integrated into the MV display device 100.

Figure 2:
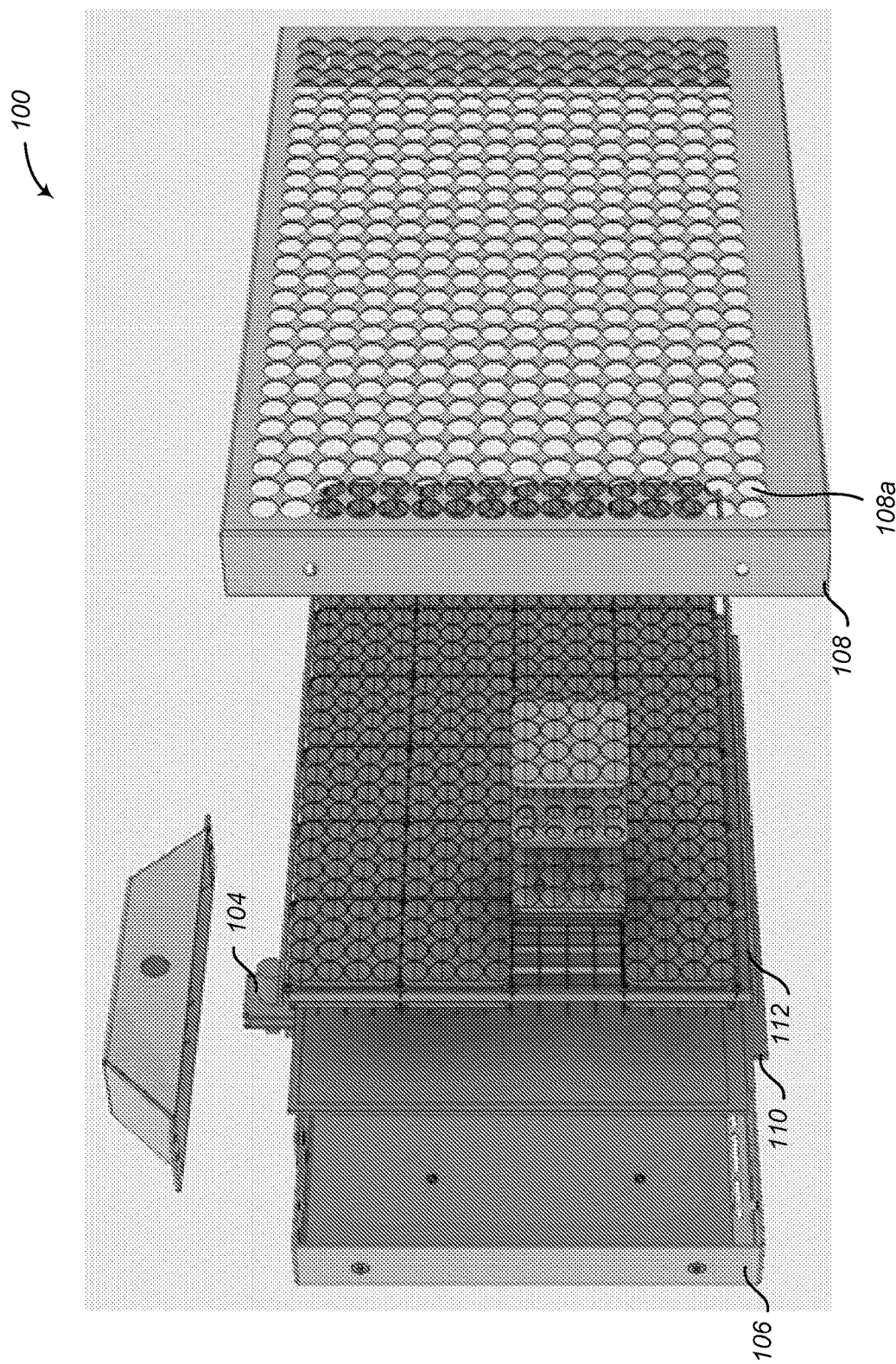
FIG. 2 is an exploded front view of a precision MV display device according to one or more embodiments of the present disclosure.

FIG. 2 is an exploded front view of a precision MV display device 100 according to one or more embodiments of the present disclosure. The MV display device 100 includes a rear cover 106 and a front cover 108. A high-resolution, flat panel display (FPD) 110 sits against the rear cover 106. In one or more embodiments, the flat panel display 110 includes an LCD panel and a backlighting unit. Other types of flat panel display 110 may be used without departing from the scope of the present disclosure. The flat panel display 110 may be covered by a diffuser 162 (see FIG. 18) that serves to locally mix colors of display sub-pixels of the flat panel display 110, as will be described in greater detail below. The diffuser 162 is covered by the lens array panel 112.

The lens array panel 112 is comprised of smaller lens assemblies 132 (see FIGS. 6 and 7A-7C), each including three lens arrays 140, 142, 144 that are stacked to create a plurality of multi-element lens systems for the multi-view pixels 102, respectively. (16 such lens systems are included in the lens assembly 132.) To prevent cross talk among the multi-view pixels 102, the lens array panel 112 includes baffles 150, 152 (see FIG. 17A) that lie between the diffuser 162 and the lenses of the lens array panel 112. A rail system including rails 134 and 136 (see FIG. 6) holds the lens assemblies 132 together in such a fashion as to allow tight packing of the multi-view pixels 102. The front cover 108 includes a plurality of apertures 108a that improve the appearance the multi-view pixels 102. The components of the lens array panel 112 are described in greater detail below with reference to FIGS. 5-17C.

Figure 3:
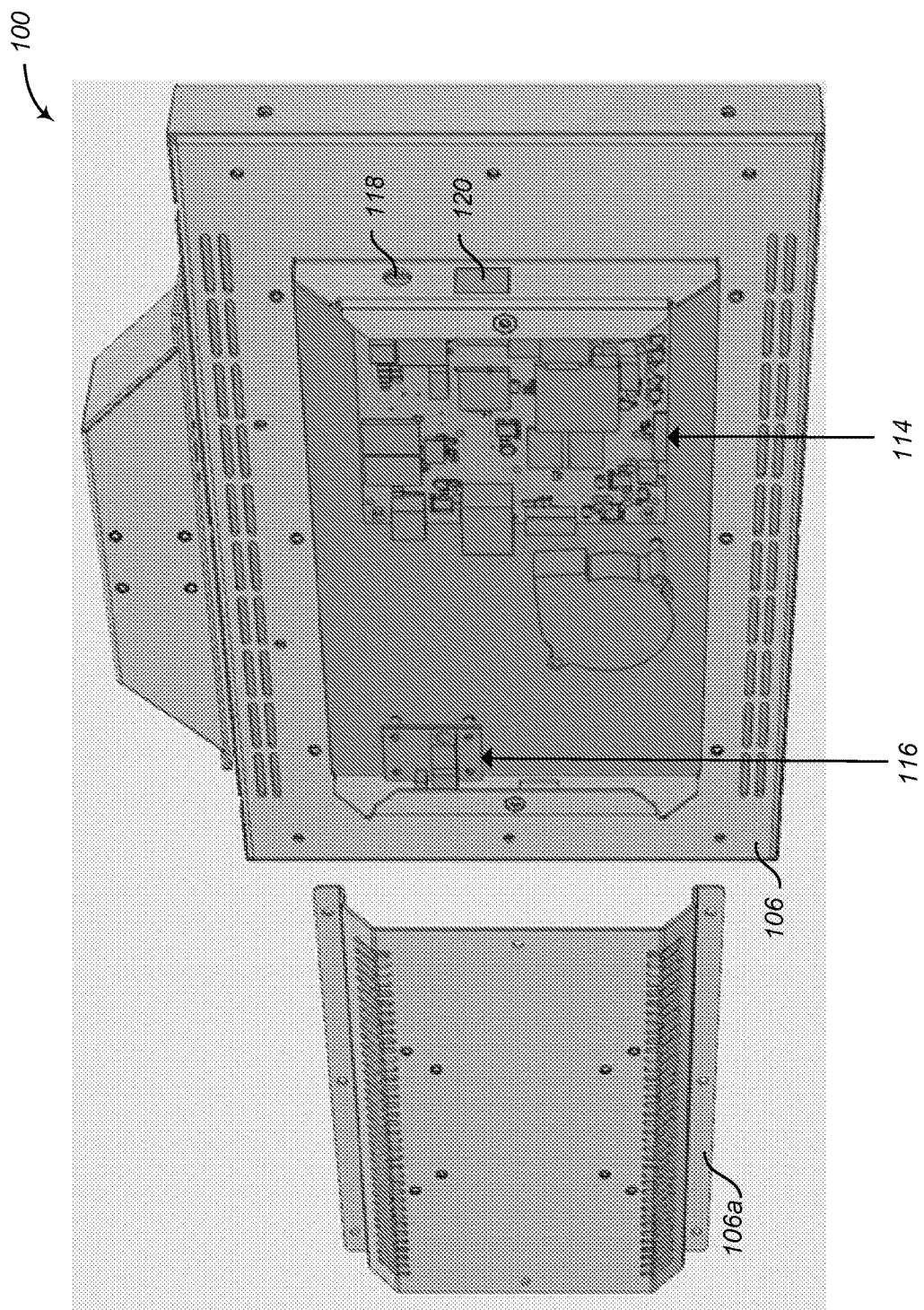
FIG. 3 is a partial, exploded rear view of a precision MV display device according to one or more embodiments of the present disclosure.

FIG. 3 is a partial, exploded rear view of a precision MV display device 100 according to one or more embodiments of the present disclosure. In FIG. 3, a panel 106a of the rear cover 106 is removed to expose a first driver board 114 and a second driver board 116. The first driver board 114 includes a pixel processing unit 172 (see FIG. 19) that has been specially designed to support multi-view applications. The first driver board 114 also includes a power controller 180 (see FIG. 19) that distributes power, which is received via a power cable connected to a power connector 118, within the MV display device 100. In addition, the first driver board 114 includes a network controller 178 (see FIG. 19) that transmits and receives data via a data cable connected to a data connector 120. Although not illustrated in FIG. 3, the second driver board 116 also includes a power connector 118 coupled to the power controller 180, and a data connector 120 coupled to the network controller 178. In one or more embodiments, the data connector 120 is an Ethernet® connector and the network controller 178 transmits and receives data according to Ethernet® data communications standards. Providing the power connectors 118 and the data connectors 120 on both the left and right sides of the MV display device 100 enables convenient and tidy cabling when multiple display devices 100 are interconnected to form a tiled display device.

Figure 4:
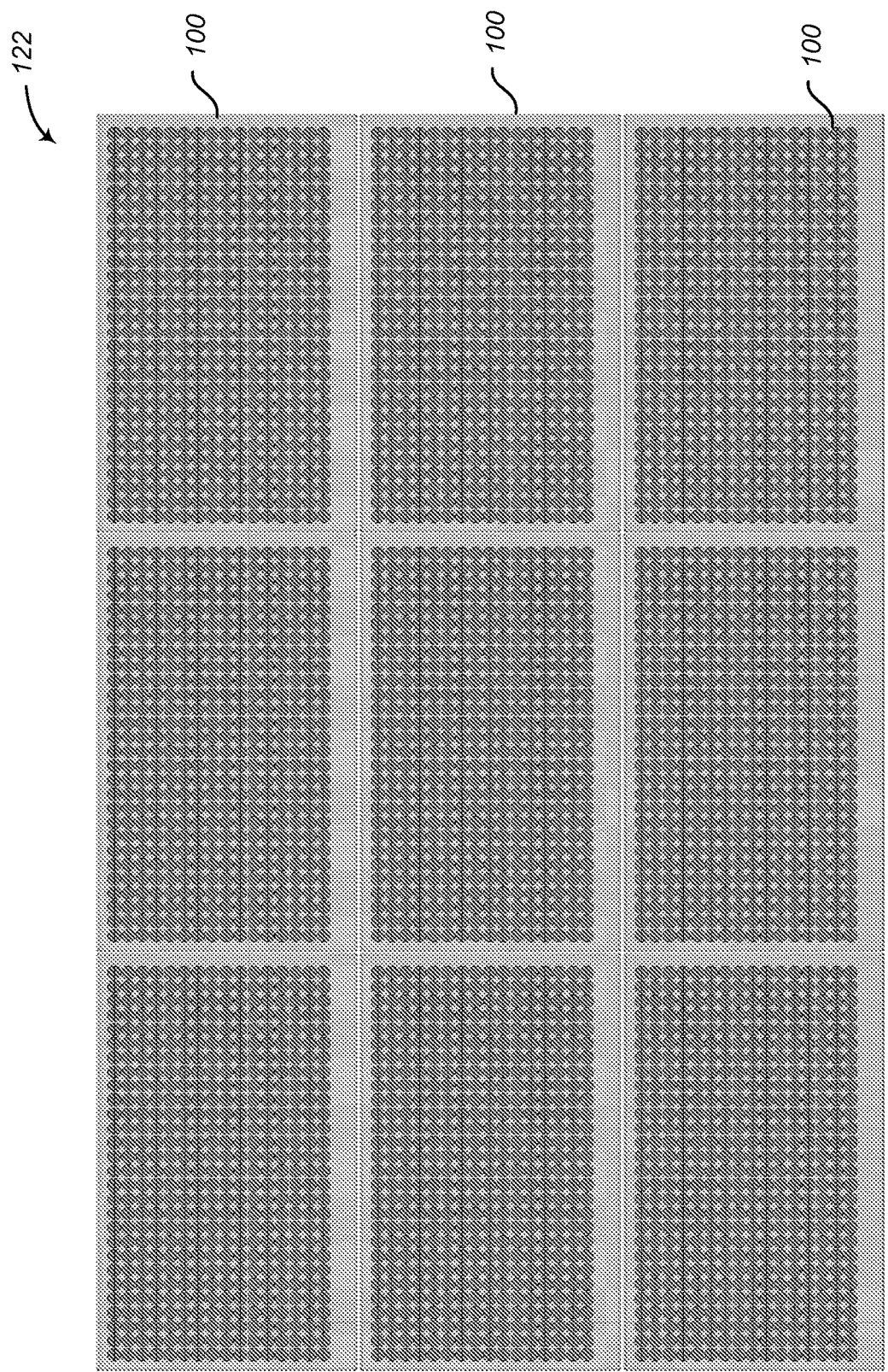
FIG. 4 is a front view of a MV display system according to one or more embodiments of the present disclosure.

To create larger displays with more multi-view (MV) pixels, the MV display device 100 may be used in tiled configurations as shown in FIG. 4. FIG. 4 is a front view of a MV display system 122 according to one or more embodiments of the present disclosure. The MV display system 122 includes a plurality of MV display devices 100 that are coupled together and provided with control signals that cause their MV pixels 102 to emit light such that different images are provided to viewers in different viewing zones, as described in detail below. The example MV display system 122 shown in FIG. 4 includes nine of the MV display devices 100; however, other embodiments of the MV display system 122 may include a different quantity of the MV display devices 100.

The MV display device 100 includes a number of features that make tiling easier and more effective. In one or more embodiments, there are no protrusions, vents, and cable connectors provided on the side edges of the rear cover 106 and front cover 108, which enables the MV display devices 100 to physically abut one another. Mounting points are provided on the rear of the MV display device 100 (see FIG. 3), so these do not impede the tiling. A bezel, which is the space between the edge of a display and its pixels, is minimized to improve appearance. The power connectors 118 and the data connectors 120 are provided on the rear cover 106 at locations (e.g., opposite sides thereof) that enable the MV display devices 100 to be daisy-chained, which greatly reduces the volume of cables required to drive a tiled system, such as the MV display system 122. In addition, application software that controls operation of the MV display devices 100 enable the MV display system 122 to be treated as a single large display, which makes it easier to calibrate and use than conventional MV display devices.

There are numerous aspects of the MV display system 122 that work together to provide the intended multi-view functionality. For example, the MV display system 122 includes a number of subsystems, including an optical system (which is a type of light field display specifically optimized for multi-view applications), a display controller, calibration, and graphical interface, which work together to provide the intended multi-view functionality. Each of those aspects is described in greater detail below.

Optical System

The MV display device 100 is a type of light field display. Each pixel of a conventional display is designed to display one color and intensity of light at a time, which is cast over the field of view of the display. In contrast, each multi-view (MV) pixel 102 of the MV display device 100 simultaneously projects different colors and intensities of light to various viewing zones. In this regard, the MV pixel 102 is more like a projector, sending individually controlled beamlets of light in numerous directions simultaneously.

In one or more embodiments of the present disclosure, the lens array panel 112 of the MV display device 100 includes an array of optical elements (an array of multiple-element lens systems), to be placed over the flat panel display (FPD) 110 including an array of display pixels. The multiple-element lens system of the lens array panel 112 is placed over a sub-array of display pixels (e.g., 100×100=10,000 display pixels) to collectively form one multi-view (MV) pixel 102, where each beamlet corresponds to one display pixel. In this example, each MV pixel 102 can emit 10,000 beamlets based on the 10,000 display pixels, where the direction, color and brightness of each of the beamlets are independently controllable. Thus, an array of MV pixels 102 can be considered as an array of small projectors, each of which uses a subsection of the flat panel display 110 as an imaging device. Alternatively, the configuration can be considered as an array of magnifying glasses (i.e., an array of multi-element lens systems) placed on the flat panel display 110. Each lens system magnifies each of the display pixels to fill the pupil of the multi-element lens system. The display pixel that a viewer sees magnified depends on the viewing angle, or angle of the viewer with respect to the optical axis of the lens system that is disposed over the display pixel. In other words, which display pixels are seen through the magnifying glass depends on the viewing angle. Thus, the magnification allows for both selection of (via viewing angle) which pixels are visible and enlargement of the selected visible pixels to cover a larger extent from the viewer's standpoint.

The FPD-based approach (i.e., a combination of an FPD 110 with a lens array panel 112) provides some advantages compared to using an array of discrete projectors. For a discrete projector design, drive electronics need to be created for each MV pixel separately, whereas in the FPD-based approach, all the MV pixels on the FPD 110 may use shared electronics. With an FPD-based approach wherein a fixed number of beamlets (to first order) are respectively provided by the fixed number of display pixels, one may trade off the number or spatial resolution of MV pixels 102 with the angular resolution of the MV display device 100.

Display "Sub-Pixels"

Many FPDs create color via the use of different colored sub-pixels (e.g., red, green, and blue sub-pixels). In other words, the color of each display pixel may be set by use of different colored display "sub-pixels" that collectively form the display pixel. When viewed from sufficiently far away, the display sub-pixels cannot be individually resolved, and thus create the effect of mixing the individual colors together for the corresponding display pixel. In MV applications, the magnification of the lens system may be set high to give distinct angular resolution, though this may make the individual display sub-pixels visible. If a viewer is in the path of a beamlet of only a given display sub-pixel and not of other display sub-pixels forming a display pixel, then the viewer can only see the color of that display sub-pixel (e.g., red, green or blue) and not the mixed color intended for the display pixel. A similar problem may occur even with monochrome displays where there is a gap between display sub-pixels.

To solve this problem, the MV display device 100 uses the diffuser 162 (see FIG. 18) that effectively mixes the colors among the display sub-pixels of the flat panel display 110 for their corresponding display pixel. According to some embodiments, separate (different) diffusers may be provided for different display pixels, respectively, so that each diffuser is to mix only the display sub-pixels of that display pixel together. However, this would require precise alignment of the diffuser 162 to the sub-pixels of the flat panel display 110. Thus, in other embodiments, a single diffuser layer is provided over the entire flat panel display 110, which creates sufficient local mixing for each display pixel.

There may be engineering tradeoffs in selecting the proper diffuser 162. A diffuser that provides wide lateral mixing will mix colors well, but will limit the achievable angular resolution of the display because of smear.

Figure 5A:
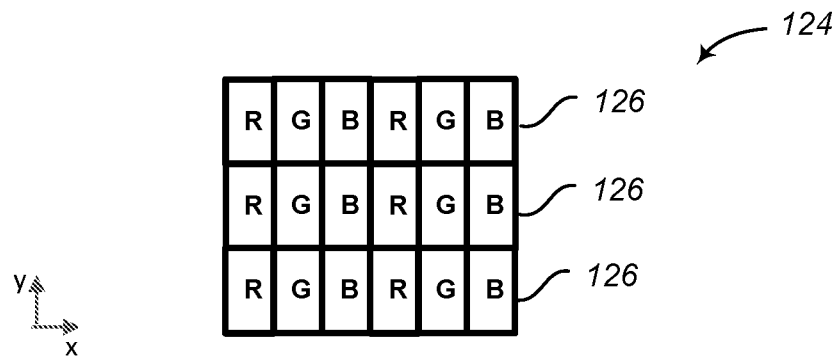
FIG. 5A-5C each show a sub-pixel pattern according to one or more embodiments of the present disclosure.

The sub-pixel pattern used on FPDs 110 varies. A typical pattern is shown in FIG. 5A. In FIG. 5A, a sub-pixel pattern 124 includes a plurality of sub-pixels 126 arranged in RGB (vertical) stripes in a square pattern. For example, red display sub-pixels occupy about one-third of the space horizontally, before repeating. Thus, the diffuser 162 needs to span a large gap. Vertically, the situation is quite different. In FIG. 5A, there is little gap between display sub-pixels 126, so very little diffusion is required. In various exemplary embodiments, the diffuser 162 is an asymmetric diffuser, providing the appropriate amounts of diffusion in the horizontal and vertical dimensions. Optimizing for each axis independently allows the system to retain better angular resolution than if a symmetric diffuser had been employed. In one or more embodiments, the flat panel display 110 includes sub-pixels 126 arranged in the sub-pixel pattern 124 shown in FIG. 5A. With this flat panel display 110, an asymmetric diffuser 162 may be used which provides more diffusion along the horizontal axis and less diffusion along the vertical axis, as will be more fully described below in reference to FIG. 18.

Figure 5B:
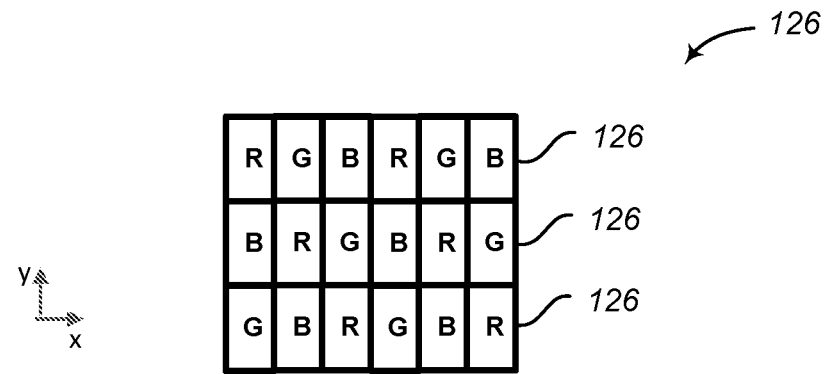

FIG. 5B shows a sub-pixel pattern 126 that includes a plurality of sub-pixels 126 arranged in a square mosaic pattern. In one or more embodiments, the flat panel display 110 includes sub-pixels 126 arranged in the sub-pixel pattern 126 shown in FIG. 5B.

Figure 5C:
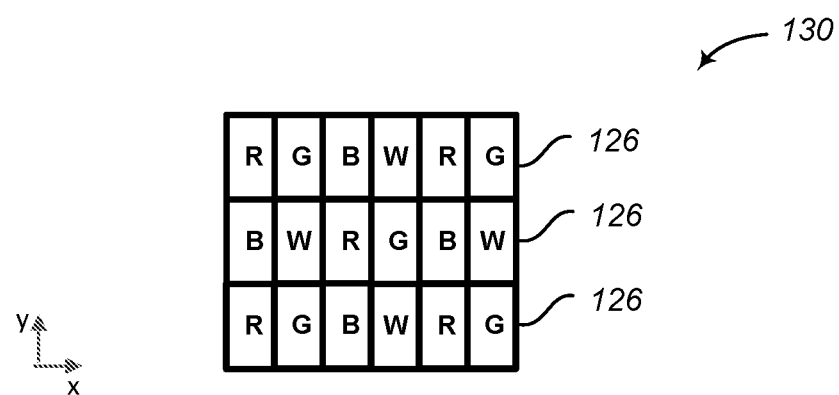

FIG. 5C shows a sub-pixel pattern 128 that includes a plurality of sub-pixels 126 arranged in a square red, green, blue, white (RGBW) pattern. In one or more embodiments, the flat panel display 110 includes sub-pixels 126 arranged in the sub-pixel pattern 128 shown in FIG. 5C.

Future FPDs may incorporate more amenable color mixing techniques (e.g., field sequential color) which may lessen the need for the diffuser. Thus, the use of a diffuser is preferable in FPDs that use typical color filtered sub-pixel channels and in general this diffuser will have an asymmetric scattering profile.

Lens Design and Intra-Array Mechanical Alignment and Fixture Features

In various exemplary embodiments, a multi-element lens (or a multi-element lens system) is employed. Using multiple elements to form a lens system allows one to achieve a much better tradeoff among focus, field of view, and fill factor. One could assemble each multi-element lens independently, including providing baffles to prevent stray light from crossing among MV pixels 102, and then array them on top of the flat panel display 110. Such a technique may be prohibitively expensive. Alternatively, using the example of lenticular lens sheets, one could imagine stacking sheets of lenses to create the individual lens elements in parallel.

There may be a number of problems with a naïve lens sheet approach. First, it may be difficult to maintain proper spacing among the lenses along the optical axis. Second, differential thermal expansion would make it difficult to keep the lenses centered over the correct display pixels over temperature changes. For example, if the lens sheet were fixed to one edge of the flat panel display 110, the thermal expansion would shift the MV pixels 102 on the opposite unfixed edge much more than those on the constrained edge. Third, a sheet made of optical material may provide paths for stray light to pass parallel to the flat panel display 110, passing from one MV pixel 102 to another. Finally, there may be significant manufacturing challenges in molding a large sheet of precision lenses with arbitrary surfaces on both sides. As set forth below, MV display devices 100 according to the present disclosure overcome those issues.

Holding multiple sheets of lenses a constant distance away from each other may be challenging. FPDs can be quite large, and sheets of that size may exhibit significant sag. This could be overcome to some degree by holding the sheets under high tension from the edges. But this solution causes its own problems, including stretch of the lens sheet, and a need for a large mechanical frame that would cause large gaps in a tiled system. The present disclosure overcomes these two issues by including self-aligning features in the area between lenses that help maintain precise alignment. Those features will be described in detail below with reference to FIGS. 6-14.

One way of preventing sag is to limit the size of the sheets to something small, and then tile these pieces together. In exemplary embodiments, the lenses are constructed in 4×4 lens assemblies 132 which are held in place via a system of supporting rails 134, 136, as shown in FIGS. 6 and 7A-7C.

Figure 6:
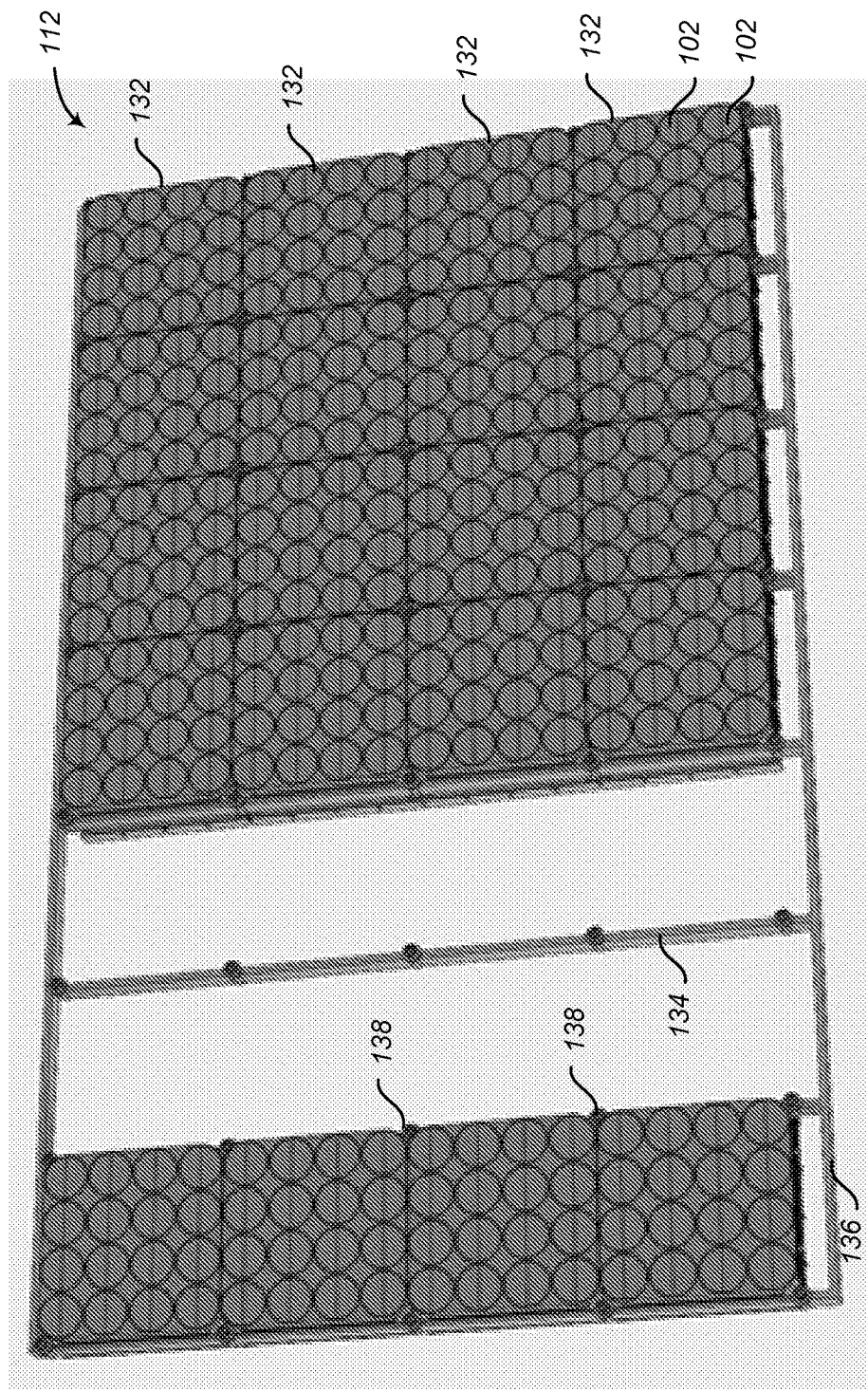
FIG. 6 is a front, perspective view of a lens array panel including a plurality of lens assemblies according to one or more embodiments of the present disclosure.

FIG. 6 is a front, perspective view of a lens array panel 112 according to one or more embodiments of the present disclosure. The lens array panel 112 includes a tiled array of lens assemblies 132, each including sixteen MV pixels 102. In the example shown in FIG. 6, the lens array panel 112 includes seven columns each including four lens assemblies 132; however two of the columns are removed to make the supporting mechanical structure visible. The lens array panel 112 may include other quantities of lens assemblies 132 arranged in other configurations without departing from the scope of the present disclosure. A mechanical support structure was designed specifically such that its size and form were guided by available space in a lens assembly 132 itself as well as between lens assemblies 132. This allows for maximizing of lens apertures.

In one or more embodiments, the support structure includes a plurality of vertical rails 134 and a plurality of horizontal rails 136. For example, the vertical and horizontal rails 134,136 may be integrally formed, or soldered together. Each of the vertical rails 134 has a plurality of apertures formed therein, wherein a plurality of internal threads is formed in each aperture. The lens assemblies 132 are coupled to the vertical rails 134 using a plurality of screws 138 having external threads. After the lens assemblies 132 are placed on the vertical and horizontal rails 134,136, the screws 138 are inserted into the apertures formed in the vertical rails 134 and rotated, which causes the heads of the screws 138 to move toward the vertical rails 134 until the heads of the screws 138 contact the lens assemblies 132 and securely fasten (hold) them to the vertical rails 134.

In one or more embodiments, multiple lens assemblies 132 are tiled together to form a lens array panel 112 that covers the flat panel display 110. The lens array panel 112 includes features that aid in the alignment of the lens assemblies 132. It should be noted that other sizes of arrays and specific details of shapes can be modified and fall within the scope of this disclosure.

Figure 7A:
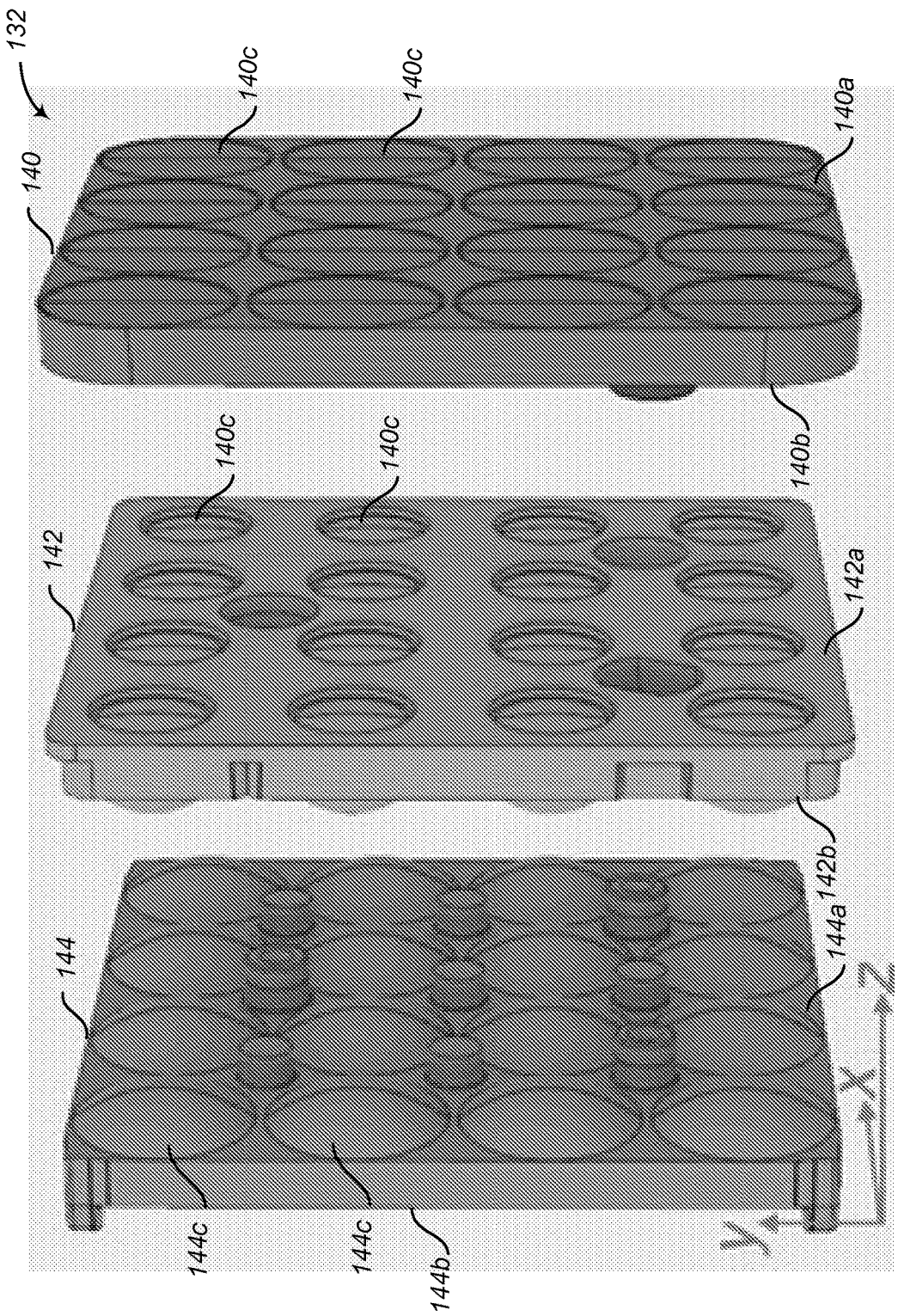
FIGS. 7A-7C are exploded, side perspective views of a lens assembly including three lens arrays (first, second and third lens arrays) according to one or more embodiments of the present disclosure.
Figure 7B:
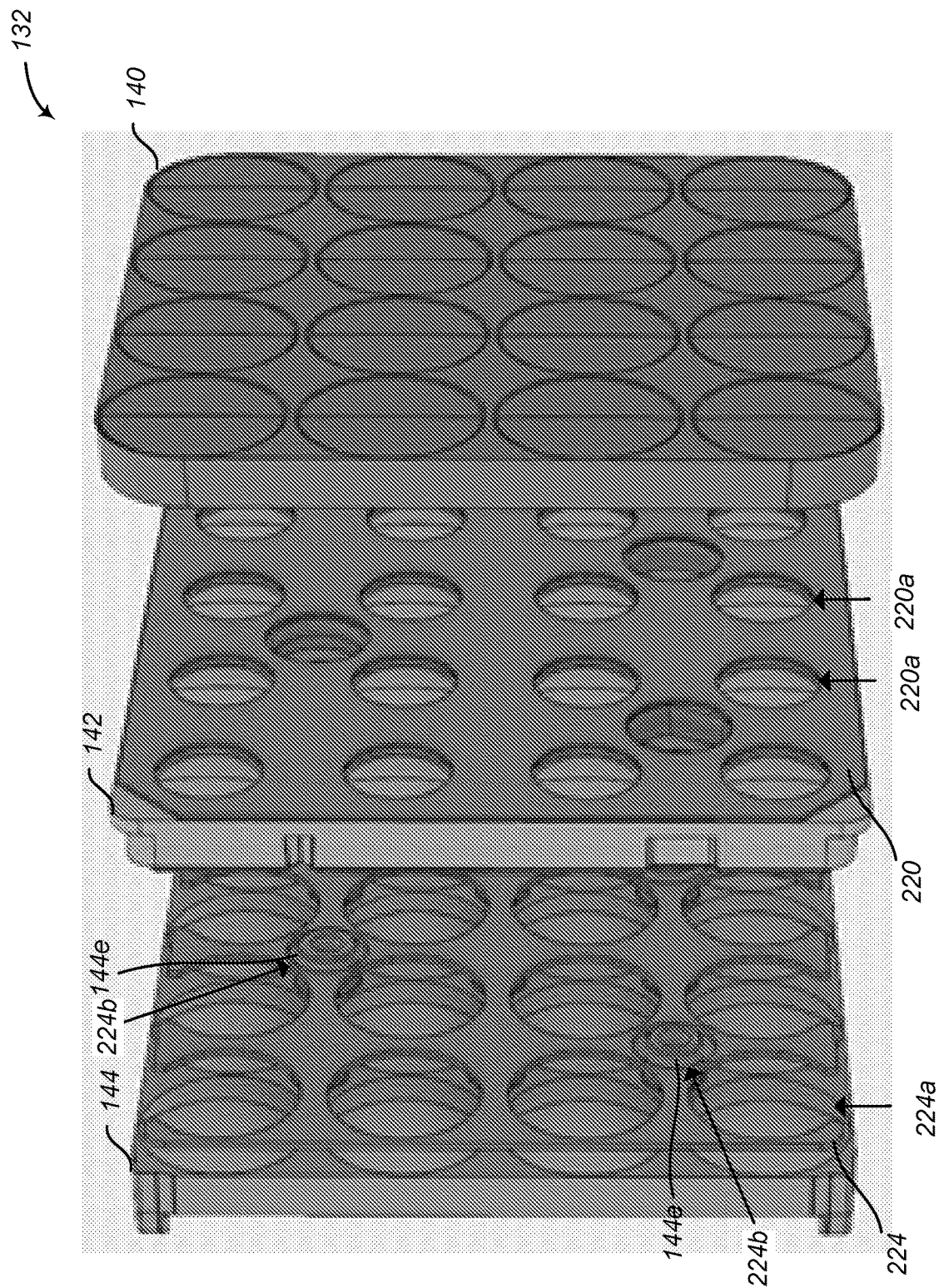
Figure 7C:
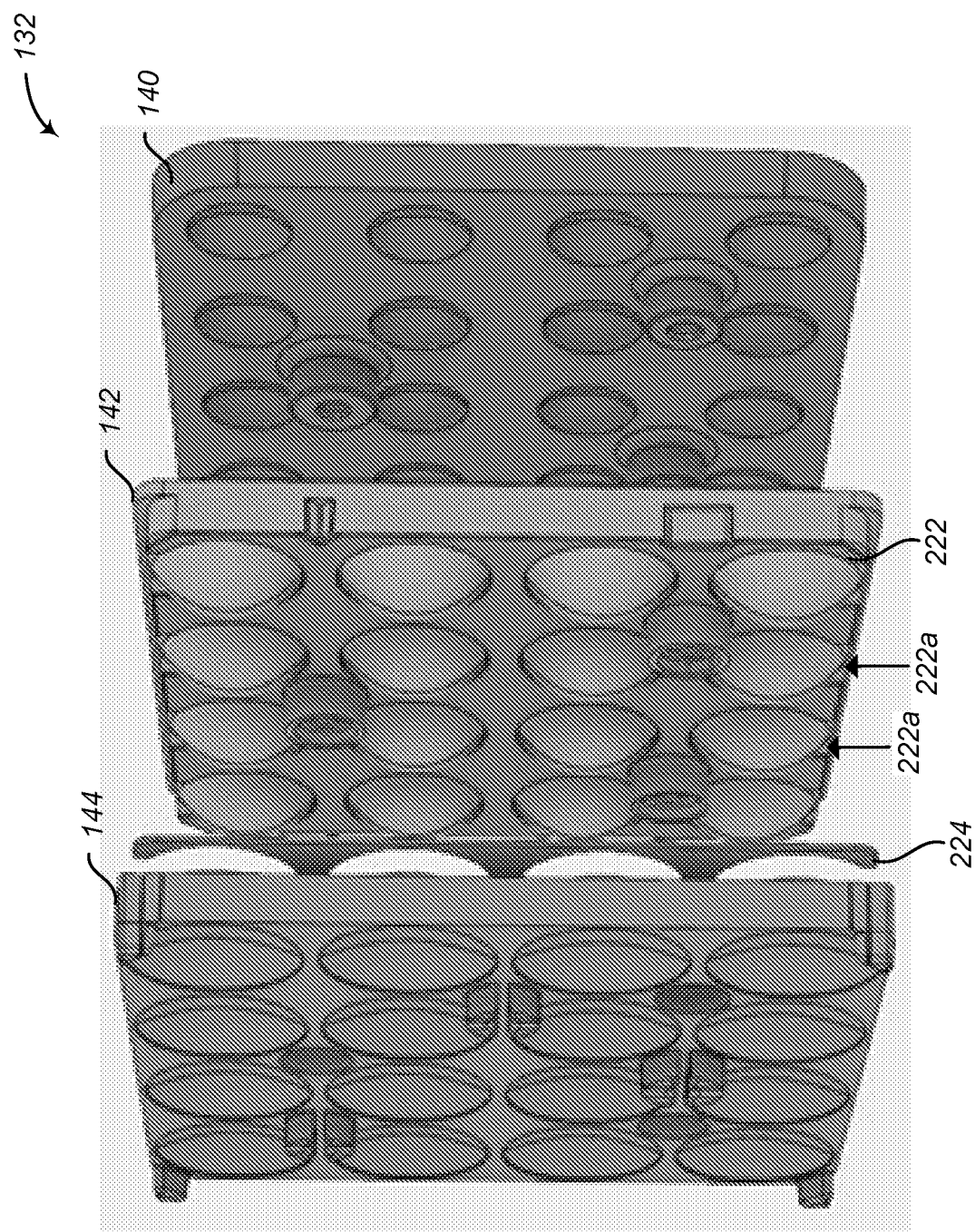
Figure 8A:
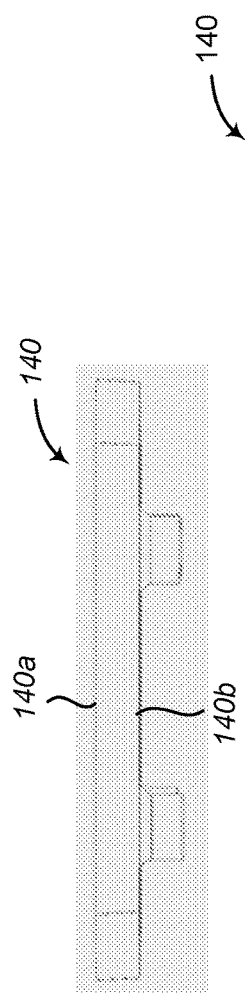
FIGS. 8A-8D are orthographic views of a first lens array according to one or more embodiments of the present disclosure.
Figure 8B:
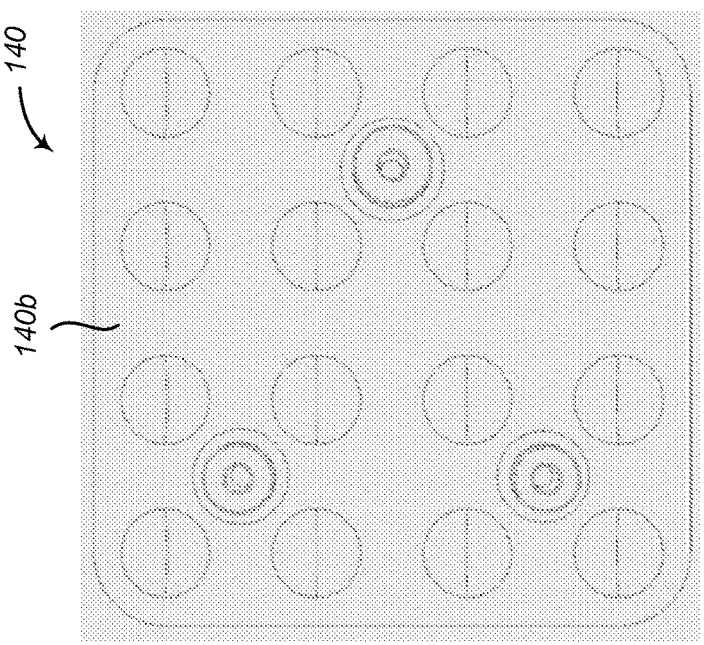
Figure 8C:
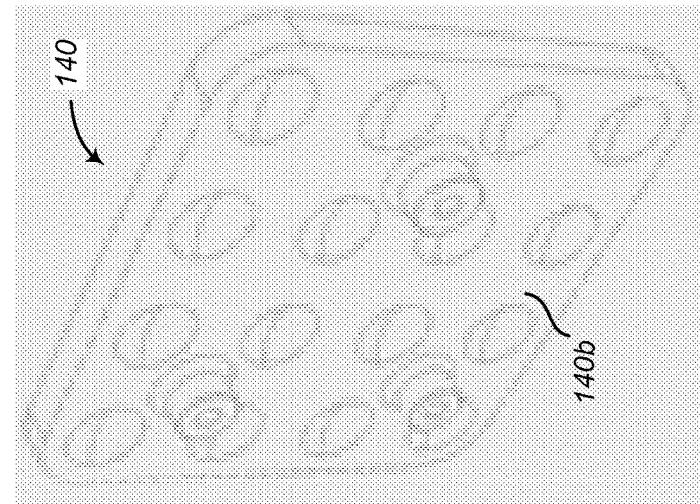
Figure 8D:
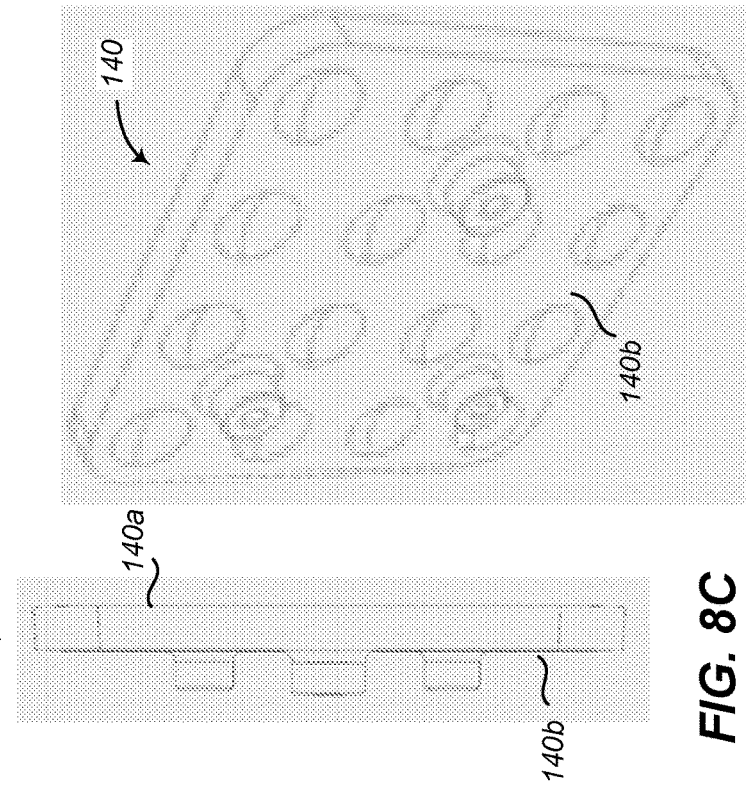

FIGS. 7A, 7B, and 7C are exploded, side perspective views of a lens assembly 132 according to one or more embodiments of the present disclosure. The lens assembly 132 is an optical system with a three-element, 4×4 lens array, wherein the three elements comprise a first lens array 140, a second lens array 142, and a third lens array 144. The first lens array 140 includes a first side 140a and a second side 140b that is opposite the first side 140a of the first lens array 140. The first lens array 140 also includes sixteen lenses 140c arranged in a 4×4 array. The second lens array 142 includes a first side 142a and a second side 142b that is opposite the first side 142a of the second lens array 142. The second lens array 142 also includes sixteen lenses 142c arranged in a 4×4 array. The third lens array 144 includes a first side 144a and a second side 144b that is opposite the first side 144a of the third lens array 144. The third lens array 144 also includes sixteen lenses 144c arranged in a 4×4 array. When assembled, the lens assembly 132 includes sixteen MV pixels 102, wherein each MV pixel 102 is formed by one of the lenses 140c of the first lens array 140, one of the lenses 142c of the second lens array 142, and one of the lenses 144c of the third lens array 144 that are stacked on top of each other, as well as by a sub-array of display pixels underlying the stack of the three lenses 140c, 142c, and 144c. In the present description, the individual lenses (140c, 142c, and 144c) are formed by the array surfaces illustrated in the figures and their corresponding opposite surfaces which may or may not be illustrated depending on the view angle of the figures.

When the MV display device 100 is assembled, the flat panel display 110 is located behind the second side 144b of the third lens array 144, at or near the imaging plane; and viewers would be located in front of the first side 140a of the first lens array 140. As described below, the first lens array 140, second lens array 142, and third lens array 144 form a multi-element (triplet) optical system (or lens system).

FIGS. 8A-8D are orthographic views of the first lens array 140 according to one or more embodiments of the present disclosure. FIGS. 9A-9D are orthographic views of the second lens array 142 according to one or more embodiments of the present disclosure. FIGS. 10A-10D are orthographic views of the third lens array 144 according to one or more embodiments of the present disclosure.

Each lens assembly 132 needs to have its mechanical degrees of freedom constrained with respect to the flat panel display 110, as well as the other lens assemblies 132. This is accomplished using several features. A rail system as described above in reference to FIG. 6 is used to constrain both the FPD-to-lens spacing as well as the roll, pitch, and yaw (rotation about the x, y, and z axes respectively) of each lens assembly 132. The rail system also serves to mechanically secure the lens assemblies 132 within the enclosure (i.e., rear cover 106 and front cover 108). The rail system design is motivated, in part, to minimize its physical volume as this volume may not be co-occupied by the optical system. Lens apertures can remain as large as possible facilitating high fill factors (the amount of the FPD 110 covered by all lens assemblies 132) and throughput.

To meet the design goal of having the largest fill factor as possible, the individual lenses within a lens assembly 132 are very closely abutted. This may have the effect of leaving very little space between each lens within the array, which drives the need for a mounting system that takes up very little space within the lens assembly. Further, the lens assemblies 132 are tiled in such a fashion that many of the lens assemblies 132 are "landlocked," meaning they are completely surrounded by other lens assemblies 132. In exemplary embodiments, the mounting system for the lens assemblies 132 includes a set of rails 134, 136 (see FIG. 6) that run across the flat panel display 110 in its entirety. The lens assemblies 132 sit atop the rails 134, 136 and are subsequently fixed to them, as described above. Other possibilities for mounting the lens assemblies 132 include fixturing them to the front aperture array provided by the front cover 108 of the enclosure. Fixturing schemes such as this are considered within the scope of the invention.

Figure 11:
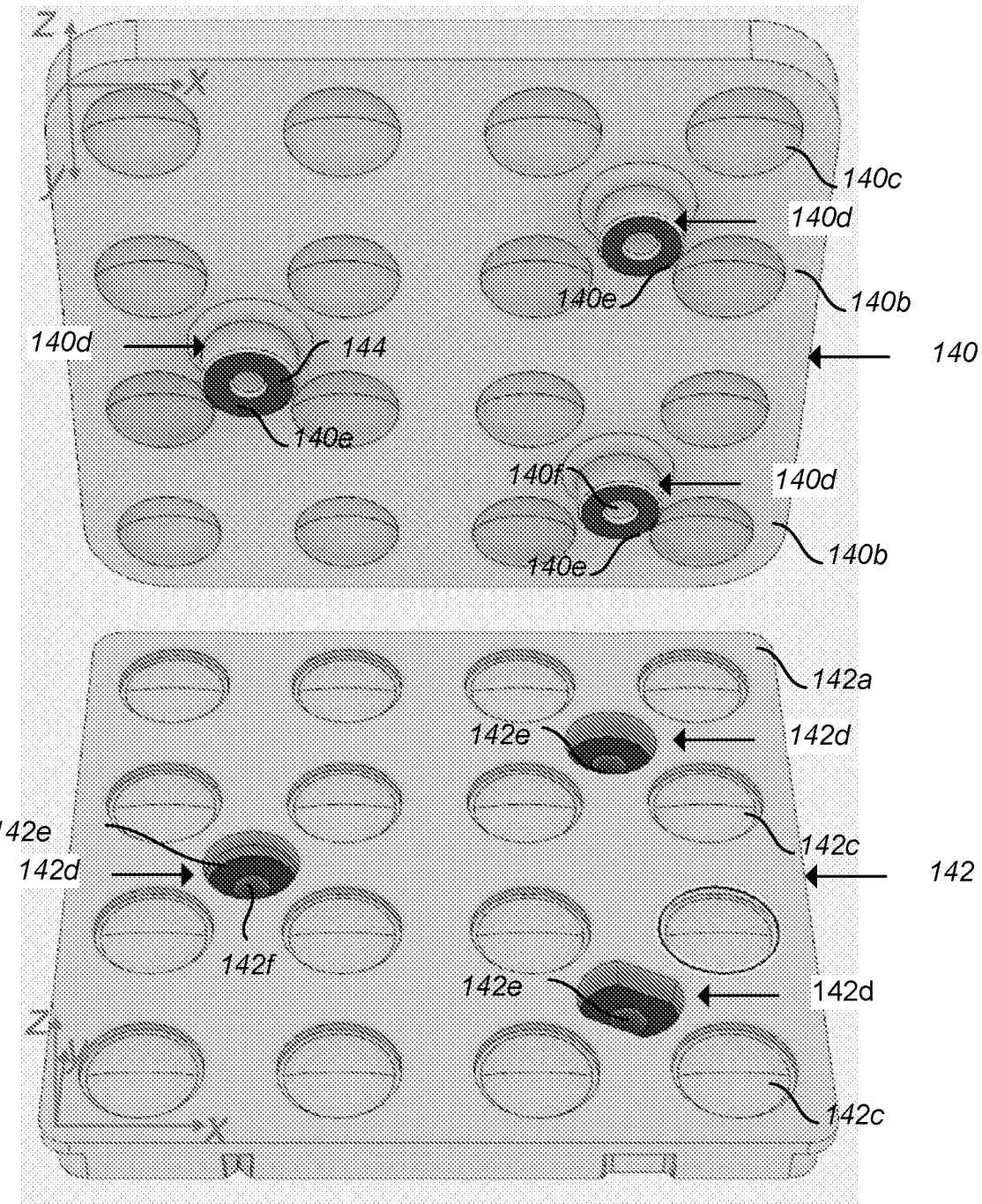
FIG. 11 is a perspective view showing the back of a first lens array and the front of a second lens array according to one or more embodiments of the present disclosure.

Kinematic mounting features are incorporated into interfaces between pairs of the lens arrays 140, 142, 144. FIG. 11 is a perspective view showing the back or second side 140b of the first lens array 140 and the front or first side 142a of the second lens array 142. The first lens array 140 shown in FIG. 11 includes sixteen lenses 140c; however, the first lens array 140 may include a different quantity of the lenses 140c without departing from the scope of the present disclosure. A plurality of bosses or posts 140d extend from a surface at the second side 140b of the first lens array 140. A mating surface 140e is disposed at a distal end of each of the posts 140d. Each of the posts 140d has an aperture 140f formed therein.

The quantity of the lenses 142c included in the second lens array 142 is the same as the number of lenses 140c included in the first lens array 140. A plurality of cylindrical or truncated cylindrical holes 142d extends into a surface at the first side 142a of the second lens array 142. A mating surface 142e is disposed at the bottom of each of the holes 142d. The posts 140d of the first lens array 140 are inserted into corresponding holes 142d of the second lens array 142 until the mating surfaces 140e, 142e abut each, thereby constraining motion along the z-axis (or optical axis) of the lens arrays 140, 142 and as well as the roll (rotation about the x-axis) and pitch (rotation about the y-axis) degrees of freedom.

Figure 12:
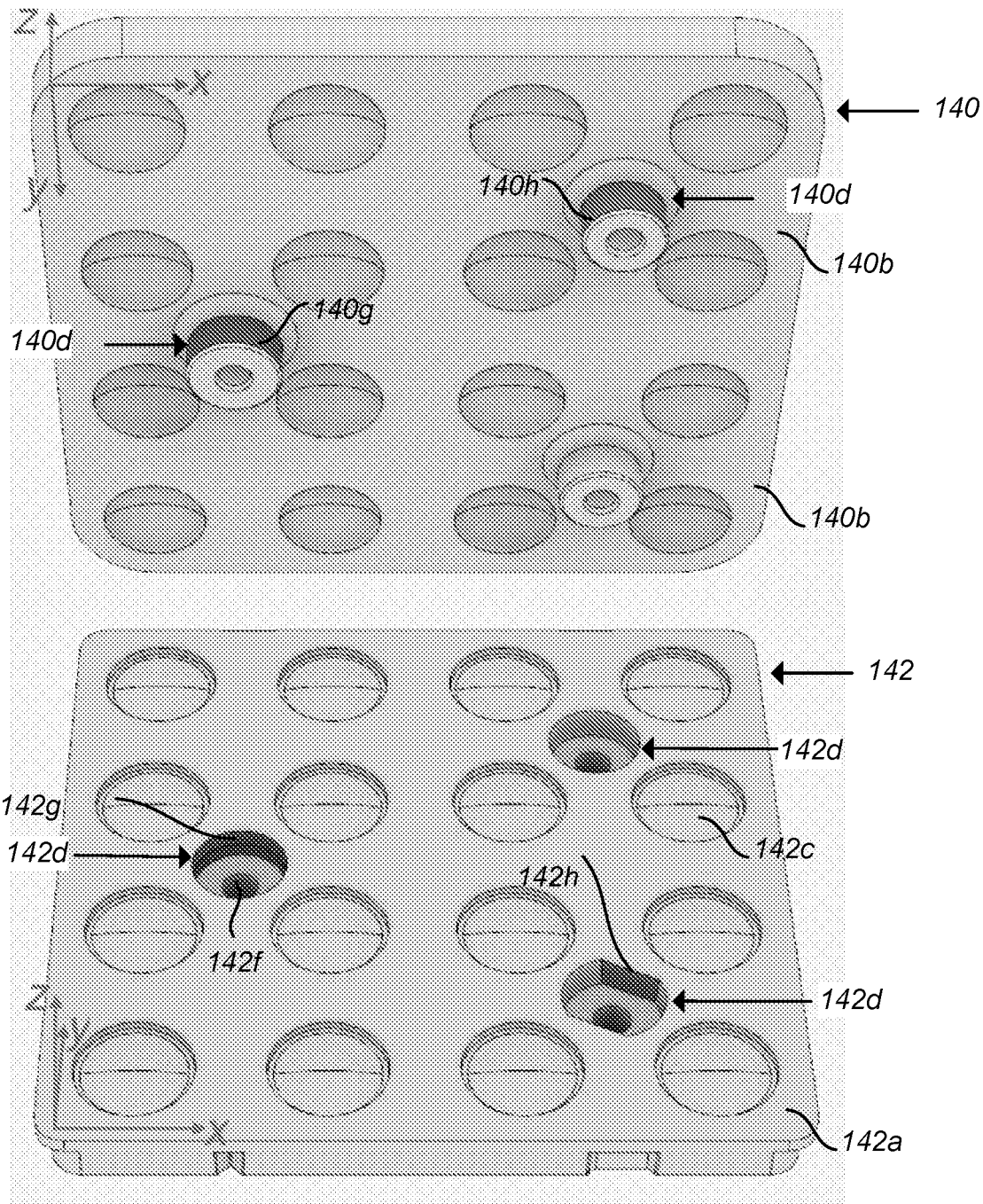
FIG. 12 is a perspective view showing the back of a first lens array and the front of a second lens array according to one or more embodiments of the present disclosure.

FIG. 12 is a perspective view showing the back or second side 140b of the first lens array 140 and the front or first side 142a of the second lens array 142. One of the posts 140d includes an outer cylindrical mating surface 140g, and another of the posts 140d includes an outer cylindrical mating surface 140h. Each of the holes 142d has an aperture 142f formed therein. One of the holes 142d includes an inner cylindrical mating surface 142g, and another of the holes 142*d* includes an inner, truncated cylindrical surface having two flat mating surfaces 142*h* (only one of which can be seen in FIG. 12).

When the posts 140*d* of the first lens array 140 are inserted into corresponding holes 142*d* of the second lens array 142, the outer cylindrical mating surface 140*g* abuts the inner cylindrical mating surface 142*g*, thereby constraining the x and y-axis degrees of freedom between these two lens arrays 140, 142. Additionally, the outer cylindrical mating surface 140*h* abuts the mating surfaces 142*h*, thereby constraining yaw, or rotation about the z-axis (optical axis), between the two lens arrays 140, 142.

Figure 13A:
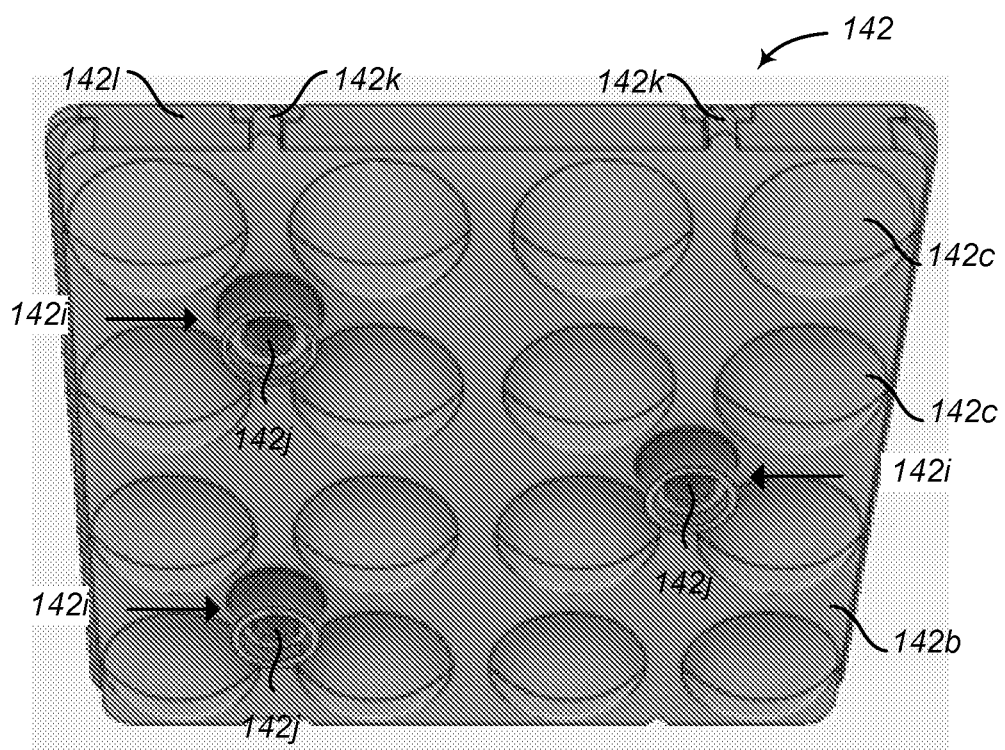
FIGS. 13A and 13B are side perspective views of a second lens array.
Figure 13B:
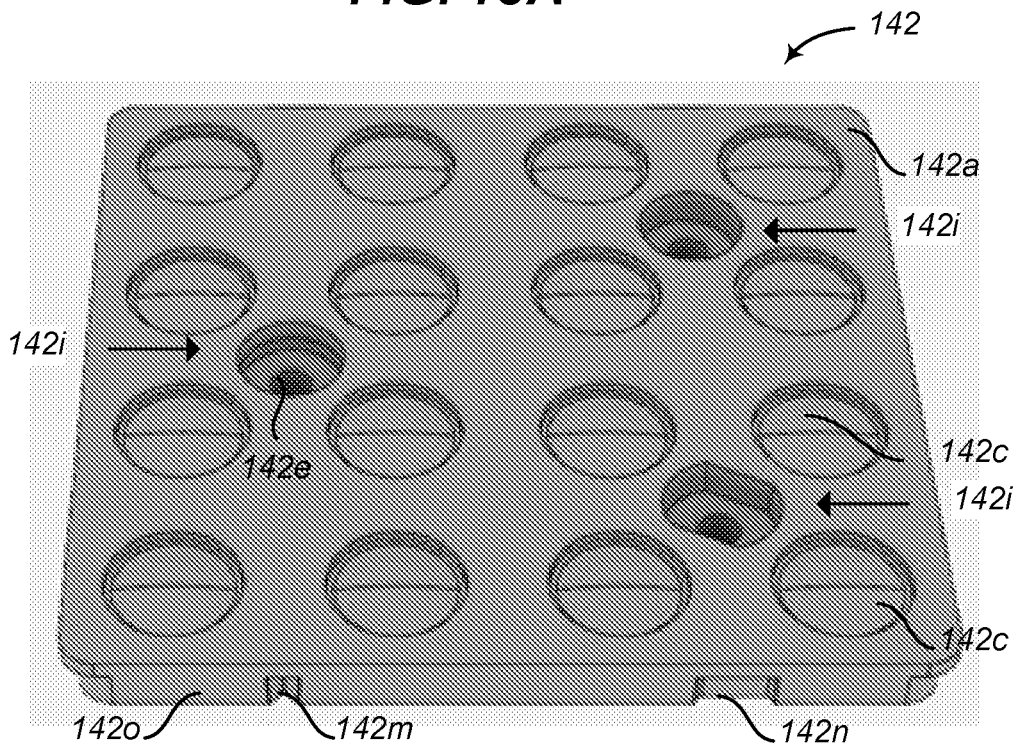
Figure 13C:
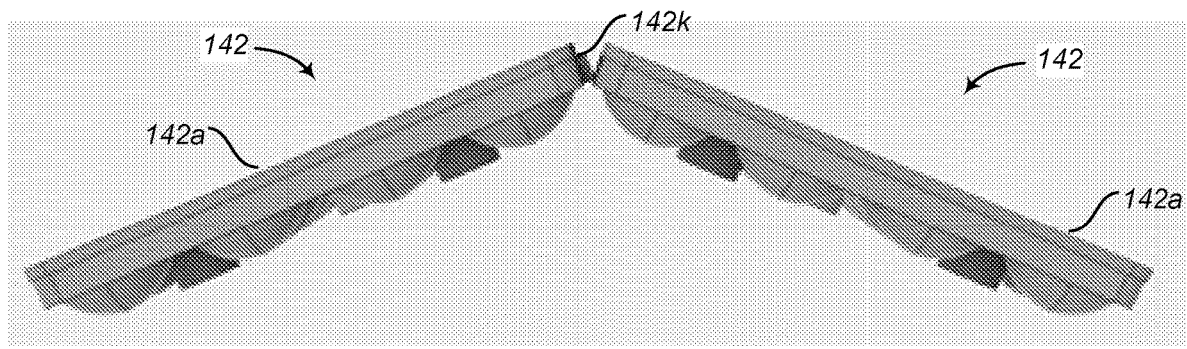
FIGS. 13C-13E are perspective views of two of the second lens arrays according to one or more embodiments of the present disclosure.
Figure 13D:
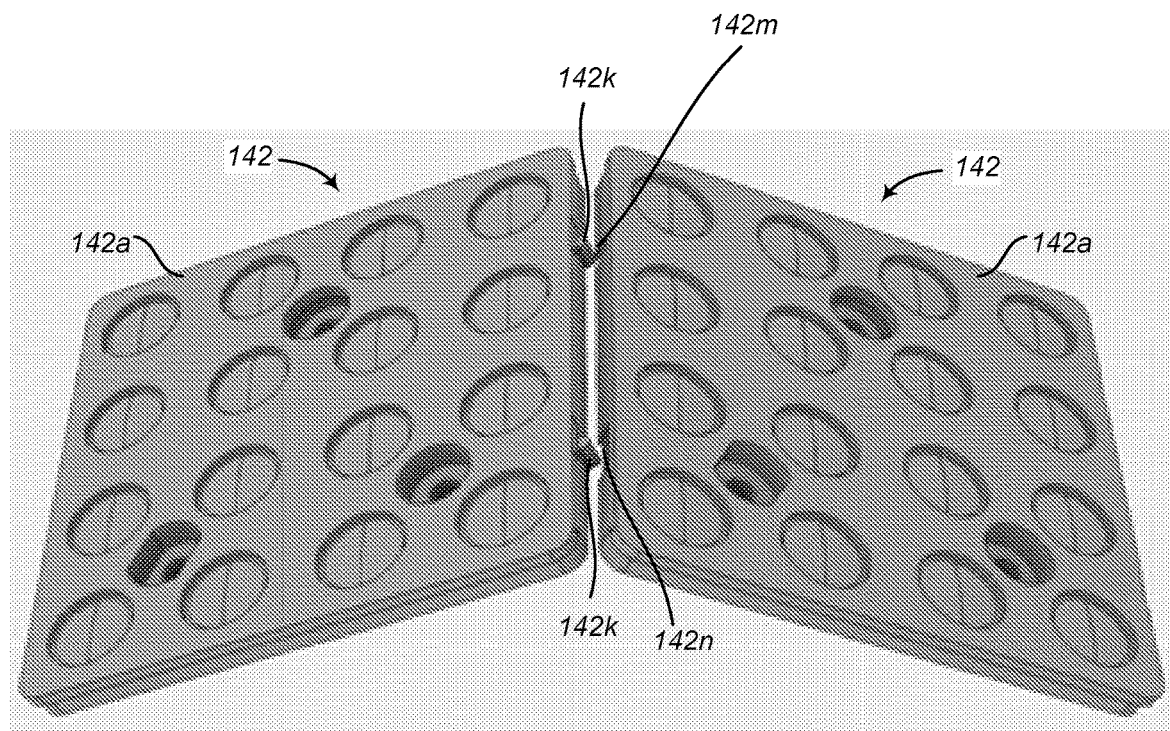
Figure 13E:
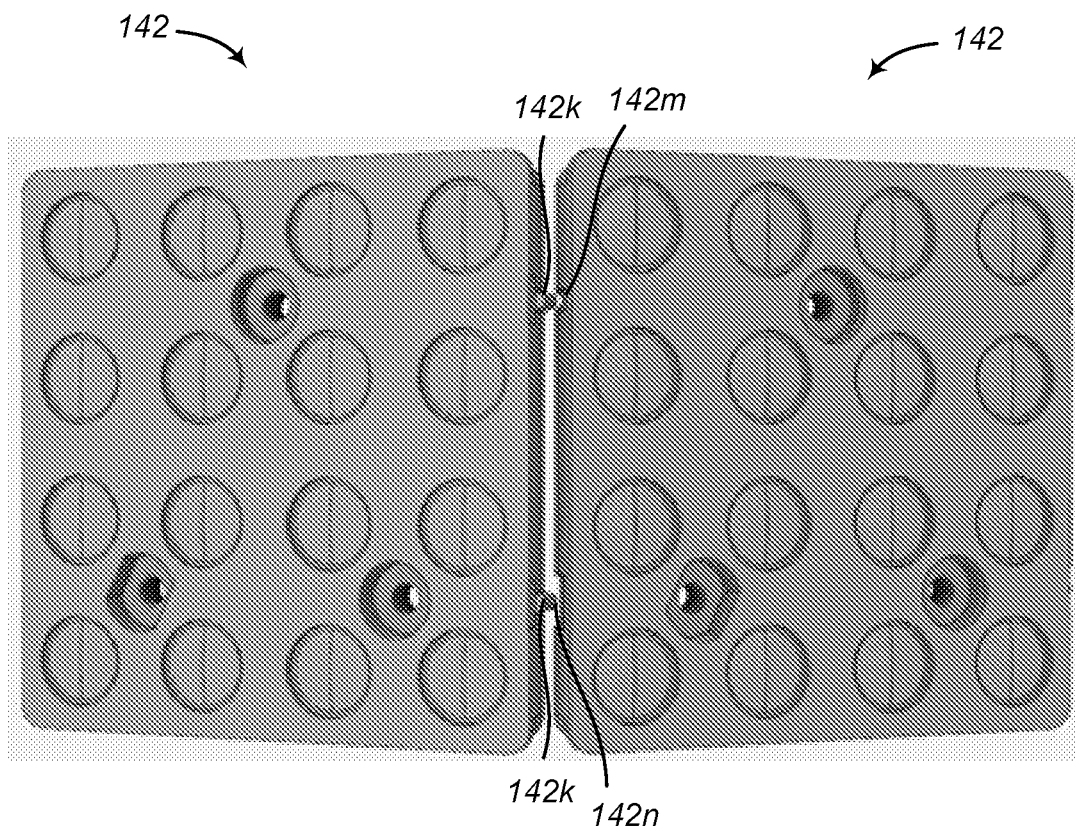

FIGS. 13A and 13B are side perspective views of a second lens array 142, and FIGS. 13C, 13D, and 13E are perspective views of two of the second lens arrays 142 according to one or more embodiments of the present disclosure. As shown in FIG. 13A, a plurality of bosses or posts 142*i* extend outwardly from a surface at the second side 142*b* of the second lens array 142. Each of the posts 142*i* has an aperture 142*j* formed therein. A pair of cylindrical protrusions 142*k* extend from a first side surface 142*l* of the second lens array 142. As shown in FIG. 13B, a first indentation 142*m* and a second indentation 142*n* are formed in a second side surface 142*o* of the second lens array 142. The first side surface 142*l* and the second side surface 142*o* are on opposite sides of the second lens array 142. In one or more embodiments, the first indentation 142*m* has a "V" shape and the second indentation 142*n* has a flat surface at a bottom thereof. The second lens arrays 142 shown in FIGS. 13C, 13D, and 13E are shown nearly mated with each other, and are open like a book. When the second lens arrays 142 are mated with each other, the cylindrical protrusions 142*k* are disposed within the first indentation 142*m* and the second indentation 142*n*.

The rail system described above (see FIG. 6) serves to mount, constrain the z and y-axes of, and constrain roll, pitch, and yaw of the lens assemblies 132. The vee-flat-cylinder features (142*m* and 142*n*) serve to constrain the x-axis of the lens assemblies as well as constrain any two adjacent lens assemblies 132 (column wise) to have co-similar roll, pitch, and yaw. It should be noted that other placement and configurations of these features may accomplish the same goals and are considered within the scope of this disclosure.

FIG. 14 is a partial, cross-sectional view of a lens assembly 132 according to one or more embodiments of the present disclosure. After the posts 140*d* of the first lens array 140 are inserted into corresponding holes 142*d* of the second lens array 142, and the posts 144*d* of the third lens array 144 are inserted into the apertures 142*j* of the posts 142*i* of the second lens array 142, three screws 146 are inserted from the second side 144*b* of the third lens array 144, passed through the second lens array 142, and threaded into an internal bore of the posts 140*d* of the first lens array 140. This enables axial compression forces to be applied on the three lens arrays 140, 142, and 144, thereby constraining their precision alignment. One of the screws 146 that holds the lens arrays 140, 142, and 144 of the lens assembly 132 is shown in FIG. 14.

Finally, as in any optical system, the ability to adjust focus may be desirable. In some embodiments, the distance between the flat panel display 110 and the lens array panel 112 may be adjusted by the placement of shims between the flat panel display 110 mounting features and their respective seats. In the enclosure of the MV display device 100, the flat panel display 110 is mounted to a rigid plate to ensure that the flat panel display 110 remains planar. This rigid plate is then mounted to the enclosure itself (e.g., rear cover 106). Shims may be added or removed from this mechanical connection in order to adjust focus, or the distance between the lens assemblies 132 of the lens array panel 112 and the flat panel display 110.

Stray Light Management Techniques

Internal Baffles

Many optical systems are comprised of a series of lenses placed axially in relation to each other to achieve a desired optical performance. In that scenario, the lenses are often placed in a black barrel. The black barrel aides in blocking undesired light from entering the optical system, which may introduce ghost images, hot spots, and contrast reduction. In exemplary embodiments, an array of lenses (e.g., lens assembly 132) is used, which is formed of multiple (e.g., three) lens arrays 140, 142, 144 that are stacked together, in which it may be difficult to provide a black barrel structure for each of the 4×4 array of 16 lenses (or 16 lens systems). One possible avenue for stray light in the lens assembly 132 is light entering the surface of the lens assembly 132, propagating internally like a waveguide, and then exiting a different surface of the lens assembly 132. This is undesirable as now there are rays propagating into space, which cannot be calibrated since their exact origin is unknown. To reduce this "channel crosstalk", some embodiments use a series of grooves or recesses 140*i* that act as internal baffles for the lens assemblies 132.

FIGS. 15A and 15B are cross-sectional views of the first lens array 140 according to one or more embodiments of the present disclosure. More particularly, FIG. 15A is a cross-sectional view of the first lens array 140, and FIG. 15B is a perspective view of the cross-section shown in FIG. 15A. As shown in FIG. 15B, the first lens array 140 includes a plurality of grooves or recesses 140*i* formed into a surface at the second side 140*b* of the first lens array 140. One of the grooves 140*i* is disposed between each pair of adjacent lenses 140*c* of the first lens array 140.

Along with painting of certain surfaces that will be discussed more in depth below, these internal baffles provided by the recesses 140*i* block light propagating in an undesirable manner within the slab of the lens assembly 132. These grooves/recesses 140*i* extend outwardly from a surface at the second side 140*b* of the first lens array 140, within the material of the first lens array 140. This has the effect of optically isolating each lens 140*c* within the first lens array 140, from a channel crosstalk point of view. It should be noted that other shapes and configurations are possible for these internal baffles 140*i* and are considered within the scope of this invention.

Painting of Surfaces

To further address stray light as well as visual appearance, as this is inherently a visual instrument, several surfaces of the first lens array 140 may be coated with a light-absorbing coating 148, for example, black paint. In one or more embodiments, the light-absorbing coating 148 absorbs a specific portion of the light incident thereon, for example, red paint or coating, or a substantial portion of the light incident thereon, for example, black paint or coating.

Figure 16A:
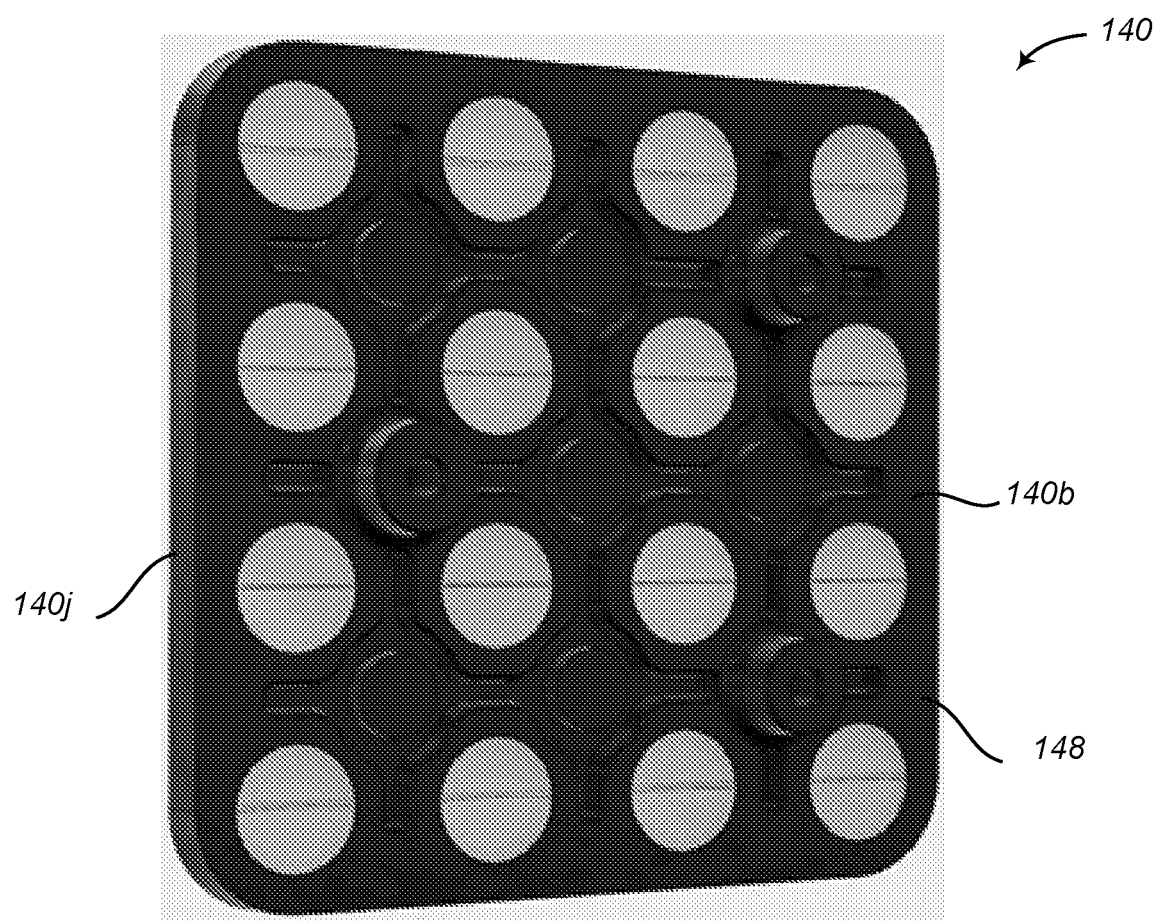
FIG. 16A is a perspective view of a first lens array with a coating applied thereto according to one or more embodiments of the present disclosure.

FIG. 16A is a perspective view of the first lens array 140 with the light-absorbing coating 148 applied on the second side 140*b*, according to one or more embodiments of the present disclosure. Surfaces that are coated by the light-absorbing coating 148 include the edges 140*j* of the first lens array 140, the flat surfaces of the second side 140*b* to which the lenses 140*c* meet, the internal baffles/grooves 140*i*, and the bosses 140*d* (both internal and external bores).

Alternative methods to achieve similar ends include bonding of a black material to these surfaces, and two-part injection molding, which are considered within the scope of the present disclosure.

While painting of surfaces can achieve the desired effect, the process of painting specific areas of the lens array may prove challenging. Other methods that can achieve black surfaces in molded lens areas include "overmolding" and "in-mold decorating" described below.

Overmolding and in-Mold Decorating of Lens Arrays

In one embodiment, a part (of a lens array) may be molded from a non-transparent media, then have its optical surfaces of/around that part molded from transparent media. This process can either be done as two steps in the same molding process, or as separate molding processes with the part molded in the first process thereafter placed into the mold for the second process.

In another embodiment, when the molding media such as polymer plastic is deposited in the mold for producing a part (of a lens array), an opaque film may be placed in the mold before the mold is closed such that the film will be registered and adhered to the molded part. Those with ordinary skill in the art will recognize this technique for applying decoration to molded plastic consumer goods. Typically, the film is fed from roll-to-roll during the time that the mold is open and secured to one side of the mold using a vacuum system. Typically precise registration is required in order to form precise apertures for each optic in the lens array.

Figure 16B:
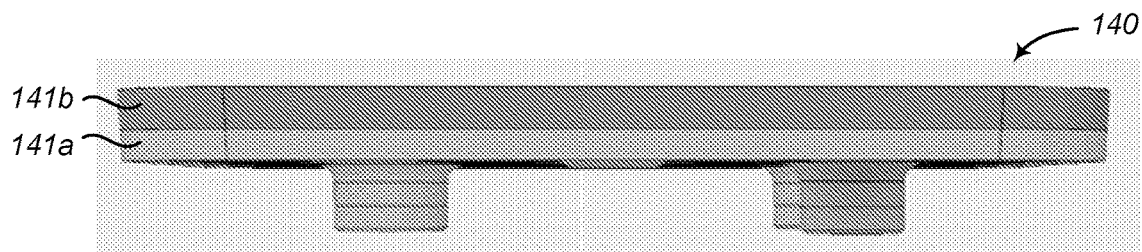
FIGS. 16B-16D illustrate overmolding of the lens array, which serves to eliminate the coating/painting step applied to produce the first lens array 140 of FIG. 16A.
Figure 16C:
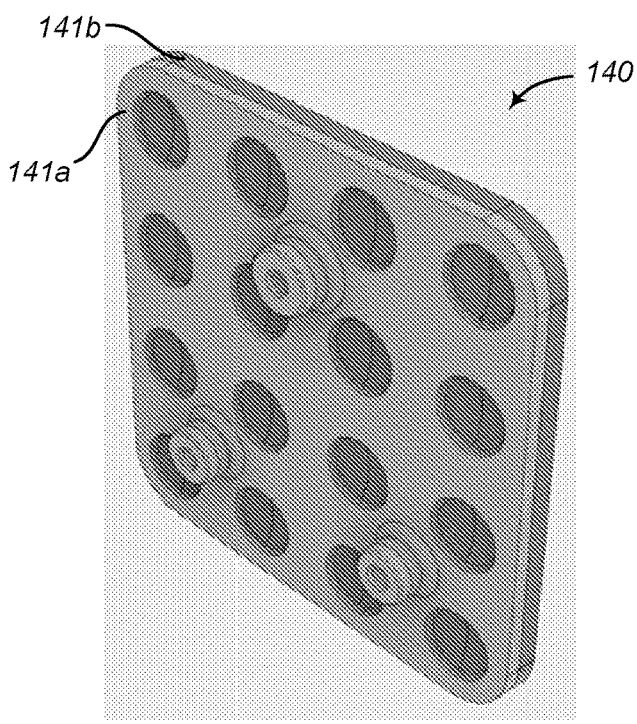
Figure 16D:
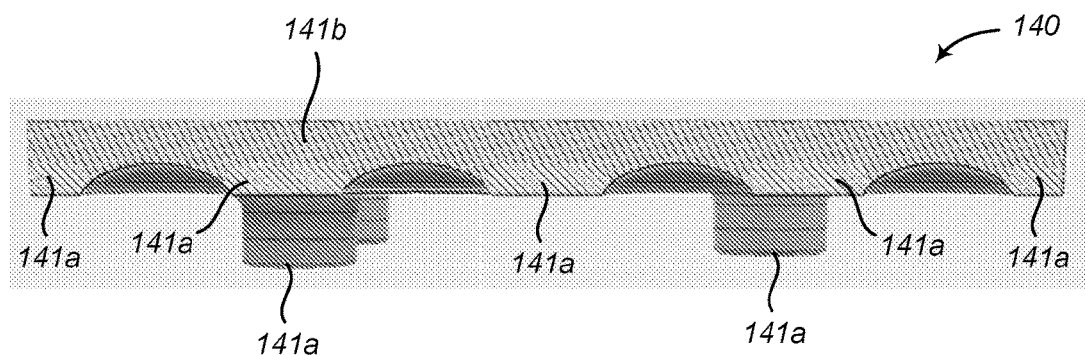

FIGS. 16B-16D illustrate overmolding of the lens array, which serves to eliminate the coating/painting step applied to produce the first lens array 140 of FIG. 16A.

FIGS. 16B and 16C are a side view and a perspective view, respectively, of the first lens array 140 consisting of an opaque part 141a and a transparent part 141b. The opaque part 141a, molded from opaque media, includes kinematic mounting features, described previously. The transparent part 141b is formed by molding transparent media over, or around, the opaque part 141a.

FIG. 16D is a section view of the over-molded first lens array 140 as shown in FIGS. 16B and 16C. Over and around the opaque part 141a molded from opaque media is the transparent part 141b over-molded from transparent media to form the optical surfaces of respective lenses in the first lens array 140. FIG. 16D is taken at the center of a row of lenses in the first lens array 140. Different relative thicknesses of the opaque part 141a and the transparent part 141b are within the scope of the invention.

Painting Prior to Anti-Reflection Coating

During manufacture of an optical system, as discussed above, a series of lenses are typically placed into a black cylindrical housing. A multi-element lens assembly employs different approaches to common issues. One example of this is in the normal manufacture of a lens element, the lens is ground or molded from glass or plastic, as an example. Then the optical element may have an optical coating applied. For example, an anti-reflection (AR) coating or specific bandpass coating may be applied. Finally, the lens may have its edges painted black. Although it is common for lenses to be placed into a black housing, painting the edges of the lens black can help with stray light concerns.

In the present disclosure, the typical order of operations may cause undesirable effects. Therefore, it may be desirable to change the normative order of operations. Namely, in some exemplary embodiments, elements (e.g., the first lens array 140) of the lens assemblies 132 have their shapes defined first, then all painting operations of the light-absorbing coating material are performed, finally the optical (e.g., anti-reflection or bandpass) coating is applied. In the case of an AR coating with typical characteristics of very low reflectance over the visible spectrum, this has the effect of producing a visually darker black when looking at the lens assemblies 132 as less light is reflected and makes it back to the observer. If the AR coating is applied first followed by surface painting, color artifacts may be present and surfaces painted a given color may appear differently. This is due to the optical interface that is created between an AR coating and black paint, for example. It should be noted this is a general technique that may be applied to other coating and surface finishing solutions.

Aperture Arrays

Opaque apertures may be used for both managing stray light and defining the aperture stop and pupils of an optical system. The MV display device 100 may utilize three aperture arrays 220, 222, 224 integrated into the lens assembly 132, as shown in FIGS. 7B and 7C. These aperture arrays 220, 222, 224 overcome manufacturing challenges with creative shapes and placement. As shown in FIG. 7C, the aperture array 222 may be bonded to a surface at the second side 142b of the second lens array 142. This aperture array serves as the aperture stop of the sixteen optical systems (i.e., sixteen compound lenses formed by each stack of lenses 140c, 142c, 144c) in the lens assembly 132. As additionally illustrated in FIG. 7B, the two other aperture arrays 220, 224 are placed over the first side 142a of the second lens array 142 and the first side 144a of the third lens array 144, respectively, such that stray light paths through the lens assembly 132 are blocked. Other methods for achieving such ends are placement of individual apertures for each sub-optical system (e.g., each lens assembly 132), painting or coating certain surfaces black, and using dissimilar materials in two manufacturing steps such as two-shot injection molding.

As shown in FIGS. 7B and 7C, the lens assembly 132 includes the first aperture array 220 that includes a plurality of apertures 220a arranged in a 4×4 array. The lens assembly 132 also includes the second aperture array 222 that includes a plurality of apertures 222a arranged in a 4×4 array. In addition, the lens assembly 132 includes the third aperture array 224 that includes a plurality of apertures 224a arranged in a 4×4 array. These internal aperture arrays 220, 222, 224 may be fabricated from thin black plastic, but a different material choice is considered within the scope of the invention. Further, other shapes of apertures than those illustrated in FIGS. 7B and 7C are possible and are considered within the scope of the invention.

Figures 10A, 10B, 10C, 10D:
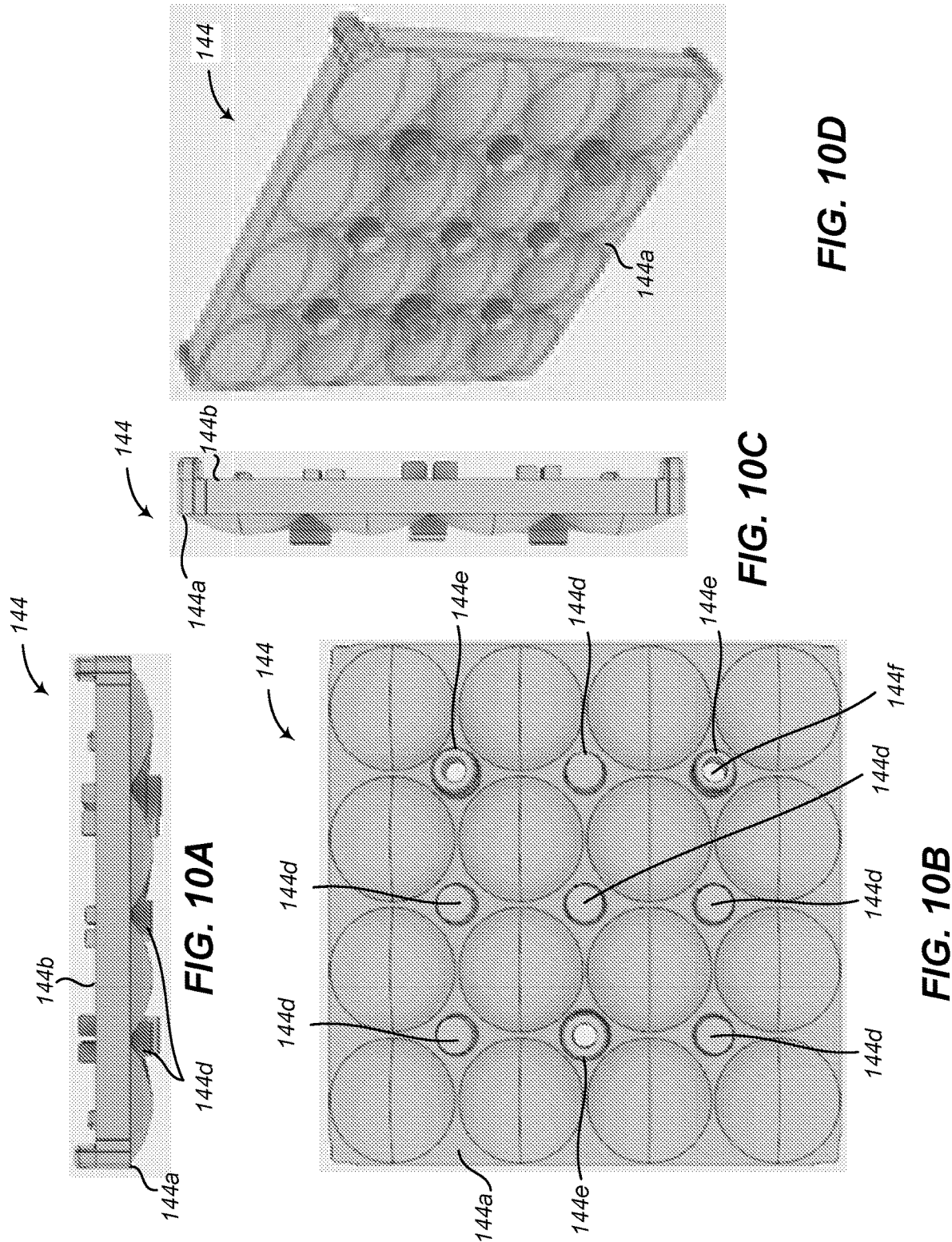
FIGS. 10A-10D are orthographic views of a third lens array according to one or more embodiments of the present disclosure.

The individual lens arrays 140, 142, 144 of the assembly 132 include unique features for supporting, fixturing, and locating of the aperture arrays 220, 222, 224. As shown in FIG. 10B, for example, a plurality of cylindrical first bosses or posts 144d and a plurality of cylindrical second bosses or posts 144e extend outwardly from the first side 144a of the third lens array 144. An aperture 144f is formed in each of the second posts 144e. The first posts 144d are used to support and locate the third aperture array 224, which sits between the second lens array 142 and the third lens array 144. The third aperture array 224 may be bonded to the first posts 144d, for example, using adhesive glue. The second aperture array 222 may be bonded to a surface at the second side 142b of the second lens array 142, for example, using adhesive glue. The first aperture array 220 may be bonded to a surface at the first side 142a of the second lens array 142, for example, using an adhesive glue.

The first posts 144d of the third lens array 144 constrain several degrees of freedom of the third aperture array 224;

namely, motion along the z-axis, as well as roll, pitch, and yaw. The second posts 144e of the third lens array 144 are used for locating and mounting of the second lens array 142 and the third lens array 144 relative to each other. Holes 224b formed in the third aperture array 224 fit over the second posts 144e, as shown in FIG. 7B. The holes 224b and the second posts 144e constrain the third lens array 144 in the x and y axes directions.

Baffles

Figure 17A:
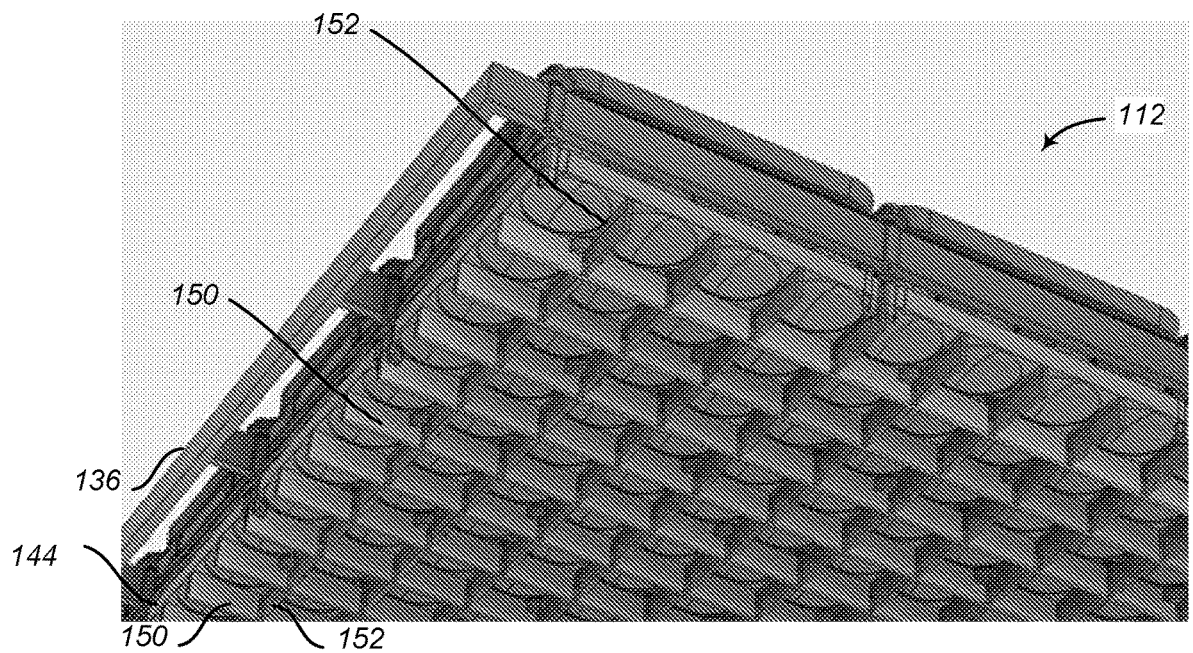
FIG. 17A is a partial, rear perspective view of a lens array panel.

Ideally, each multi-element lens (or lens assembly) 132 only receives light from a section of the flat panel display 110 that is assigned to it. Theoretically one could assume that if the lens system were designed for a certain image height/field-of-view, then the light emanating from outside of the region would not pass through the system. In practice, however, this assumption may not hold true since these rays can cause scattered stray light that does pass through the system as well as causing contrast reduction. Since most FPDs have very large emission profiles, a field stop is not sufficient to address these issues. One solution is to cordon off each lens system (e.g., each lens assembly 132) near the flat panel display 110 with an opaque wall such that light from one lens's FPD region cannot transmit to another lens. To achieve this, as shown in FIG. 17A, baffles 150, 152 may be constructed between the flat panel display 110 and the second side 144b of the third lens array 144. The baffles 150, 152 serve to isolate each lens channel in a given array from other lens channels. The second side 144b of the third lens array 144 includes fixture features 154 to locate and secure the baffles 150, 152 to the third lens array 144, as shown in FIG. 17B.

FIG. 17A is a partial, rear perspective view of the lens array panel 112 according to one or more embodiments of the present disclosure. In other words, the side of the lens array panel 112 shown in FIG. 17A is the side seen by the flat panel display 110. A plurality of first baffles 150 and a plurality of second baffles 152 are coupled to the second side 144b of the third lens arrays 144.

Figure 17B:
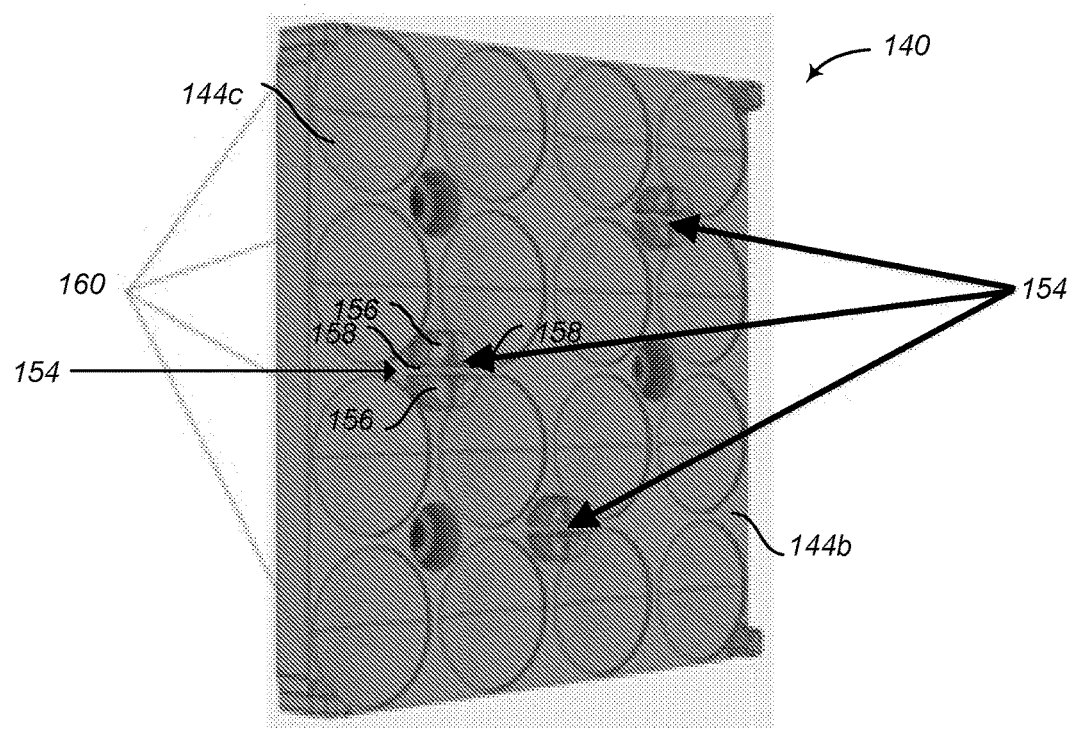
FIG. 17B is a side perspective view of a third lens array according to one or more embodiments of the present disclosure.

FIG. 17B is a perspective view of the second side 144b of the third lens array 144 according to one or more embodiments of the present disclosure. A plurality of first fixtures 154 is provided on a surface at the second side 144b of the third lens array 144. Each fixture 154 is comprised of four walls 156 that extend from the second side 144b, each having the shape of one quarter of a solid cylinder. A slot 158 is formed between adjacent pairs of the walls 156 to receive the first and second baffles 150, 152. The baffles 150, 152 are interlocking to aid in adding rigid structure to the feature.

In one or more embodiments, each of the first baffles 150 includes a plurality of first slots, wherein each of the first slots extends through approximately one-half of the height of the first baffles 150. Additionally, each of the second baffles 152 includes a second slot, wherein the second slot extends through one-half of the height of second baffles 152. Each first baffle 150 is interlocked with a plurality of second baffles 152. The first and second baffles 150, 152 are interlocked at locations of the first and second slots such that portions of the first baffle 150 adjacent to each first slot are disposed around a portion of one of the second baffles 152, and portions of each second baffle 152 adjacent to its second slot are disposed around a portion of the first baffle 150.

The width of the slots 158 is approximately the same size the width of the baffles 150, 152 so that the walls 156 hold the baffles 150, 152 firmly in place. For each of the fixtures 154, a first baffle 150 is inserted into two collinear slots 158 of the fixture 154, and a second baffle 152 is inserted into the other two collinear slots 158 of the fixture 154. In one example, the first baffles 150 are inserted as rows into the horizontal slots 158, and the second baffles 152 are inserted as partial columns into the vertical slots 158 shown in FIG. 17B. Additional second baffles 152 are held in place by the first baffles 150 at locations between the lenses 144c where the fixtures 154 are not provided.

Figure 17C:
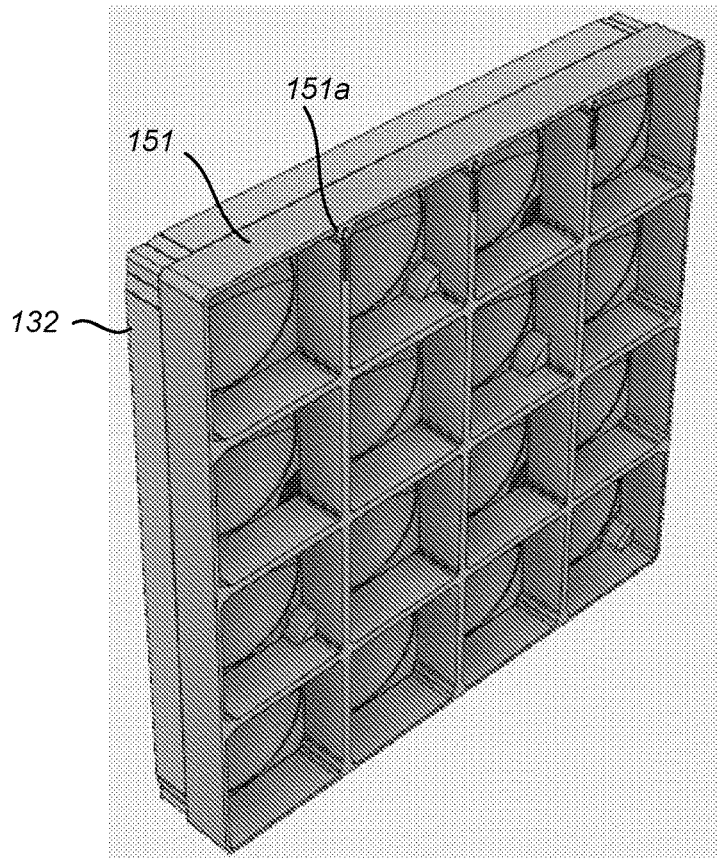
FIG. 17C is a perspective view of an example of a single-piece baffle structure.

Another way of isolating each optical channel is to manufacture a single-piece baffle structure 151 that includes the baffles 150, 152, as shown in FIG. 17C. The single-piece baffle structure 151 may be achieved by way of injection molding or machining a honeycomb structure.

Figure 17D:
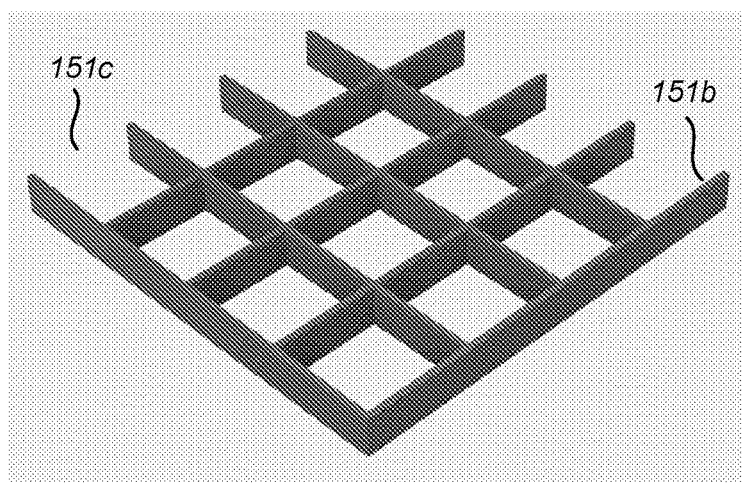
FIG. 17D is a perspective view of an example of a single-piece baffle structure having non-continuous outer walls.

The single-piece baffle structure 151 can be formed into a particular shape related to the lens assemblies 132. FIG. 17C illustrates an example of the single-piece baffler structure 151 prepared for lens assemblies 132 having 4×4 lens array, although other configurations are within the scope of the invention. In the single-piece baffle structure 151 having 4×4 baffle array, outer wall thicknesses may be half that of inner walls, allowing for these baffle structures 151 to be efficiently tiled without growing lens array pitch or interfering with each other. In this particular embodiment, orientation markers 151a are provided to indicate orientation of the single-piece baffle structures 151 for tiling purposes, such as arrows pointing in a particular direction (as shown in FIG. 17C), non-continuous outer walls (e.g., at least a portion of any of four sides of the outer walls having a smaller thickness, to be mated with a corresponding portion having a larger thickness in an adjacent baffle structure 151 to be titled together), etc. FIG. 17D illustrates an example of a single-piece baffle structure having non-continuous outer walls, which consist of two adjacent outer walls 151b having a larger (full) thickness and two other adjacent "walls" 151c having smaller (zero) thickness, for easy tiling and orientation purposes. Non-continuous outer walls provide for full thickness walls on all sides while still allowing for tiling configuration. Other orientation indicators and wall configurations are also within the scope of the invention. For example, as an orientation indicator, one boss (rounded area at an intersection of perpendicular linear sections) may have an increased sized, compared to other bosses, to indicate proper orientation of the baffle structure 151.

Enclosure Front Aperture

Referring once again to FIG. 2, the front cover 108 of the MV display device 100 includes several technical features. First, the front cover 108 is made from a much thinner material than that of the rest of the enclosure (e.g., rear cover 106). Since it is desirable for lens elements to be as closely packed as possible, there may not be enough material between apertures 108a in the front cover 108 to maintain structural integrity. The thicker the material, the larger the apertures 108a must be to not restrict the optical performance in both field-of-view and relative brightness across the field. In the limit of a zero-thickness material, the array of apertures 108a in the front cover 108 would at minimum need to be the same diameter as the underlying optical surfaces. As the material thickness increases from zero thickness, the diameter of the apertures 108a must increase to not vignette (or block) rays. It may be possible not to include the front cover 108, though this would have negative implications in the visual appearance of the MV display device 100 as gaps between lens assemblies 132 and mounting hardware would be visible.

Another consideration for the apertures 108a of the front cover 108 is visual appearance. The lenses of the lens assemblies 132 may or may not have an optical coating applied. The presence of an optical coating, such as an AR coating, drastically changes the visual appearance of the lens elements themselves. To reduce the visual impact of busyness of the front of the MV display device 100, it may be desirable that the apertures 108a of the front cover 108 have a dark color and reflectivity visually similar to that of the optical elements. Because the MV display device 100 inherently is a visual device designed to display information to viewers, features that distract from the optical elements or the MV pixels 102 also distract from the functionality of the MV display device 100.

Diffuser

In color filtered displays, color filters are placed over different display sub-pixels to create a larger display pixel. Most FPDs operate in this regime. The radiant exitance (radiant emittance) emitted from each display sub-pixel can be modulated to create different colors than that of the color primaries of the display sub-pixels. Three different examples of red, green, and blue (RGB) color primary display sub-pixel structures are shown in FIGS. 5A-5C, although there are many other display sub-pixel configurations.

One approach in designing a projection system utilizing an electronic imaging device would be to assume that no diffuser is needed, and simply place a lens at the proper distance from the imaging device to project an image to the desired plane. In the specific case of a stripe RGB color filter FPD (see FIG. 5A), this will not provide an adequate image. The resulting image, if magnified, will exhibit color separation, showing individual display sub-pixels. For visual systems, that is, systems that are viewed by the human eye, this effect can be quite noticeable. It is sometimes referred to as the "screen door effect."

A more sophisticated approach would employ a diffuser, or scatterer, placed between the imaging device and the lens to help blend the spatially distinct regions of color primaries, or display sub-pixels. Examples of diffusers that can be used for this purpose are frosted glass, ground glass, diffuser film which is visually similar to frosted glass, etc. These diffusers often exhibit a scattering profile that is circularly symmetric arising from a stochastic process employed in their manufacture. This approach could lead to a more uniform color in a given region of the projected image with an inherent tradeoff. The tradeoff may come in the form of decreased spatial resolution, since the diffuser naturally causes loss of spatial fidelity in the image plane.

Figure 18:
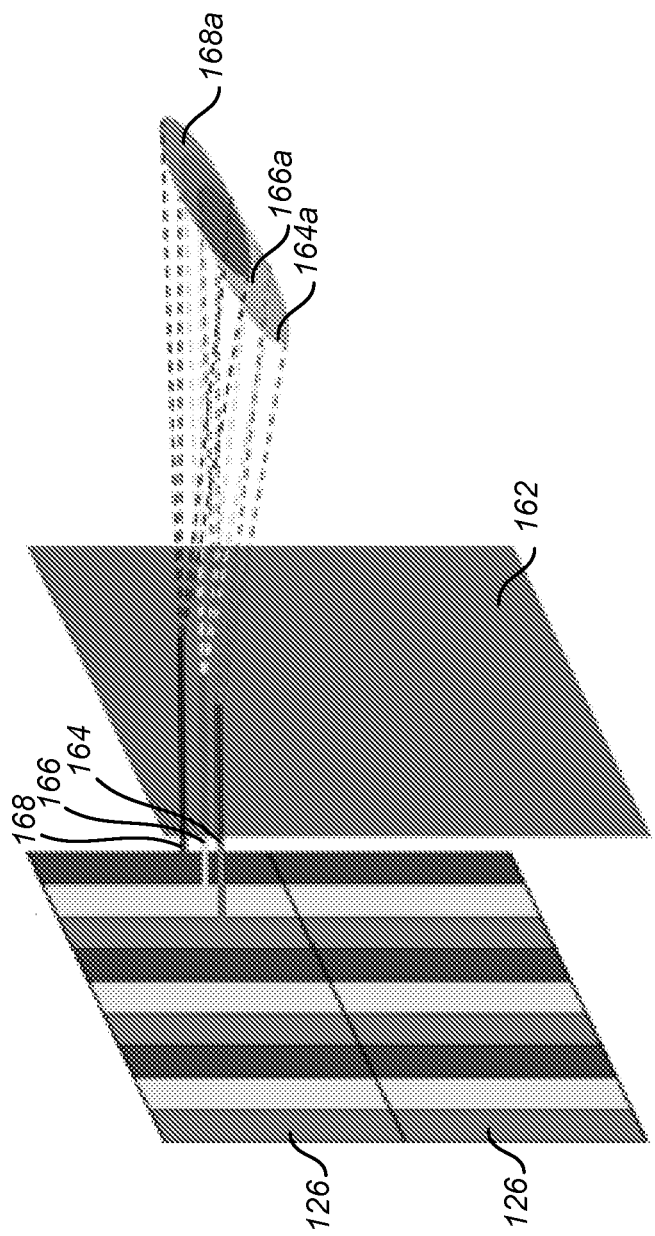
FIG. 18 is a partial, perspective view of a diffuser according to one or more embodiments of the present disclosure.

Various exemplary embodiments employ an engineered diffuser 162 with a non-circularly symmetric scattering profile, as shown in FIG. 18. When such diffuser 162 is placed over a color filtered electronic imaging device, the scattering angle could be distinct in two orthogonal, in-plane, angles. This is advantageous since it allows for different color diffusion along each characteristic axis of the imaging device. In the example of a stripe style RGB display pixel structure, color diffusion requirements in the vertical direction (y-axis of FIG. 5A) are much less than that in the horizontal direction (x-axis of FIG. 5A). In the vertical direction, the goal of the diffuser 162 is to minimize the appearance of the non-active, non-emitting, region between any two (like-color) display sub-pixels, i.e., black areas between display sub-pixels 126 in of FIG. 5A. In the horizontal direction, the diffuser 162 is tasked with scattering light from one display sub-pixel, say a red sub-pixel, into an angle such that light coming from adjacent display sub-pixels will be sufficiently mixed. Where sufficient mixing occurs when the FPD is imaged with some magnification, a red, blue, and green sub-pixels would appear as a white pixel, rather than spatially and chromatically distinct sub-pixels.

The backlighting scheme or emission profile of the flat panel display 110 can also play a role in determining the ideal scattering angles of the diffuser 162. In an example flat panel display 110 with a stripe style pixel structure, two examples of backlights that can be used are collimated and not collimated. A collimated backlight would produce light travelling largely in a single direction impending on the backside of the transmissive FPD. A non-collimated backlight would emit light into some larger cone or solid angle. These two examples would call for largely different diffuser scattering profiles. Therefore, the emission profile of the flat panel display 110 is an important input in the design of a diffuser scattering profile.

In general, the scattering profile of the engineered diffuser 162 is elliptical. The major and minor axes of the diffuser 162 may be aligned to the characteristic axes of the flat panel display's 110 sub-pixel structure. In a stripe sub-pixel arrangement, the major axis of the scattering profile will be aligned in the x-axis of FIGS. 5A-5C and the minor axis of the scattering profile will be aligned with the y-axis of FIGS. 5A-5C. The use of this type of scattering diffuser 162, when designed properly and aligned to the display sub-pixel structure is advantageous in comparison to that of a diffuser with a circularly symmetric scattering profile. While there is still some inherent loss of spatial fidelity, the loss is reduced. In an example flat screen display 110 with a stripe style sub-pixel structure, the loss of spatial fidelity in the vertical direction can be significantly less with a diffuser 162 with elliptical scattering symmetric in comparison to that of a standard diffuser with a circularly symmetric scattering profile.

In the context of a multi-view display device 100 made up of a stripe RGB flat panel display 110 with lens assemblies 132 placed atop, the diffuser 162 may play an important role. Since the stripe RGB flat panel display 110 is made up of display pixels with spatially separated colored sub-pixels, light from these sub-pixels will be directed by the lens into different angular directions. An observer looking at this lens would therefore see a magnified portion of an individual display sub-pixel, thereby limiting the possible colors to display to the observer to be that of the color primaries of the color filters. The practical application and purpose of the diffuser 162 is to scatter the light from the individual display sub-pixels, allowing for the blending of the three RGB display sub-pixels. As discussed earlier, this means a reduction in spatial resolution, or angular fidelity of the MV pixel. From a practical standpoint, the needed amount of diffusion or blending is only over an individual display pixel, blending the display sub-pixels together. A diffuser placed over the flat panel display 110 will, in fact, blend more than just the display sub-pixels of a given display pixel. Since display sub-pixel spacing, say from a red sub-pixel to the next red sub-pixel, is different in the vertical and horizontal directions, it may be desirable to apply different color diffusion in the vertical and horizontal directions.

Another consideration in the optimal design of the diffuser 162, along with the backlight design, is the physical structure of the flat panel display 110. Many display panels include several layers of polarizers, cover glass, etc. All these elements are a consideration in the design of a diffuser 162 that will optimally blend the colors of individual display sub-pixels within the flat panel display 110.

FIG. 18 is a partial, perspective view of an elliptical diffuser 162 according to one or more embodiments of the present disclosure. The diffuser 162 is shown disposed in front of display sub-pixels 126 of the flat panel display 110. The flat panel display 110 in this example provides collimated backlighting. FIG. 18 shows a single on-axis beam 164 from a red sub-pixel 126, a single on-axis beam 166 from a green sub-pixel 126, and a single on-axis beam 168 from a blue sub-pixel 126. The diffuser 162 creates a cone of red light 164a from the beam 164, a cone of green light 166a from the beam 166, and a cone of blue light 168a from the beam 168. Each cone is elliptical in cross section, illustrating the elliptical scattering profile of the diffuser 162.

Display Controller

Figure 19:
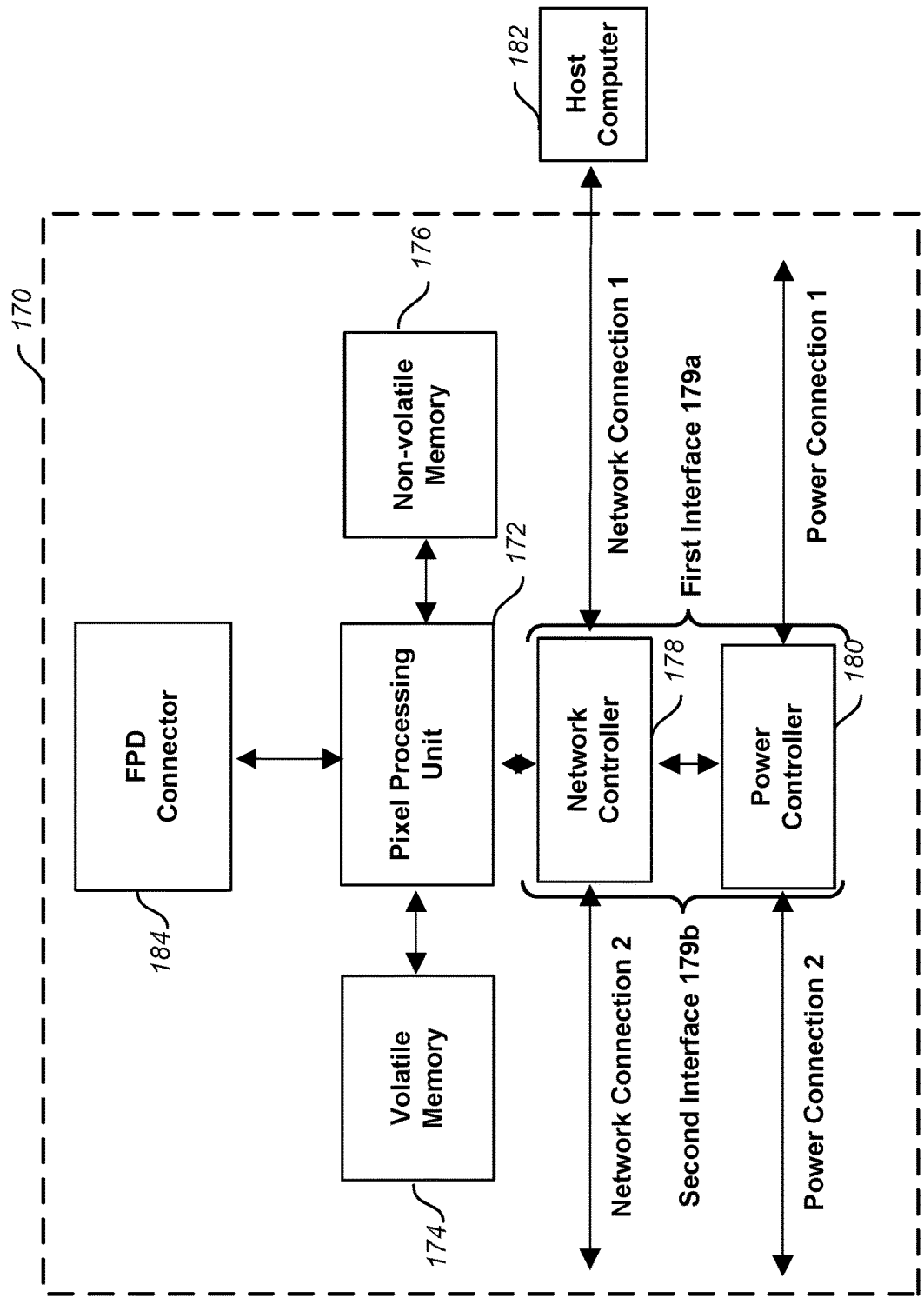
FIG. 19 is a block diagram of a display controller according to one or more embodiments of the present disclosure.

FIG. 19 is a block diagram of a display controller 170 according to one or more embodiments of the present disclosure. In some embodiments, the display controller 170 may be embodied in the driver boards 114 and 116 mounted in the enclosure of the MV display device 100 (see FIG. 3). The display controller 170 includes a pixel processing unit 172 that is coupled to a volatile memory 174, a non-volatile memory 176, a network controller 178, and a power controller 180. The display controller 170 includes a first interface 179a coupled to a first set of network and power connectors 120, 118 (see FIG. 3) to support network connection 1 and power connection 1 with another device, for example, with a host computer 182. The display controller 170 may additionally include a second interface 179b coupled to a second set of network and power connectors 120, 118 (on the second driver board 116 in FIG. 3, though not shown) to support network connection 2 and power connection 2 with yet another device, for example, another MV display device 100 that may be daisy-chained to the present MV display device 100 (see FIG. 4).

The display controller 170 receives data from, for example, the host computer 182 via the network controller 178 and drives the flat panel display 110 to generate beamlets that create images directed towards viewing zone(s), as described below. When the MV display device 100 is one of many MV display devices 100 that are daisy chained (see FIG. 4), data may be received not from the host computer 182 but from another MV display device 100 that is "upstream" of the present MV display device 100.

Pixel Processing Unit

The pixel processing unit (PPU) 172 computes and renders the beamlet patterns on the flat panel display 110 to show the appropriate images to the associated viewing zones. In other words, the PPU 172 identifies a first bundle of beamlets, which originate from a first set of display pixels on the FPD 110 and are directed to the pupil of a first viewer in a first viewing zone to form a first image in the first viewer's brain, and a second bundle of beamlets, which originate from a second set of display pixels (different from the first set of display pixels) and are directed to the pupil of a second viewer in a second viewing zone to form a second image in the second viewer's brain.

In various embodiments, the PPU 172 receives viewing zone coordinate data which defines locations of the first and second viewing zones, content stream data used to form the first and second images, viewing zone to content stream mappings that associate different content to different viewing zones, respectively, calibration parameters used to calibrate the MV display device 100, and/or color palette parameters from the host computer 182 to render the images on the flat panel display 110 that generate the appropriate beamlet patterns.

In various embodiments, viewing zones are described in a viewing zone coordinate system, such as the coordinate system of a camera (e.g., camera 104) looking at an environment in which the MV display device 100 is used. Beamlets generated by the flat panel display 110, on the other hand, are described in a beamlet coordinate system, such as X-Y display pixel coordinates or floating-point viewport coordinates of display pixels of the flat panel display 110. The PPU 172 applies mathematical transformations between the viewing zone coordinate system and the beamlet coordinate system to compute the corresponding beamlet coordinates for viewing zones. In other words, the PPU 172 applies mathematical transformations between the viewing zone coordinate system and the beamlet coordinate system to determine which display sub-pixels to activate to produce beamlets that are visible at corresponding locations (viewing zones) in the viewing zone coordinate system.

Each multi-view (MV) pixel 102 controlled by the PPU 172 has a unique mapping between the two coordinate systems, which is contained in its associated set of calibration parameters (p0, p1, ..., p15). One embodiment of the mathematical mapping between the viewing zone coordinate system (X, Y, Z) and the beamlet coordinate system (U, V), which utilize the calibration parameters (p0, p1, ..., p15), is provided below in Equations 1-5. The PPU 172 uses Equations 1-5 to map between the viewing zone coordinate system (X, Y, Z) and the beamlet coordinate system (U, V).

$$u_L = \frac{p_0 X + p_1 Y + p_2 Z + p_3}{p_8 X + p_9 Y + p_{10} Z + 1} \quad \text{Equation 1}$$

$$v_L = \frac{p_4 X + p_5 Y + p_6 Z + p_7}{p_8 X + p_9 Y + p_{10} Z + 1} \quad \text{Equation 2}$$

$$r = \sqrt{u_L^2 + v_L^2} \quad \text{Equation 3}$$

$$U = u_L\left(p_{11} r + p_{12} + \frac{p_{13}}{r}\right) + p_{14} \quad \text{Equation 4}$$

$$V = v_L\left(p_{11} r + p_{12} + \frac{p_{13}}{r}\right) + p_{15} \quad \text{Equation 5}$$

In one or more embodiments, the PPU 172 includes a processor and a memory storing instructions that cause the PPU 172 to receive information regarding a set of coordinates in the viewing zone coordinate system, determine a corresponding set of coordinates in the beamlet coordinate system by evaluating Equations 1-5, and output information regarding the corresponding set of coordinates in the beamlet coordinate system, which is used to drive the flat panel display 110.

Those with ordinary skill in the art will recognize there are many alternative mathematical models and parameter sets that may be used to create a mapping between a viewing zone coordinate system and a beamlet coordinate system. The calibration parameters for each multi-view (MV) pixel are computed with a calibration procedure, as described below.

To reduce the data bandwidth and storage requirements for content streams and frame buffers, the color bit width can be less than the native color bit width of the flat panel display 110. In some embodiments, color values are represented using 8 bits, while the flat panel display 110 is driven with 24-bit color values. The PPU 172 stores a color palette that converts between the stored color bit width and the native flat panel display 110 bit width. For example, the stored 8-bit color can be represented as a 0-255 grayscale, 3:3:2 RGB (i.e., 3 bits for red, three bits for green, and 2 bits for blue), or an alternative color representation. The color palette for each panel can also be tuned to provide color matching between multiple panels.

In various embodiments, the PPU 172 is implemented in a Field Programmable Gate Array (FPGA) or an Application Specific Integrated Circuit (ASIC). Those with ordinary skill in the art will recognize there are many other alternative implementations, including a central processing unit (CPU), graphics processing unit (GPU), or a hybrid processor. In addition, multiple processors may be used together to perform the tasks of the PPU 172.

The PPU 172 communicates with the volatile memory 174 and/or non-volatile memory 176 to perform its tasks. The volatile memory 174 may comprise dynamic random-access memory (DRAM) and/or static random-access memory (SRAM), for example. The non-volatile memory 176 may include flash, Electrically Erasable Programmable Read-Only Memory (EEPROM), and/or a disk drive. In various embodiments, the PPU 172 communicates with the volatile memory 174 to store dynamic run-time data, including but not limited to viewing zone data, content stream data, viewing zone to content stream mappings, and/or frame buffer data. The PPU 172 communicates with the non-volatile memory 176 to store static data, including, but not limited to, calibration parameters, color palettes, firmware, identification numbers, and/or version numbers. The PPU 172 also can modify the contents of the non-volatile memory 176, for example, to set the stored parameters or update firmware. The ability to update firmware on-the-fly allows easier upgrades without having to plug in an additional programmer cable and run specialized software from the host computer 182.

The PPU 172 provides buffering in the system to allow graceful performance degradation in non-ideal situations. Typically, for a display such as an LCD, video data must be consistently sent at a fixed rate (e.g., 30 Hz, 60 Hz). However, due to the non-deterministic computations, rendering, and data transmission from the host computer 182, the PPU 172 may generate data at a non-fixed rate. Thus, the PPU 172 includes buffering when controlling the flat panel display 110 to, for example, hold the last frame's state if the data is too slow, or drop frames if the data is too fast.

The PPU 172 drives the flat panel display 110 through a FPD connector 184. In various embodiments, the FPD connector 184 is an embedded DisplayPort (eDP) interface. Those with ordinary skill in the art will recognize there are many alternative display interfaces that may be used, including but not limited to DisplayPort, High-Definition Multimedia Interface (HDMI), Digital Visual Interface (DVI), and Video Graphics Array (VGA). In one or more embodiments, the FPD connector 184 additionally contains connections for powering, controlling, and/or modulating a backlight of the flat panel display 110.

The PPU 172 communicates with the host computer 182 and/or other display controllers 170 (of other MV display devices 100) through the network controller 178. The PPU 172 sends and/or receives data through a network, including but not limited to viewing zone information, content stream data, viewing zone to content stream mappings, calibration parameters, color palette parameters, identification information, addressing information, status information, and/or other configuration information. In various embodiments, the network is an Ethernet® network, and the network controller 178 provides an Ethernet® physical layer interface. Those with ordinary skill in the art will recognize there are many alternative data interfaces that may be used, including but not limited to Universal Serial Bus (USB), Peripheral Component Interconnect (PCI), Infiniband®, and/or Thunderbolt®. Some data interfaces may be preferred over others for certain circumstances. For example, Ethernet® generally can span longer physical distances than USB, which may be advantageous in many installation configurations.

Multi-MV Display Device Tiling Features

Several features of the display controller 170 facilitate tiling of multiple MV display devices 100 to form a larger display. For example, in various embodiments, the features may be used to connect multiple MV display devices 100 in a daisy chain, to reduce the number of ports required by the host computer 182, reduce cable lengths, and simplify installation. Those with ordinary skill in the art will recognize there are many alternative connection architectures, including but not limited to buses, trees, stars, and/or meshes.

The network controller 178 contains two network interfaces 179a and 179b coupled to respective data connectors 120 to allow passing of received data to downstream MV display devices 100. In various embodiments, the network controller 178 comprises a dual Gigabit Ethernet® transceiver. The PPU 172 can receive data from a first network interface 179a and transmit data to a second interface 179b and vice versa. The transmitted data on the second interface 179b can be a direct copy of the received data on the first interface 179a, a filtered version of the received data, a transformed version of the received data, or entirely independent data.

For example, in various embodiments, viewing zone data sent by the host computer 182 is intended to be consumed by all MV display devices 100 in a MV display system 122 (see FIG. 4), while different portions of content stream data are intended to be consumed by certain MV display devices 100 in the MV display system 122. The first network interface 179a of the network controller 178 receives viewing zone and content stream data for all MV display devices 100, and the PPU 172 operates on only the data pertaining to that MV display devices 100. All viewing zone and content stream data are directly copied to the second network interface 179b of the network controller 178 to be sent to downstream MV display devices 100. In an alternative embodiment, the PPU 172 does not forward the content stream data intended for its MV display device 100, since no other MV display devices 100 will be using that data. This reduces the overall data traffic within the MV display system 122.

The directionality of the network interfaces 179a, 179b of the network controller 178 can be programmed on-the-fly. This multi-way directionality allows flexibility in installation configurations. For example, one situation may require the host computer 182 to be placed within a daisy chain to the left of a MV display device 100, while another situation may require the computer 182 to be placed within a daisy chain to the right of the MV display device 100. This directionality programming can be done either passively or with an active command. In an example of the former, any data received on either network interface of the network controller 178 can be operated upon and forwarded to the other interface of the network controller 178. In an example of the latter, one network interface of the network controller 178 is designated as the upstream interface, while the other is designated as the downstream interface. If a "set direction" command is received on the downstream interface, the upstream/downstream designations can be flipped.

Some commands may be broadcast to all display controllers 170 in a chain. For example, in various embodiments, all display controllers 170 operate on the same set of viewing zone data, which is broadcasted to all display controllers 170. However, to allow different display controllers 170 in a daisy chain to operate on different data, the display controllers 170 may need to have distinct addresses. For example, each display controller 170 may use its own set of calibration parameters and may render from its own portion of the content stream. A straightforward method to assign distinct addresses is for each display controller 170 to have a globally unique ID. For example, a serial EEPROM with a pre-programmed globally unique ID can be read by the PPU 172. As another example, a unique ID number can be stored in the non-volatile memory 176. The host computer 182 can query the display controllers 170 in the daisy chain for their unique IDs, and map content stream portions to those unique IDs. However, these techniques require either separate ID memories or bookkeeping steps.

In various embodiments, temporary unique ID numbers are assigned at run-time. For example, the host computer 182 sends a "Set Address" command with a base address and increment value to a first display controller 170 in the daisy chain. The first display controller 170 sets its address to the given base address. Then, the first display controller 170 sends the base address with the increment value added to it to a second display controller 170 in the daisy chain along with the increment value. The second display controller 170 sets its address to the incremented base address, increments the address again, and sends the new address and increment value to a third display controller 170 in the daisy chain, and so on. This way, each display controller 170 is assigned a known, unique address within the daisy chain at run-time.

The host computer 182 can perform a query to determine the number of display controllers 170 in the chain at run-time. For example, the display controllers 170 may be designed to respond to a ping command with its unique address. The ping command is broadcast by the host computer 182 to all display controllers 170 in a chain, and all of the display controllers 170 respond to the ping command with their unique addresses. Then the host computer 182 can simply count or check the number of ping responses to determine the number and addresses of the display controllers 170 in the chain. This way, applications can be adaptable to the number of MV display devices 100 in a chain, rather than requiring a fixed number of MV display devices 100.

In addition to the network interfaces, power interfaces of the power controller 180 can be arranged to allow daisy chaining as well. For example, power can be received from a first interface 179a of the power controller 180 and transmitted to a second interface 179b of the power controller 180. Alternatively, the first and second interfaces of the power controller 180 can be directly connected such that power can be transmitted in either direction, to allow more flexible installation.

Programming Interface

In various embodiments, the primary method for controlling MV display devices 100 is through an Application Programming Interface (API) running on the host computer 182 attached to the display controllers 170 of the MV display devices 100 via Ethernet. The API is intended to be used by programmers to control the MV display devices 100. The primary purpose of the API is to enable users to do three things: (i) create and update (i.e., resize, move, etc.) viewing zones in the viewing zone coordinate system, (ii) create and update (i.e., change color, text, scroll direction, image) content streams that can be shown to viewing zones, and (iii) assign viewing zones to content streams.

The API allows users to do these things both statically and dynamically. Listed below are a few examples of both static and dynamic operation to help illustrate the breadth of experiences that can be created using these three basic features.

Static operation may be used to create viewing zones at specified locations and show content to viewers based on where they are placed. For example, one or more MV display devices 100 may be statically configured to show different advertisements to different sides of a street, or show a red light to cars over a certain distance away from a traffic light and a green light to closer cars. Additionally, one or more MV display devices 100 may be statically configured to use a map of the world on a floor, to show text to a viewer in the native language of a country on top of which the viewer is standing.

Dynamic operation may use dynamic content and static viewing zones. Viewing zones may be created at specified locations, and external data may be used to decide what content to show to what viewing zone. For example, a person could walk up behind a podium, see content on a sign, and use a dial on the podium to select the language of information that is displayed to the person. Also, people sitting in seats at a movie theater could use their phones to enter their seat numbers and captioning preferences (i.e., no captioning, English, Spanish, German, etc.). In this case the viewing zone is statically set for each seat, but the content changes based on the user input. Any interaction device (e.g., dials, phones, remote controls, gestures, facial recognition) may be used to change what content is being shown to a static location like a chair.

Dynamic operation also may use static content and dynamic viewing zones. The viewing zones are changed based on external data, but content is set using only internal data. For example, the API may be used to create 3D viewing zones and assign content to them, and the display controller 170 only turns on beamlets that terminate inside the viewing zones (which can be determined based on a real-time point cloud, time-of-flight camera, or another 3D sensor, to be described below). This has the effect of dynamically updating viewing zones so that they are the exact size of the person (or people) standing inside of them. For example, a user may statically set a 3D region to be the bounding box of a viewing zone. When one or more people enter the bounding box, the viewing zone is updated in a way such that it fits exactly to the people in the viewing zone. In other words, the 3D viewing zone may be statically set and dynamically updated. Additionally, people may be tracked using wands, badges, phones, motion capture systems, vehicles, or visual tags, etc., and content is assigned without external data (i.e., based on location).

In addition, dynamic operation may be fully dynamic, wherein viewing zones are dynamically created and content is dynamically based on external data. For example, people may be tracked using wands, badges, phones, motion capture systems, vehicles, visual tags, etc., and content is assigned based on who the person is or input the person has given to the system (i.e., if a person walks into a mall and starts looking at a particular item). Additionally, computer-aided facial recognition of a face of a viewer may be used to set a viewing zone around the face, identify who the viewer is, and show the viewer specific content based on the identity of the viewer.

In addition to the three basic features, several enhancements allow for easier operation including: (a) auto-discovery, (b) manually specifying the content buffer-to-display panel mapping, (c) filtering viewing zones based on calibrated area, and (d) single-view mode, to be described below.

(a) Auto-Discovery

The host computer 182 executes software to perform an auto-discovery process to discover what MV display devices 100 are connected to it and how they are plugged into each other. Without this data, an operator would need to manually program addresses for each MV display device 100 and then inform the API of the addresses of the MV display devices 100. Instead, on startup, the API finds all attached MV display devices 100 and assigns each of them an address. It does this in a programmatic and repeatable way such that if the order that the MV display devices 100 are plugged in does not change, the address of each MV display device 100 will stay the same. This is advantageous for being able to show content correctly, since the API divides up content based on addresses assigned to the MV display devices 100. There are numerous other ways to accomplish assigning persistent addresses, such as setting unique identifiers (IDs) for each MV display device 100 in the factory, but it would be less efficient than the auto-discovery method, which requires no unique IDs to be pre-assigned.

(b) Manually Specifying the Content Buffer-to-Display Panel Mapping

When creating content for the multi-view display devices 100, one might expect to be able to create a single image (or frame buffer) and then assign parts of that image to be displayed on each individual MV display device 100 based on the physical arrangement of the MV display devices 100. Since the addresses of the MV display devices 100 are dependent on the order that they are plugged in, and users can plug in MV display devices 100 any way they choose, adjacent addresses may not necessarily correspond to adjacent panels. In various embodiments, the MV display system 122 enables users to manually specify which portions of a frame buffer maps to which addresses. For example, a user may specify that the content delivered by multi-view (MV) pixels (0,0) through (27,15) maps to a first MV display device 100, while the content delivered by MV pixels (28,0) through (56, 16) maps to a second MV display device 100, etc. Enabling users to assign portions of content this way gives users greater creative freedom. Alternatively, it may be possible to assume the MV display devices 100 are plugged in a certain way and to auto-assign the MV display devices 100 certain regions of the content, but that may force users to think carefully about how they plug in the MV display devices 100. It may also not even be possible to plug in the MV display devices 100 in the required configuration given physical constraints of mounting, etc.

(c) Filtering Viewing Zones Based on Calibrated Area

It is sometimes difficult for users to know exactly where a MV display device 100 has been calibrated (i.e., the precise locations in the viewing zone coordinate system at which beamlets from each of its MV pixels are known to terminate) and where it has not been calibrated. Generally the MV display device 100 performs better inside an area in which calibration was performed (e.g., inside the convex hull of all the points a calibration device 210 was placed during calibration; see FIG. 21A). As a result, it is advantageous to help users understand what places in the viewing zone coordinate system are calibrated and what places are not calibrated. In various embodiments, this is achieved by optionally filtering out areas of viewing zones placed outside a calibration area and not displaying content there. Alternatively, users may be notified that a viewing zone, which may be displayed, is outside a calibrated volume.

(d) Single-View Mode

When a designer is using the MV display devices 100 and trying to preview content, to verify that the right content is visible in the right viewing zone the designer may need to get up from the host computer 182 to physically stand in the viewing zone to view the content. To ease the designing burden, the MV display system 122 may include a "single-view" mode. In this mode, designers can see a single content stream no matter where they physically stand as long as they are inside the field-of-view of the MV display devices 100. While this mode is designed to assist designers and programmers, it may also be used in ultimate operation of the MV display system 122 (see FIG. 4) to enable moments where all people looking at the MV display devices 100 see the same thing. For example, while viewers in different viewing zones normally see different images, in case of emergency the same emergency alert content may become visible to all viewers no matter which viewing zone each viewer is at.

Graphical User Interface

Figure 20A:
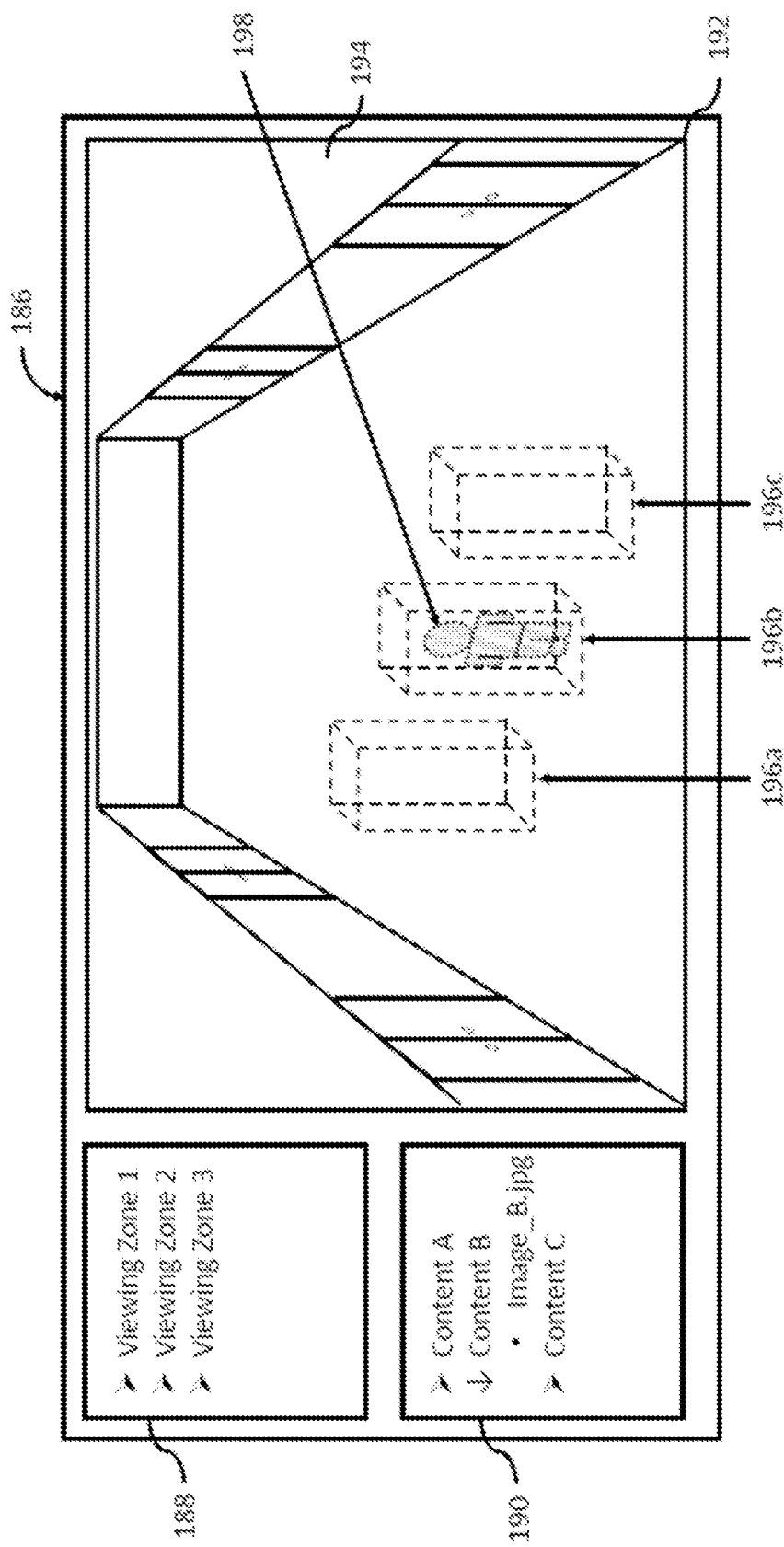
FIG. 20A is a diagram of a graphical user interface.

For less technical users to be able to use the MV display devices 100, a graphical user interface 186 can be used, as shown in FIG. 20A. In various embodiments, the graphical user interface 186 serves two primary purposes. First, it enables users to quickly get up and running with basic functionality. Additionally, it enables more advanced users that are writing their own code to be able to quickly place viewing zones for use in their own code. In one or more embodiments, the host computer 182 executes software that causes the graphical user interface 186 to be displayed on a display device thereof.

FIG. 20A is a diagram of a graphical user interface 186 according to one or more embodiments of the present disclosure. In one or more embodiments, the graphical user interface 186 includes a main window and a plurality of panes within the main window, including a viewing zone information pane 188, a content assignment pane 190, and a viewing zone coordinate system pane 192. The viewing zone information pane 188 enables operators to specify the names of various viewing zones that are depicted in the viewing zone coordinate system pane 192. The content assignment pane 190 enables operators to assign content to the various viewing zones that are created using the viewing zone coordinate system pane 192. For example, the content assignment pane 190 enables an operator to specify the name of an image file or a movie file including content that is be displayed in each of the viewing zones depicted in the viewing zone coordinate system pane 192.

The graphical user interface 186 enables an operator to specify and display a viewing space representation 194 in the viewing zone coordinate system pane 192. For example, the viewing space representation 194 may be a 3D model of a room in which the MV display device 100 will be used. When an operator uses a pointing device (e.g., a mouse) of the host computer 182 to perform graphical operations on a display device of the host computer 182, the host computer 182 converts locations on the display device to corresponding locations in a viewing zone coordinate system (e.g., coordinate system of the room in which the MV display system 122 will be used). The graphical user interface 186 also enables an operator to place and manipulate viewing zones within the viewing zone coordinate system pane 192. For example, an operator may use a pointing device to draw, resize, and move a first viewing zone representation 196a, a second viewing zone representation 196b, and a third viewing zone representation 196c within the viewing zone coordinate system pane 192. In one or more embodiments, each of the viewing zone representations 196a-196c appears as a three-dimensional bounding box. After the user specifies three viewing zones with the viewing zone representations 196a-196c, the host computer 182 displaying the graphical user interface 186 converts coordinates of the boundaries of the viewing zone representations 196a-196c into corresponding coordinates in the viewing zone coordinate system of boundaries of three viewing zones, and then stores the coordinates of the viewing zones.

Providing a visual representation of the viewing zone coordinate system in the viewing zone coordinate system pane 192 can be helpful for people to understand how to use the MV display device 100. The form of the visual representation depends on the sensor 104 being used on/with the MV display device (see FIG. 1). If, for example, the sensor is a 2D camera 104, then the graphical user interface 186 could simply display the live feed from the camera 104. In some cases, however, humans may not be able to easily see and understand the output of a display sensor. One example of this might be a tracking system that uses IR light. A camera 104 used in the IR tracking system might block visual light so it becomes more difficult for a human to understand the output of the IR tracking system. As an alternative, the MV display system 122 can take the data output (i.e., the locations of tracked objects) and overlay them on a previously built 3D model of an environment. A specific implementation of this concept is shown in FIG. 20A. The graphical user interface 186 shows the viewing zone coordinate space as a pre-built 3D model of a space and a real-time point cloud 198. In the illustrated example the real-time point cloud 198 graphically represents the location of a person standing in the viewing space. The point cloud 198 is a visual representation of the output of a stereo camera sensor. For each feature in an image, a depth is computed from the disparity between two images. The corresponding image pixels to a given feature are then rendered in 3D space at the appropriate point given their location in the image and the feature's calculated depth. Since point clouds can be somewhat difficult to understand visually, the point cloud 198 is overlaid on top of the 3D model of the viewing space in FIG. 20A. A user can more easily understand that what they are looking at is a person standing toward the front of a room in the center. If the point cloud 198 were displayed without the context of the model, it may be more difficult for a user to grasp the correlation between what they see on the graphical user interface 186 and the real world. This particular model was created by first scanning a space with a 3D camera, such as a Matterport® camera, then calibrating the generated model to a stereo camera to which the display device 100 is calibrated, and finally displaying both the aligned model and the point cloud 198. However, this could also be done with other room modeling techniques such as Computer-Aided Drafting (CAD), Project Tango®, etc.

In addition to showing the generic coordinate system in the form of a camera feed, point cloud, etc., the graphical user interface 186 can also show what the maximum calibrated bounds are. (See "(c) Filtering viewing zones based on calibrated area" discussed above.) The fact that a sensor can sense in a particular region does not necessarily a viewing zone can be placed there. This is because a user may not have calibrated the entire viewing space within the field of view of the display sensor 104. In order to help the user understand what area is calibrated and what area is not, the graphical user interface 186 includes a feature that overlays a rendering of the calibrated area/volume over the viewing zone coordinate system visualization. In various embodiments, this may be a shaded 2D/3D box.

With a representation of the viewing zone coordinate system, viewing zones may be placed and manipulated within it. In 2D, this can simply be drawing and manipulating rectangles (or potentially other 2D shapes) on top of a camera feed to which the MV display device 100 is calibrated. In 3D, this may be more complicated. For the 3D case, a volume in space to which content is shown must be defined. In various embodiments, an axis-aligned bounding box (i.e., a rectangular prism with all sides parallel to an axis of the coordinate system) may be used to speed up computations, though any 3D volume may be used. Moving and manipulating 3D volumes in 3D space on a 2D computer monitor may be more difficult than the 2D case, but can be accomplished using standard CAD methodologies.

Figure 20B:
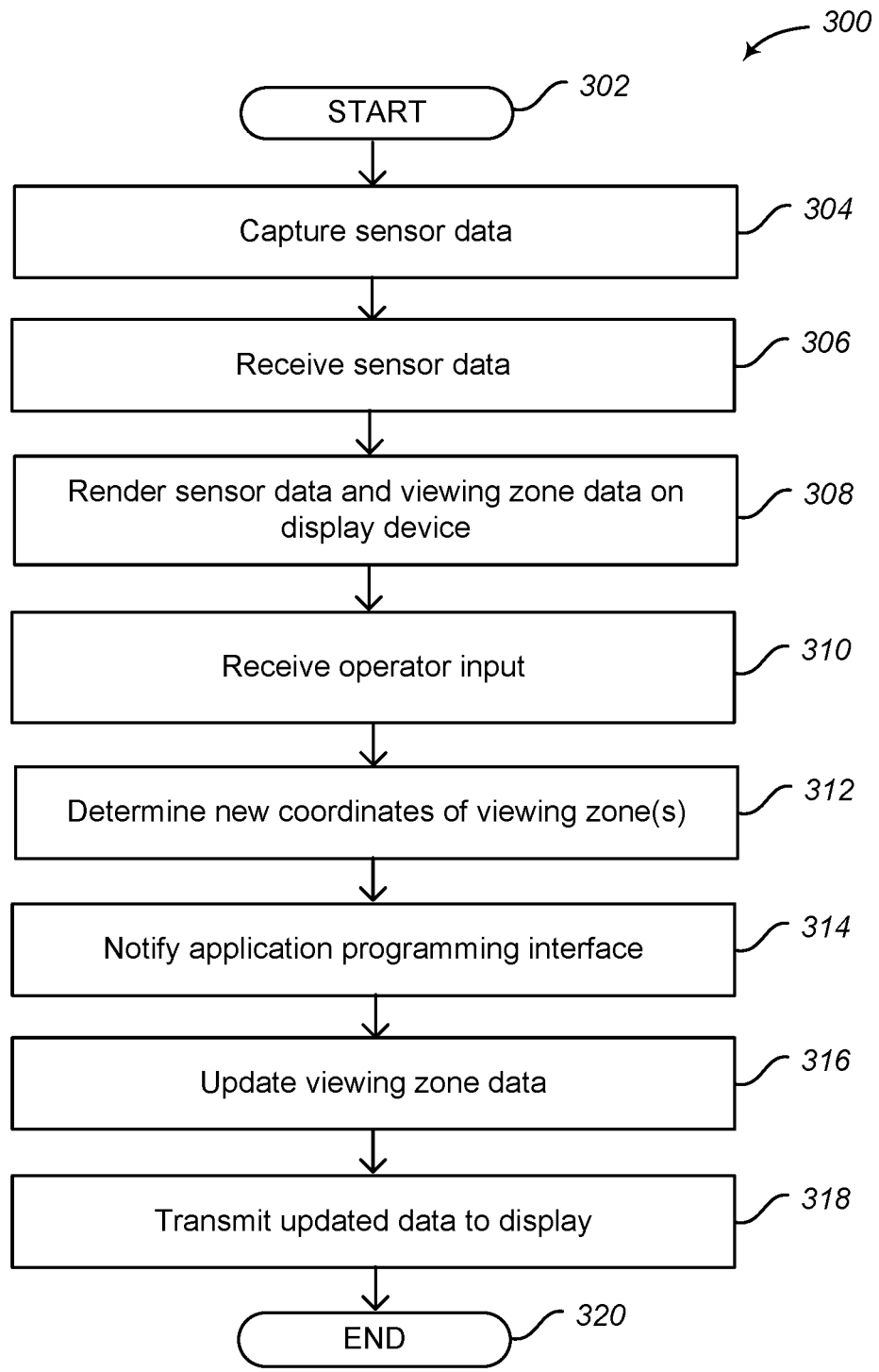
FIG. 20B is a flowchart of a first graphical user interface method.

FIG. 20B is a flowchart of a first graphical user interface method 300 according to one or more embodiments of the present disclosure. The method 300 begins at 302. For example, a user selects a user interface object displayed by the host computer 182, which causes the host computer 182 to transmit a message to a MV display device 100 via a network.

At 304, a display sensor (e.g., 104) captures sensor data of a space in which the MV display device 100 is viewable. For example, in response to the message from the host computer 182, the camera 104 of the MV display device 100 captures sensor data of a portion of a room in which viewers of the MV display device 100 is located.

At 306, the sensor data is received. For example, the host computer 182 receives the sensor data captured by the camera 104 via the network, which is transmitted from the network controller 178 of the MV display device 100. In one or more embodiments, the sensor data may be sent via Universal Serial Bus.

At 308, the sensor data and viewing zone data are rendered on a display device. For example, a memory of the host computer 182 stores software instructions that, when executed by a processor, causes the host computer 182 to process the sensor data captured by the camera 104 and transmit corresponding processed data to a display device coupled to the host computer 182. The data transmitted to the display device is in a format that causes the display device to display the graphical user interface 186 shown in FIG. 20A, which includes the rendered sensor data (e.g., the point cloud data 198) displayed as the viewing space representation 194, and the viewing zone data displayed (e.g., 3D model of the viewing space) including the viewing zone representations 196a, 196b, 196c.

After the sensor data and viewing zone data are rendered in the graphical user interface 186 on the display device at 308, the user is able to visualize viewing zones represented by the viewing zone representations 196a, 196b, 196c in the context of the display sensor data that is displayed on the display device. After viewing the information displayed in the graphical user interface 186, the user may determine that the viewing zone represented by the viewing zone representation 196a, for example, needs to be adjusted by being moved and resized. The user may then perform graphical operations using a pointing device (e.g., a mouse) coupled to the host computer 182 to select the viewing zone representation 196a and then resize and move it on the display device.

At 310, user input is received. For example, the host computer 182 receives data corresponding to the graphical operations the user has made that cause the viewing zone representation 196a to be resized and moved on the display device.

At 312, new coordinates of one or more viewing zones are determined. For example, the memory of the host computer 182 stores software instructions that, when executed by the processor, causes the host computer 182 to determine new coordinates, in a viewing zone coordinate system, of the viewing zone represented by the viewing zone representation 196a, based on the user input received at 310.

At 314, an application programming interface is notified. For example, the memory of the host computer 182 stores software instructions that, when executed by the processor, causes the processor to send a message indicating a change in the coordinates of the viewing zone represented by the viewing zone representation 196a to an application programming interface executing on the host computer 182.

At 316, viewing zone data is updated. For example, the application programming interface executing on the host computer 182 causes data corresponding to the new coordinates of the viewing zone represented by the viewing zone representation 196a determined at 312 to be stored in a memory of the host computer 182.

At 318, updated data is transmitted to a display device. For example, the application programming interface executing on the host computer 182 causes the data corresponding to the new coordinates of the viewing zone represented by the viewing zone representation 196a determined at 312 to be transmitted to the MV display device 100.

At 320, the method 300 ends. For example, the display controller 170 of the MV display device 100 stores the data corresponding to the new coordinates of the viewing zone represented by the viewing zone representation 196a and uses it to determine which display pixels of the flat panel display 100 cause beamlets to be emitted to the viewing zone represented by the viewing zone representation 196a.

One feature of the graphical user interface 186 is the ability to create and assign content to viewing zones. Content designers can design images and videos for multi-view displays in other software programs and then import them. However, users can create simple content, such as scrolling and static text, with the graphical user interface 186. Once the content has been created, it can be assigned to a content group. A content group has one piece of content assigned to it and one or many viewing zones. While it is also possible to think about this as assigning content to viewing zones, it may be more beneficial to think about assigning viewing zones to content because in various embodiments far fewer content streams are supported than viewing zones. This is because for any reasonably sized MV display device 100 with a reasonable number of MV pixels 102, content streams take up more data bandwidth than viewing zones when being communicated from the host computer 182 to the display controller 170. As discussed above, in various embodiments users create a group for every content stream. Users can change what content is shown to what viewing zone by moving the viewing zones between groups.

It is also possible to save each "configuration" or a state defining which viewing zones are located where and which viewing zones are assigned to which content (or content group). The graphical user interface 186 provides a configuration list, in which all the saved configurations are put in order such that they can quickly and easily be switched between. With a configuration list, the graphical user interface 186 allows users to switch between configurations based on external triggers. For example, when a button is pressed in the environment (e.g., a visitor at an amusement park pressing a button located near the MV display devices 100), the MV display system 122 may move to the next configuration which has a different set of content. Triggers from other systems can also be received, such as lighting consoles, various sensors, timers, or media servers. Another use of the ability to save configuration information from the graphical user interface 186 is to save just the viewing zone locations. Expanding the previous example, if a programmer wants to be able to dynamically change what content is shown when the button is pressed based on who pressed it, the programmer could write a program to do so using the application programming interface. As another example, a programmer could set up the viewing zones in the graphical user interface 186, name the viewing zones (i.e., "button 1," "button 2," etc.), and then load that file into the programming interface to assign the dynamic content to the viewing zone.

Figure 20C:
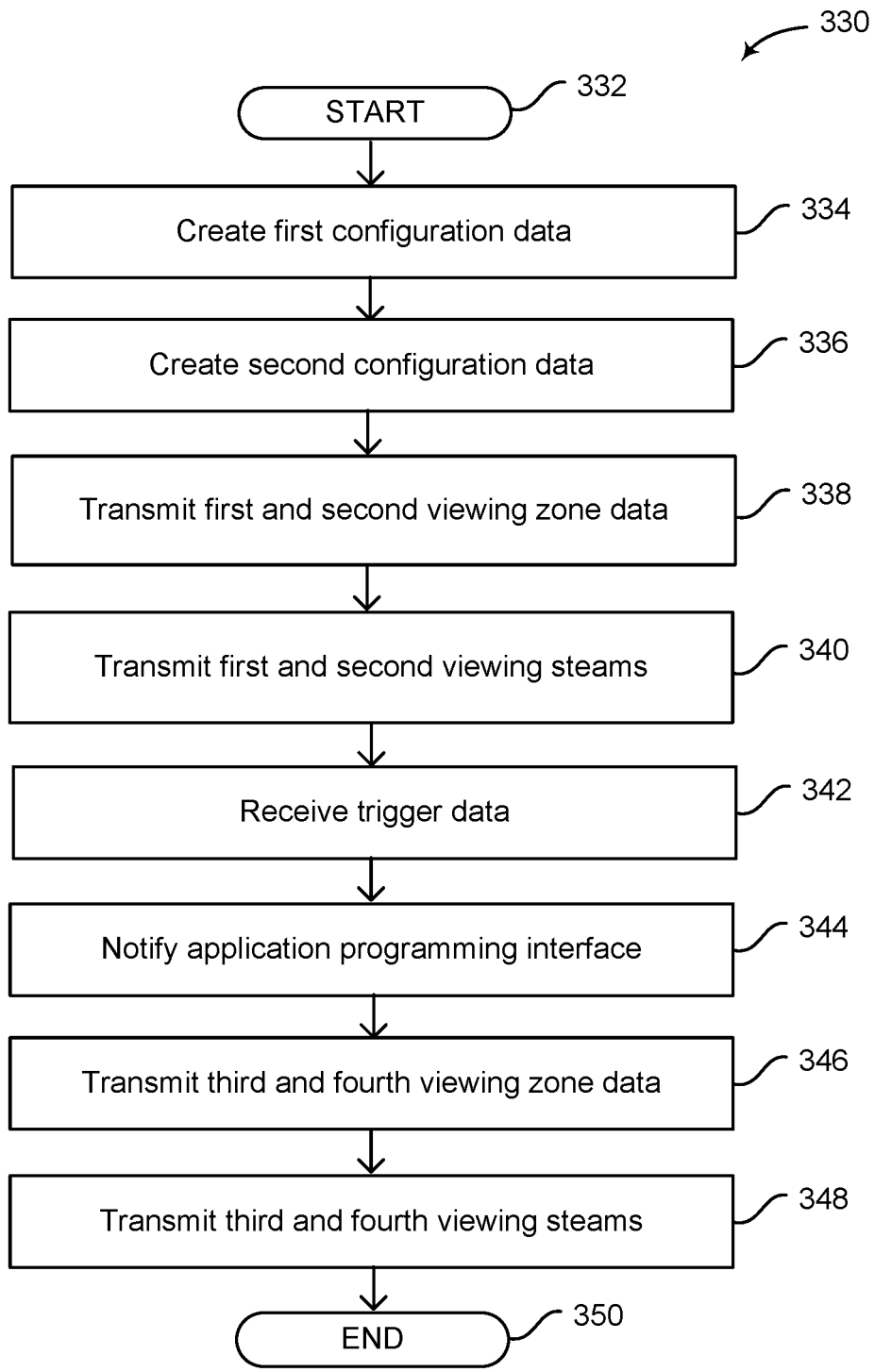
FIG. 20C is a flowchart of a second graphical user interface method according to one or more embodiments of the present disclosure.

FIG. 20C is a flowchart of a second graphical user interface method 330 according to one or more embodiments of the present disclosure. The method 330 begins at 332. For example, a user provides input that causes the host computer 182 to display the graphical user interface 186 on a display device coupled thereto.

At 334, first configuration data is created. For example, a user performs graphical operations using a pointing device (e.g., a mouse) coupled to the host computer 182 to create the viewing zone representation 196a and the viewing zone representation 196b in the viewing zone coordinate system pane 192 of the graphical user interface 186. A memory of the host computer 182 stores software instructions that, when executed by a processor, cause the host computer 182 to generate and store viewing zone data representing boundaries of a first viewing zone and a second viewing zone, in a viewing zone coordinate system, based on data indicating the graphical operations performed by the user.

The user also performs graphical operations using the pointing device and the content assignment pane 192 of the graphical user interface 186 to assign a first content stream to a first content group, and assign a second content stream to a second content group. In addition, the user performs graphical operations using the pointing device to assign a first viewing zone represented by the viewing zone representation 196a to the first content group, and to assign a second viewing zone represented by the viewing zone representation 196b to the second content group.

In one or more embodiments, the memory of the host computer 182 stores software instructions that, when executed by the processor, causes the host computer 182 to generate first configuration data including the viewing zone data representing the boundaries of the first and second viewing zones, data indicating content items that are included in the first content group, data indicating content items that are included in the second content group, data indicating that the first viewing zone is assigned to the first content group, and data indicating that the second viewing zone is assigned to the first content group.

For example, the memory of the host computer 182 stores instructions that, when executed by the processor, cause the host computer 182 to store the first configuration data in a table or other suitable data structure in which data representing coordinates of the boundaries of the first viewing zone are associated with an identifier of the first viewing zone (e.g., "Zone 1"), data representing coordinates of the boundaries of the second viewing zone are associated with an identifier of the second viewing zone (e.g., "Zone 2"), an identifier of a first content stream (e.g. file name 1) is associated with an identifier of the first content group (e.g., "Group 1"), an identifier of a second content stream (e.g. file name 2) is associated with an identifier of the second content group (e.g., "Group 2"), an identifier of the first viewing zone (e.g., "Zone 1") is associated with an identifier of the first content group (e.g., "Group 1"), and an identifier of the second viewing zone (e.g., "Zone 2") is associated with an identifier of the second content group (e.g., "Group 2").

At 336, second configuration data is created. For example, the user performs graphical operations similar to those described above to generate third and fourth viewing zone data, assign a third content stream to a third content group, assign a fourth content stream to a fourth content group, assign the third viewing zone to the third content group, and assign the fourth viewing zone to the fourth content group. The host computer 182 then generates second configuration data including the viewing zone data representing the boundaries of the third and fourth viewing zones, data indicating the contents of the third and fourth content groups, data indicating that the third viewing zone is assigned to the third content group, and data indicating that the fourth viewing zone is assigned to the fourth content group.

At 338, first and second viewing zone data is transmitted. For example, the memory of the host computer 182 stores software instructions that, when executed by the processor, causes the host computer 182 to transmit the first and second viewing zone data identified in the first configuration data to the MV display device 100.

At 340, first and second viewing streams are transmitted. For example, the memory of the host computer 182 stores software instructions that, when executed by the processor, causes the host computer 182 to transmit the first and second viewing streams identified in the first configuration data to the MV display device 100.

The display controller 170 of the MV display device 100 uses the first and second viewing zone data transmitted at 338 and the first and second viewing streams transmitted at 340 to determine which beamlets (or corresponding display pixels) in a coordinate system of the flat panel display 110 to drive such that a viewer in the first viewing zone is able to view the first content stream and a viewer in the second viewing zone is able to view the second content stream.

At 342, trigger data is received. For example, at 342, the host computer 182 receives a signal from a sensor device or a message from a communication device that is located in a room in which the MV display device 100 is located. In one or more embodiments, the host computer 182 receives a message that includes data identifying a particular configuration data. For example, at 342, the host computer 182 receives a message that includes data identifying or associated with the second configuration data (e.g., "Second Configuration").

At 344, an application programming interface is notified. For example, the memory of the host computer 182 stores software instructions that, when executed by the processor, causes the host computer 182 to send a message indicating a change in configuration data, which identifies the second configuration data, to an application programming interface executing on the host computer 182.

At 346, third and fourth viewing zone data are transmitted. For example, the application programming interface executing on the host computer 182 causes the host computer 182 to transmit to the MV viewing device 100 the viewing zone data included in the second configuration data, in response to receiving at 344 the message indicating the change in configuration data, which, for example, identifies the second configuration data or includes an identifier that is associated with an identifier of the second configuration data. In one or more embodiments, the third and fourth viewing zone data are transmitted along with one or more commands that instruct the display controller 170 to stop driving the display sub-pixels of the flat panel display 110 and to delete the viewing zone data that is currently stored in the non-volatile memory 176.

In one or more embodiments, the third and fourth viewing zone data are transmitted along with one or more commands that instruct the display controller 170 to store the third and fourth viewing zone data in the non-volatile memory 176, associate an identifier of the content stream of the third content group with an identifier of the third content group in a table or other suitable data structure stored in the non-volatile memory 176, and associate an identifier of the content stream of the fourth content group with an identifier of the fourth content group in a table or other suitable data structure stored in the non-volatile memory 176.

At 348, third and fourth viewing steams are transmitted. For example, the application programming interface executing on the host computer 182 causes the host computer 182 to transmit at 348 the third and fourth viewing steams identified in the second configuration data, in response to receiving at 344 the message indicating the change in configuration data received at 342.

At 350, the method 330 ends. For example, the display controller 170 of the MV display device 100 converts the coordinates included in the third and fourth viewing zone data transmitted at 346, which are in the viewing zone coordinate system, into corresponding coordinates in the beamlet coordinate system of the flat panel display 110, in order to drive the flat panel display 110 such that a viewer in the third viewing zone is able to view the third content stream and a viewer in the fourth viewing zone is able to view the fourth content stream.

Calibration

The MV display device 100 requires a calibration process. This is because users specify locations in a viewing zone coordinate system, and the MV display device 100 must know what beamlets for each MV pixel 102 to illuminate. If the exact way light bends in each lens, the exact location of each lens in relation to the display sensor (i.e., camera 104), and the exact location of the lens relative to the underlying display panel are known, the calibration process could be theoretically eliminated. In practice, those measurements are difficult to obtain and would be even harder to use in real-time to turn on the correct beamlet for a given viewing zone coordinate.

In various embodiments, a simplified mathematical model is used to approximate what beamlet to turn on for a given viewing zone coordinate. In the worst case, the approximation has an error on the order of a few display pixels between the intended beamlet and an actual beamlet, which is tolerable under normal circumstances. On average, the error is even better at about 0.5 display pixels.

A calibration process determines coefficients and constants in the mathematical model that approximates the projection/mapping of locations in the viewing zone coordinate system to the beamlet coordinate system. To determine the coefficients and constants, the calibration device captures some ground truth mappings between the viewing zone coordinate system and the beamlet coordinate system. The collected data and a non-linear optimizer is used to find the coefficients and constants in the equation. Once the coefficients and constants are obtained, new mappings given a viewing zone coordinate can be efficiently generated.

Physical Setup

Figure 21A:
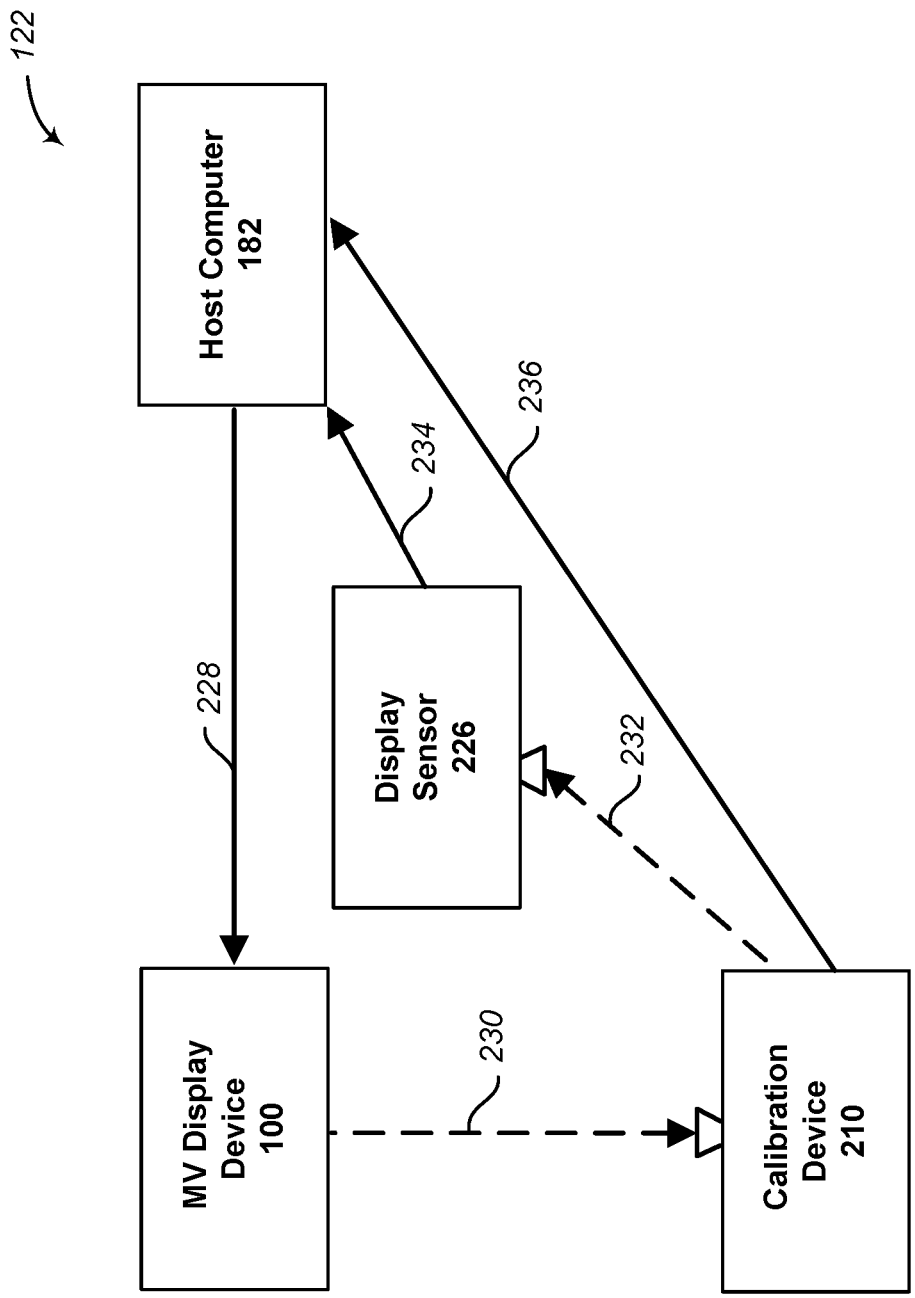
FIG. 21A is a block diagram of a MV display system that performs a calibration procedure.

To collect the ground truth mappings to solve for the coefficients, some hardware is needed. In various embodiments, three devices are used at minimum: a MV display device 100; a display sensor 226 (e.g., camera 104) attached to the MV display device 100 that creates a viewing zone coordinate space (e.g., a camera, a stereo camera, Light Detection and Ranging (LIDAR), time-of-flight camera, line scan camera, etc.); and a camera (the calibration device 210) that can view the MV display device 100, can be moved around the environment, and can be found by the display sensor 226, as shown in FIG. 21A. In FIG. 21A, dotted lines represent data that is "shown" during the calibration procedure, and solid lines represent data that is sent during the calibration procedure.

In one implementation, the calibration device 210 takes the form of a camera with an attached checkerboard and a tablet computer (e.g., including a processor and a memory storing instructions that cause the tablet computer to perform a calibration procedure), and the display sensor 226 is a 2D camera. In an alternative implementation, the calibration device 210 is a camera with an attached infrared (IR) LED and a tablet computer, and the display sensor 226 is an IR sensitive stereo camera. In any case, the calibration device 210 must be able to be found in the viewing zone coordinate system by the display sensor (e.g., camera 104). Some other examples of calibration device/display sensor combinations are: checkerboard/stereo camera, other printed pattern or tag/camera (or stereo camera), visible light LED/camera (or stereo camera), etc. The host computer 182 can be additionally used to control the MV display device 100, and a wireless network allows the calibration device 210 and the host computer 182 to communicate during the calibration procedure. In some embodiments on may use one computer and eliminate the tablet, but that could potentially require that the camera have a cable run to the host computer 182. It is also possible that the display controller 170 could directly interface with the calibration device (camera) 210.

Calibration Procedure

FIG. 21A is a block diagram of a MV display system 122 that performs a calibration procedure according to one or more embodiments of the present disclosure. The MV display system 122 includes a MV display device 100 communicatively coupled to a host computer 182. For example, the MV display device 100 is connected to the host computer 182 via an Ethernet® based local area network. The MV display system 122 also includes a calibration device 210 and a display sensor 226 (e.g., camera 104) that are communicatively coupled to the host computer 182. For example, the calibration device 210 and the host computer 182 are interconnected via an IEEE 802.11n based local area network, and the display sensor 226 (e.g., camera 104) and the host computer 182 are interconnected via Universal Serial Bus.

During the calibration procedure, the host computer 182 transmits display pattern data 228 to the MV display device 100. In response, the MV display device 100 emits light forming display patterns 230 corresponding to the display pattern data 228. The calibration device 210 records which beamlets from the MV display device 100 are received. In the meantime the calibration device 210 includes a checkerboard pattern 232 (e.g., displayable on a screen of the calibration device 210 or printed and attached to the calibration device 210). If the calibration device 210 is within the field of view of the display sensor 226 (i.e., the display sensor 226 can sense or detect the checkerboard pattern 232 of the calibration device 210), the display sensor 226 transmits calibration device location data 234 to the host computer 182. In one or more embodiments, the calibration device location data 234 indicates coordinates of the calibration device 210 in a viewing zone coordinate system that are based on the detected checkerboard pattern 232. The calibration device 210 transmits beamlet coordinate data 236 to the host computer 182, which are stored by the host computer 182. As explained below, the host computer 182 uses the stored calibration device location data 234 and the beamlet coordinate data 236 to calculate calibration parameters (p0, p1, . . . , p15) that are used by the MV display device 100 to transform coordinates in the viewing zone coordinate system to corresponding coordinates in the beamlet (or display pixel) coordinate system of the flat panel display 110, so that the MV display device 100 can present different content to different viewers who are located in different viewing zones.

In one or more embodiments, the calibration device 210 includes a tablet computer having a memory that stores software instructions that, when executed by a processor of the tablet computer, cause the tablet computer to perform aspects of the calibration procedure. In addition, a memory of the host computer 182 stores software instructions that, when executed by a processor of the host computer 182, cause the host computer to perform other aspects of the calibration procedure.

The calibration procedure consists of capturing several mappings per MV pixel between a spatial 1D/2D/3D point in the viewing zone coordinate system and a beamlet in the beamlet coordinate system that, when turned on, illuminates the position of the spatial coordinate in the world. In various embodiments, these captured mappings are spread around the entire area that is to be used for viewing the MV display device 100. To capture these mappings, the MV display system 122 must do two things: find the calibration device 210 in the viewing zone coordinate space and enable the calibration device 210 to record which beamlet is hitting it at its current location.

In various embodiments, the calibration device 210 is found by locating the checkerboard pattern 232 in the feed of the display sensor 226. This gives spatial coordinates in the viewing zone coordinate system, which represent the current location of the calibration device 210 and which are included in the calibration device location data 234. As mentioned earlier, the display sensor 226 (e.g., camera 104) could be a 1D, 2D, or 3D sensor. Each of these has implications on how the MV display device 100 operates. The dimensionality of the display sensor 226 determines the dimensionality of the coordinate space in which the end user can define viewing zones. Thus, if the MV display device 100 is calibrated to a 2D display sensor 226, then viewing zones can only be defined as regions of a 2D surface, and all the locations which the calibration device 210 is placed must be within that 2D surface. A downside to using a display sensor 226 that is 2D or 1D may be that the MV display device 100 will only work well on a corresponding plane or line because the mathematical model assumes a viewer is standing in that plane or line. If the MV display device 100 is small in comparison to the distance of the viewer from the MV display device 100, then the difference between beamlets that hit a viewer on the plane and off the plane is small and can be ignored. However, as the MV display device 100 gets larger (e.g., multiple MV display devices 100 tiled together), a difference between the beamlets for someone standing on the calibrated surface, and someone off of it, might not be as small and lead to only some of the MV pixels appearing to be on for the viewer. To address this issue, in various embodiments, the display sensor 226 may include a 2D camera and it is possible to measure the distance between the calibration device 210 and the display sensor 226. Then, the distance is used as the third coordinate to add an extra dimension, effectively turning the 2D display sensor 226 into a 3D sensor. The user could therefore specify a region of the 2D image and a distance from the camera.

Figure 21B:
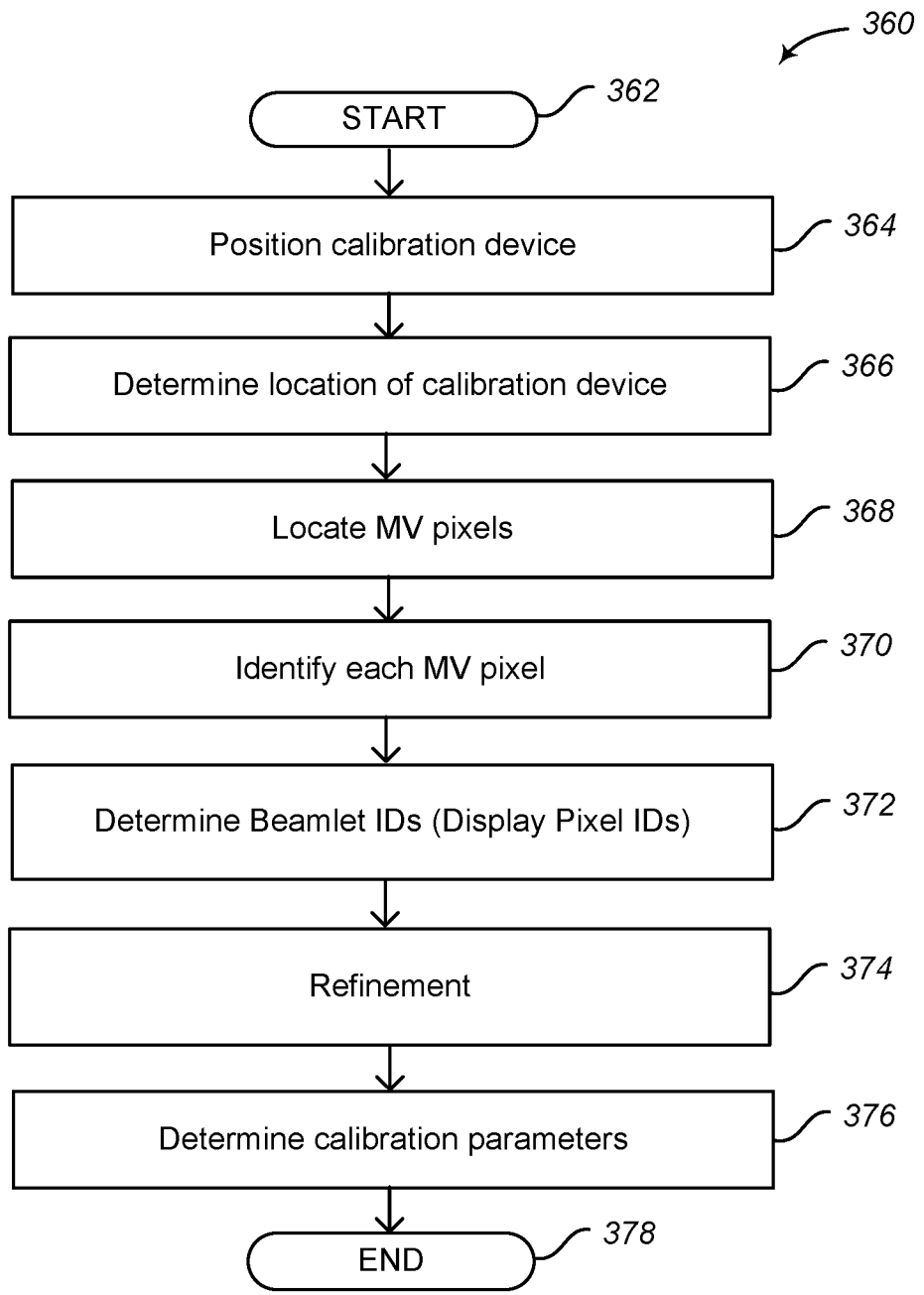
FIG. 21B is a flowchart of a calibration procedure.

FIG. 21B is a flowchart of a calibration procedure 360 according to one or more embodiments of the present disclosure. The calibration procedure 360 begins at 362. For example, a user provides input that causes the host computer 182, the calibration device 210, and the display sensor 226 to execute predetermined software instructions stored in their respective memories.

At 364, the calibration device 210 is positioned within the field of view of the MV display device 100. The calibration device 210 may be located at any point within the viewing zone coordinate system defined by the display sensor 226

At 366, the display sensor 226 determines a location of the calibration device 210. In one or more embodiments, a memory of the display sensor 226 stores instructions that, when executed by a processor, cause the display sensor 226 to capture an image of the checkerboard pattern 232 displayed by the calibration device 210, process corresponding image data, determine coordinates of the calibration device 210 in a viewing zone coordinate system based on the image data, and transmit calibration device location data 234 including the determined coordinates to the host computer 182. In some embodiments, the display sensor 226 sends sensor data to the host computer 182, and the host computer 182 processes the sensor data to determine coordinates of the calibration device 210 in the viewing zone coordinate system.

At 368, the MV pixels 102 of the MV display device 100 are located by the calibration device 210. In one or more embodiments, the host computer 182 generates display pattern data 228 that cause the MV display device 100 to turn all of the MV pixels 102 on, and then turn all of the MV pixels 102 off (see FIGS. 22A and 22B). A camera of the calibration device 210 captures images of the MV display device 100 when all of the MV pixels 102 are on and off. A memory of the calibration device 210 stores software instructions that, when executed by a processor, cause the calibration device 210 to process image data corresponding to the images, compare the image data, and determine locations in the images corresponding to each of the MV pixels 102 based on comparing the image data.

At 370, each of the MV pixels 102 is identified. In one or more embodiments, the host computer 182 generates display pattern data 228 that cause the MV display device 100 to turn each of the MV pixels 102 on and off according to a unique code that is assigned to or associated with each of the MV pixels 102 (see FIGS. 23A-23F). The camera of the calibration device 210 captures images of the MV display device 100 while the MV display device 100 turns each of the MV pixels 102 on and off according to the unique codes. A memory of the calibration device 210 stores software instructions that, when executed by a processor, cause the calibration device 210 to process image data corresponding to the images using the unique codes in order to identify each of the MV pixels 102.

At 372, display pixel IDs (or beamlet IDs) corresponding to the location of the calibration device 210 are determined. In one or more embodiments, the host computer 182 generates display pattern data 228 that cause the MV display device 100 to turn each of the beamlets on and off according to a unique code that is assigned to each of the beamlets. This results in the calibration device 210 seeing MV pixels 102 turn "on" and "off" (see FIGS. 24A-24T) as the beamlet corresponding to the location of the calibration device 210 turns on and off. The calibration device 210 captures images of the MV display device 100 while the MV display device 100 turns each of the beamlets on and off according to the unique codes assigned thereto. A memory of the calibration device 210 stores software instructions that, when executed by a processor, cause the calibration device 210 to process image data corresponding to the images using the unique code assigned to each beamlet to determine display pixel IDs (or beamlet IDs) corresponding to the location of the calibration device 210.

Figures 24A, 24B, 24C, 24D, 24E:
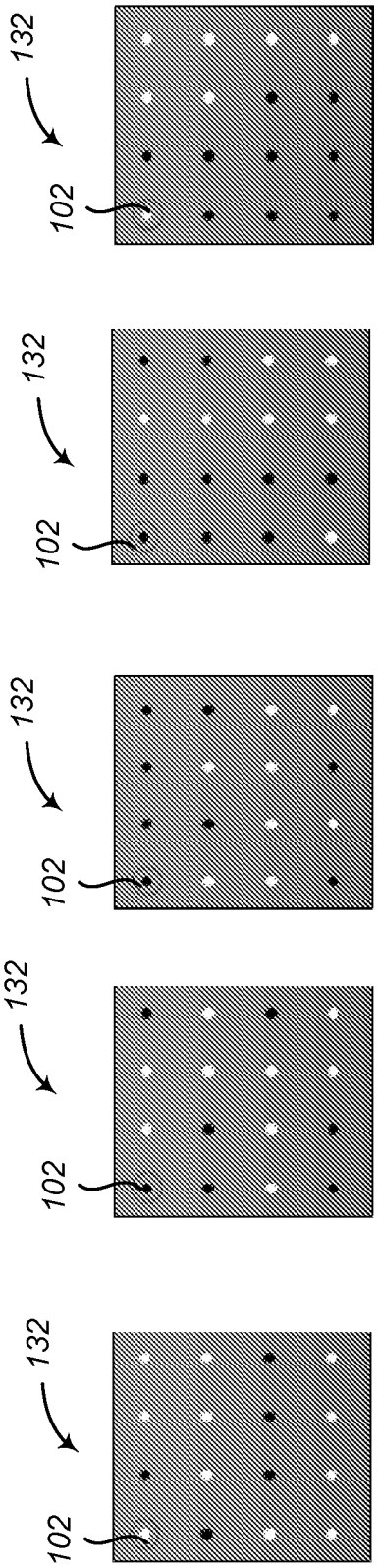
FIGS. 24A-24T are each a front view of a lens assembly during a calibration procedure according to one or more embodiments of the present disclosure.
Figures 24F, 24G, 24H, 24I, 24J:
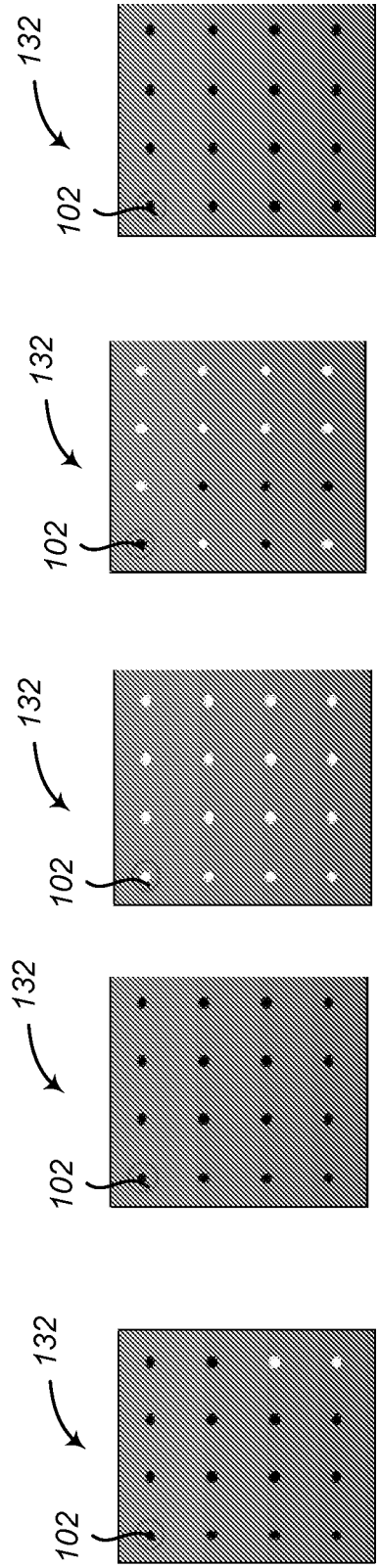
Figure 26:
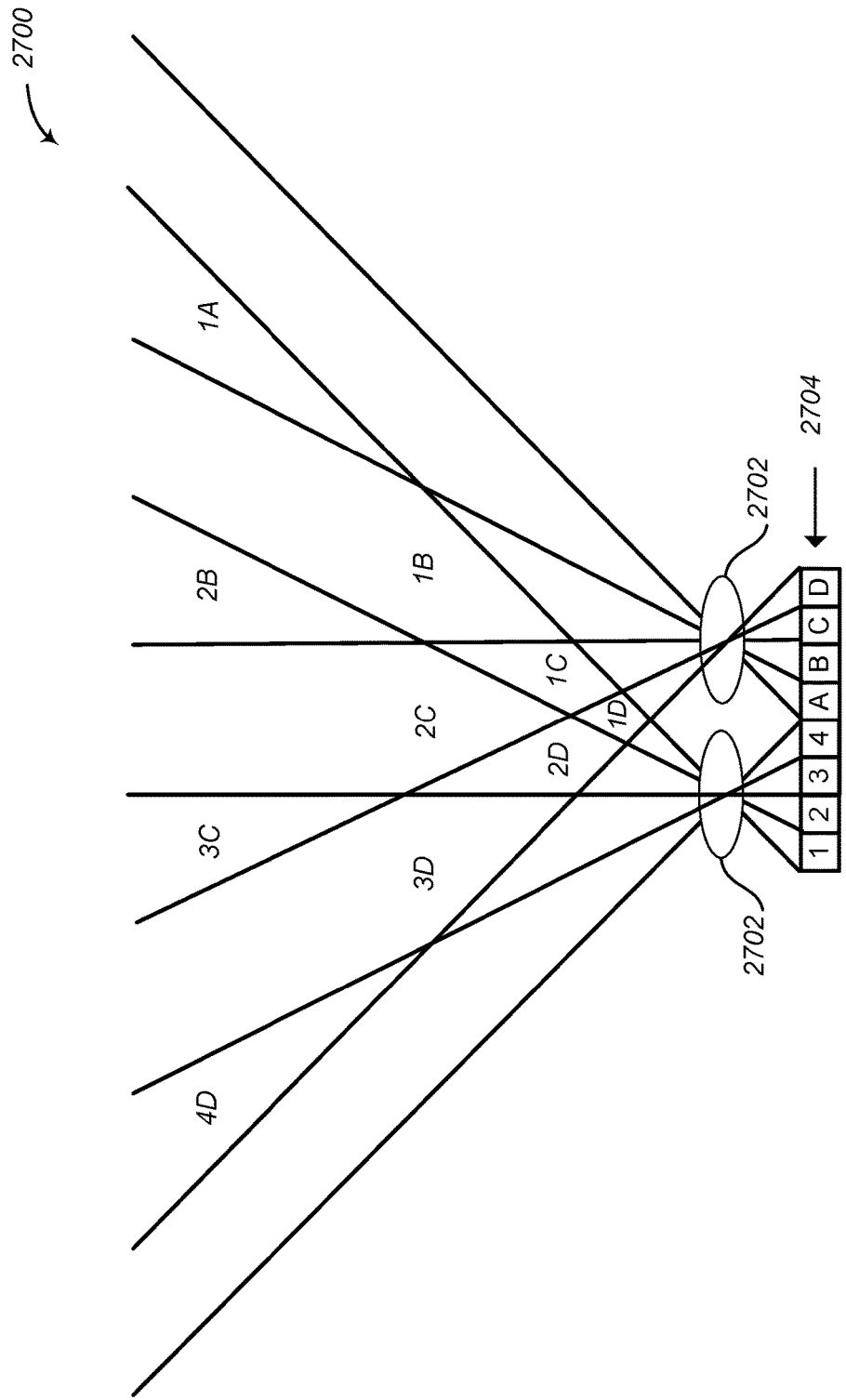
FIG. 26 is a partial view of a conventional lenticular display system.

In this stage of 372 in one embodiment, the purpose is to find which of the ~10,000 beamlets under each MV pixel, for example, the MV display device 100 needs to turn on in order for the MV pixel 102 to appear "on" to the calibration device 210 wherever the calibration device 210 happens to be placed. In the ideal case, the MV pixel 102 will appear "off" when any but one of the beamlets is turned on, but appear "on" when that one (correct) beamlet is turned on. The MV display device 100 displays patterns on the flat panel display 110 that encode an ID for each beamlet. Thus, for a given MV pixel and location in the viewing zone coordinate system, the calibration device 210 would see a pattern as shown in FIGS. 24A-24T.

At 374, a refinement process may be performed, as explained below with reference to FIGS. 25A-25I.

At 376, calibration parameters are determined, as explained below.

Figure 21C:
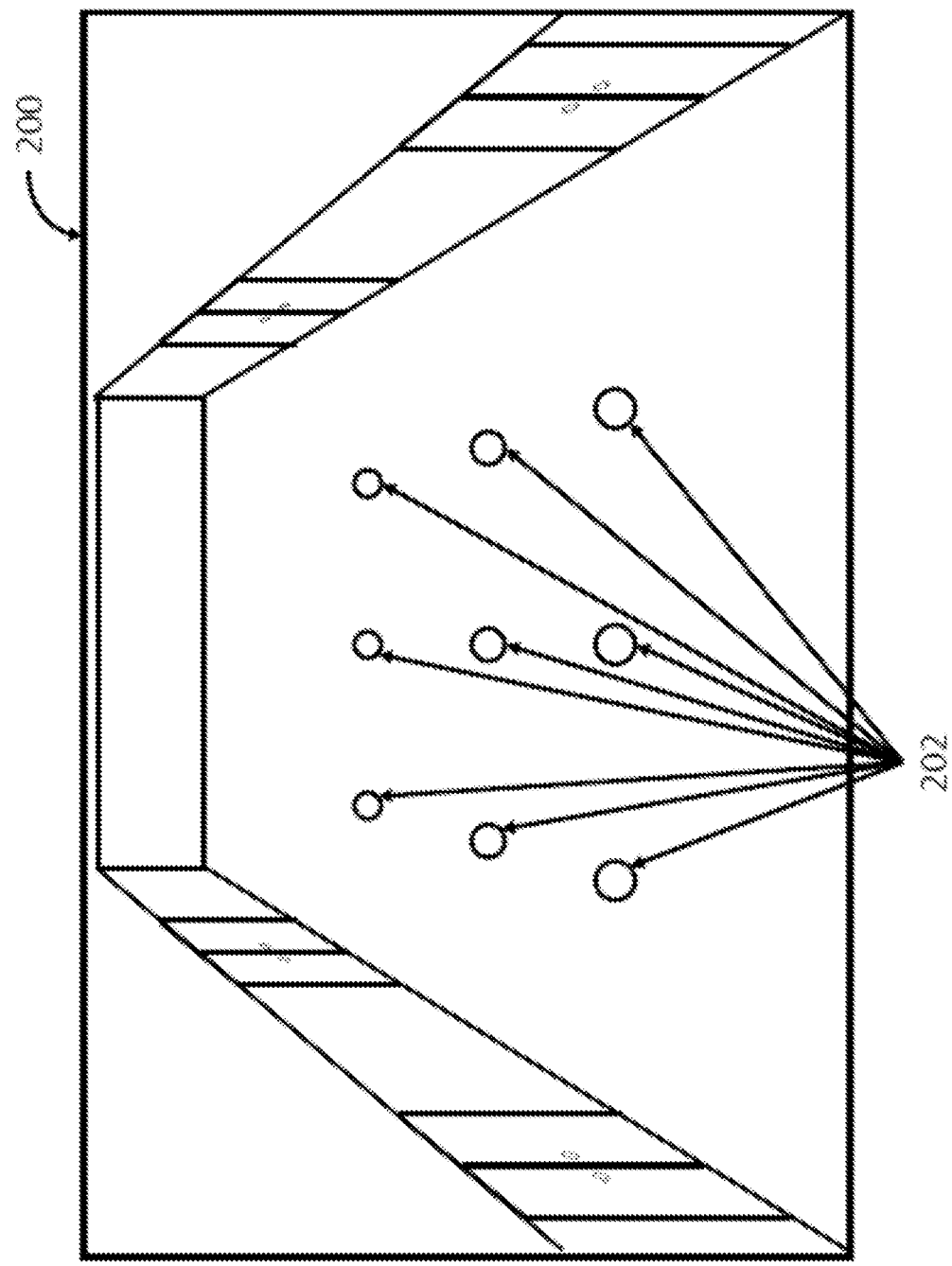
FIG. 21C is an image that may be displayed during the calibration procedure according to one or more embodiments of the present disclosure.

FIG. 21C shows an image 200 that may be displayed during a calibration procedure according to one or more embodiments of the present disclosure. The image 200 corresponds to a room in which the MV display device 100 is to be used. The image 200 includes markers of a plurality of locations 202, at which the display sensor 226 (i.e., a stereo camera 104) has captured the checkerboard pattern 232 of the calibration device 210 within a rendered point 3D point cloud. Various aspects of the calibration procedure 360 are described in greater detail below with reference to FIGS. 22A-25I.

Once the location of the calibration device 210 is found, the MV display system 122 must determine which beamlet of each MV pixel hits the calibration device 210. To accomplish this, the host computer 182 may cause the MV display device 100 to display a series of patterns. Each pattern is used to give a specific piece of information to the calibration device 210. The patterns are listed below in the order of one exemplary embodiment, though other orders can be used.

Calibration Step 1: MV Pixel Locations are Found

Figures 22A, 22B:
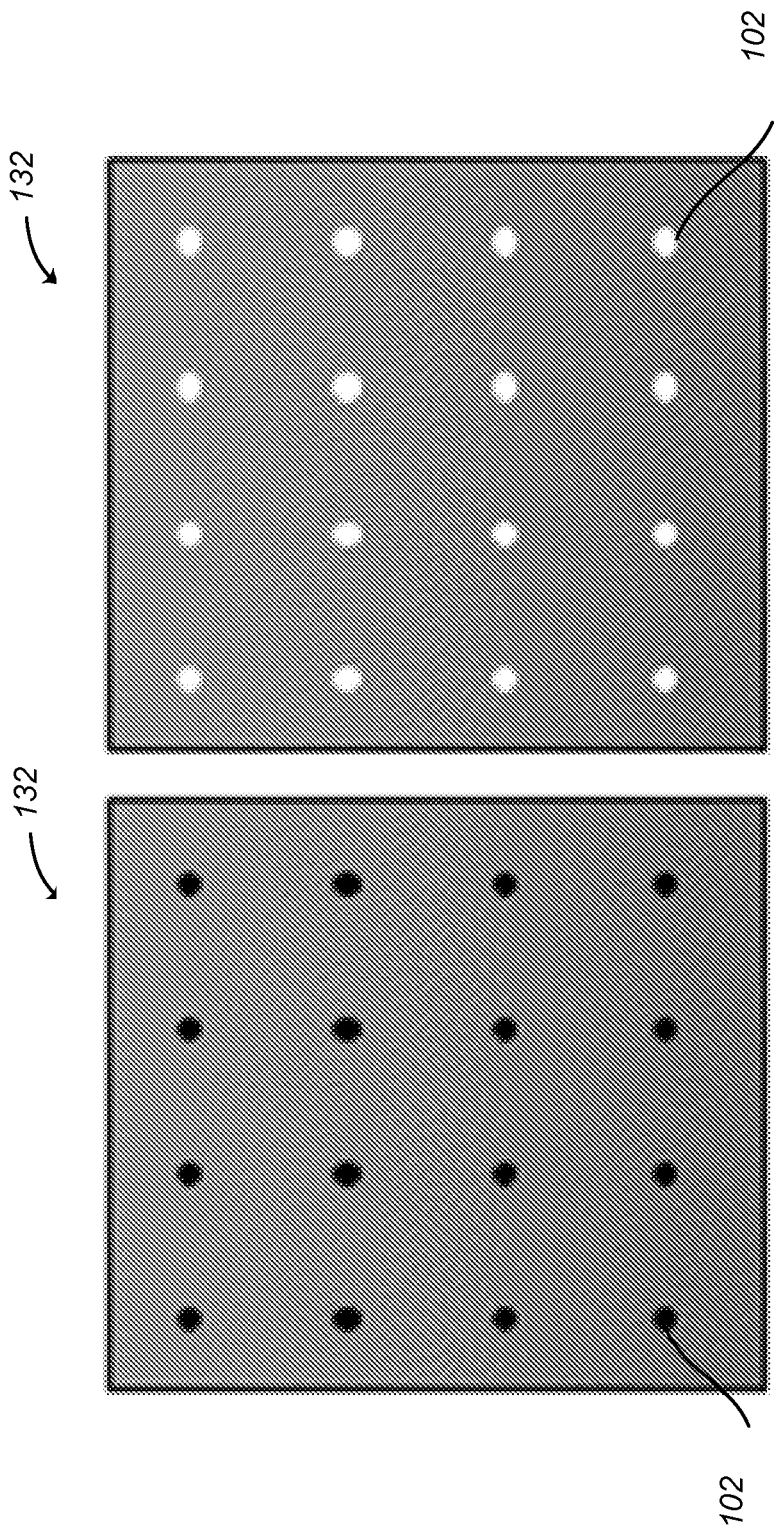
FIGS. 22A and 22B are each a front view of a lens assembly displaying a calibration pattern during a calibration procedure according to one or more embodiments of the present disclosure.

FIGS. 22A and 22B are front views of a MV display device 100, which includes one lens assembly 132 according to embodiments of the present invention. The MV display device 100 in the illustrated example thus includes sixteen (4×4) MV pixels 102. None of the MV pixels 102 are shown illuminated in FIG. 22A; while all of the MV pixels 102 are shown illuminated in FIG. 22B. The MV display device 100 flashes every MV pixel 102 on and off, as shown in FIGS. 21B and 21A, respectively. This enables the calibration device 210 which captures the illumination pattern to determine what regions of the image contain MV pixels 102 and allows for greater error checking.

Calibration Step 2: MV Pixel IDs are Found

Each of FIGS. 23A-23F is a front view of the MV display device 100 including a single lens assembly 132, as in FIGS. 22A and 22B described above. FIGS. 23A-23F represent a series of images that encode the MV pixel ID of each of the MV pixels, wherein the images shown are arranged in little-endian order.

The display pattern data 228 transmitted by the host computer 182 causes the MV display device 100 to display a series of images (patterns) using the MV pixels 102 to the calibration device 210. The images shown in FIGS. 23A-23F encode a specific ID number for each individual MV pixel 102 in the MV display device 100. In various embodiments, the ID is encoded in a binary format to reduce the number of images required to encode all of the MV pixel IDs, though other encoding schemes may also be used. For example, one may use code to encode the MV pixel ID, or use a gray code for that purpose.

In various embodiments, each of FIGS. 23A-23F represents one bit of a number in a binary encoding that represents one MV pixel ID. If a particular MV pixel 102 is off in an image (or pattern), then the image is assigned a 0 for that MV pixel, and if the particular MV pixel 102 is on, then the image (or pattern) is assigned a 1 for that MV pixel. The series of bits is then converted into the corresponding ID number.

For example, the circled MV pixel 102 in FIGS. 23A-23F has a binary encoding of 000111, which is an ID number of 7. 000111 is based on that the circled MV pixel 102 is on (i.e., has been assigned a value of 1) in the first three images of FIGS. 23A-23C ("111" on the right hand side) and is off (i.e., has been assigned a value of 0) in the latter three images of FIGS. 23D-23F ("000" on the left hand side). As another example, the MV pixel to the left of the circled MV pixel has a binary encoding of 000110 (ID number 6), and the MV pixel to the right of the circled MV pixel has a binary encoding of 001000 (ID number 8).

The calibration device 210 captures images corresponding to FIGS. 23A-23F at 370 of a calibration procedure 360. This allows the calibration device 210 to know which region of the image belongs to which MV pixel 102. Since the calibration device 210 knows which regions of the image belong to which MV pixels 102, respectively, mappings can be captured for every MV pixel 102 in the MV display device 100 at once. While this could be done on a per MV display device 100 basis, an exemplary embodiment per perform this across an entire MV display system 122 comprising multiple MV display devices 100. Every MV pixel 102 in the MV display system 122 is assigned its own unique ID.

Calibration Step 3: Display Pixel IDs are Found

FIGS. 24A-24T are front views of a MV display 100 including a lens assembly 132 having sixteen (4×4) MV pixels 102, as in FIGS. 22A-23F above. More particularly, FIGS. 24A-24J are front views of the MV display device 100 during X Gray coding of beamlet IDs (or display pixel IDs), and FIGS. 24K-24T are front views of the MV display device 100 during Y Gray coding of beamlet IDs (or display pixel IDs). The images shown are arranged in little-endian order. The calibration device 210 captures the images of FIGS. 24A-24T at 372 of the calibration procedure 360.

A memory of the calibration device 210 stores software instructions that, when executed by a processor of the calibration device 210, cause the calibration device 210 to process image data corresponding to images of the MV display device 100 shown in FIGS. 24A-24T in order to determine display pixel IDs of beamlets (or beamlet IDs) for each of the MV pixels 102 of the display device 100.

In this phase, one exemplary embodiment uses gray code encoding (though, again, other encodings could be used) to have each beamlet flash a particular sequence that is its unique ID. The ID number is simply the x-beamlet coordinate followed by the y-beamlet coordinate. For a given MV pixel 102, there is one "best" beamlet that best illuminates the location of the calibration device 210. In this phase, it is assumed that if the MV pixel 102 appears off or on (i.e., below or above a threshold brightness value) to the calibration device 210, that means that the "best" beamlet is off or on, and that data is used to decode the ID of that beamlet.

Thus, in FIGS. 24A-24T, the circled MV pixel 102 was read as "on" in x images 0, 4, and 7 and y images 2, 3, 4, 6, and 8. This gives a gray code encoding of 0010010001 (from right to left) for x and 0101011100 (from right to left) for y. To convert these encodings to binary encodings, the memory of the calibration device 210 stores software instructions that, when executed by the processor of the calibration device 210, causes the calibration device 210 to use standard gray code to binary equations (i.e., Equations 6-15) to determine that the representations in binary of the gray code encodings are 0011100001 for x and 0110010111 for y. This equates to an x coordinate of 225 and a y coordinate of 407.

$$\text{Binary}[9] = \text{Graycode}[9] \quad \text{Equation 6}$$

$$\text{Binary}[8] = \text{Binary}[9] \oplus \text{Graycode}[8] \quad \text{Equation 7}$$

$$\text{Binary}[7] = \text{Binary}[8] \oplus \text{Graycode}[7] \quad \text{Equation 8}$$

$$\text{Binary}[6] = \text{Binary}[7] \oplus \text{Graycode}[6] \quad \text{Equation 9}$$

$$\text{Binary}[5] = \text{Binary}[6] \oplus \text{Graycode}[5] \quad \text{Equation 10}$$

$$\text{Binary}[4] = \text{Binary}[5] \oplus \text{Graycode}[4] \quad \text{Equation 11}$$

$$\text{Binary}[3] = \text{Binary}[4] \oplus \text{Graycode}[3] \quad \text{Equation 12}$$

$$\text{Binary}[2] = \text{Binary}[3] \oplus \text{Graycode}[2] \quad \text{Equation 13}$$

$$\text{Binary}[1] = \text{Binary}[2] \oplus \text{Graycode}[1] \quad \text{Equation 14}$$

$$\text{Binary}[0] = \text{Binary}[1] \oplus \text{Graycode}[0] \quad \text{Equation 15}$$

Calibration Step 4: Calibration Refinement

In practice, the calibration device 210 may be between two (or even four) beamlets. This becomes even more likely when there is poor focus of the lenses on the MV display device 100, in which case the calibration device 210 that ideally sees (or identifies) only one beamlet as the "best" beamlet, at 372 of FIG. 21B, may see multiple beamlets. To alleviate this issue, optionally, a "refinement" phase is performed at 374 of the calibration procedure 360.

After the MV pixel locations, MV pixel IDs, and display pixel IDs (or beamlet IDs) have been found at 368, 370, and 372, respectively, as described above, the calibration device 210 has enough information to estimate which beamlet best corresponds to the current location of the calibration device 210. To verify the accuracy of the estimation, in the refinement phase at 374, the calibration device 210 sends the beamlet coordinate data 236 to the host computer 182 (see FIG. 21A), wherein the beamlet coordinate data 236 includes information on the initial estimation of the best beamlet for each MV pixel 102. The host computer 182 then transmits display pattern data 228 that causes the MV display device 100 to turn on, one-by-one, the 9 display pixels around the estimated "best" display pixel (including the estimated "best" display pixel itself).

FIGS. 25A-25I are refinement images according to one or more embodiments of the present disclosure. Each of images included in FIGS. 25A-25I shows one beamlet 216 on a MV pixel 102, which is captured by the calibration device 210. As shown, each MV pixel 102 emits a plurality (e.g., 14×14=196) beamlets from a plurality of display pixels 215 included therein.

The calibration device 210 determines for each MV pixel 102 which of the nine refinement images shown in FIGS. 25A-25I has the highest brightness at the location of the MV pixel 102, which is determined while determining the MV pixel locations and MV pixel IDs, as described above. In other words, the calibration device 210 determines which of the nine beamlets 216 shown in FIGS. 25A-25I is the best. Once the best beamlet 216 is determined, as shown in FIG. 21A, the calibration device 210 sends beamlet coordinate data 236 for each MV pixel 102 back to the host computer 182 for further processing. As described above, in one or more embodiments, each of the beamlets 216 corresponds to one of the display pixels 215, wherein each display pixel 215 consists of a plurality of (e.g., RGB) display sub-pixels 126 (see FIGS. 5A-5C). In the illustrated embodiment, each MV pixel 102 includes 196 (=14×14) display pixels 215, each consisting of a plurality of display sub-pixels 126. Thus, each MV pixel 102 may emit 196 beamlets having different colors/brightness in 196 different directions, respectively, from the 196 display pixels 215.

There are many alternative ways to do refinement as well. For example, while the embodiment illustrated above selects 8 display pixels around the estimated best display pixel, a 25 display pixel region (5×5) centered on the estimated best display pixel instead of the 9 display pixel region (3×3) may also be used. An encoding method to decrease the number of images required for the refinement process may also be used. One such encoding entails showing each row and column in sequence, instead of each display pixel. In the case of the 9 display pixel region (3×3), use of such encoding method will reduce the required number of images from 9 to 6. This method would find which row image is the brightest and which column image is the brightest at the location of the MV pixel. Based on this information, which display pixel is the brightest for the MV pixel (i.e., the display pixel located in the row and the column that are the brightest) can be uniquely determined.

After the calibration procedure, the MV display system 122 knows which beamlet 216 corresponds to the location of the calibration device 210 and what coordinate in the viewing zone coordinate system corresponds to the location of the calibration device 210. In various embodiments, once the calibration procedure (364-374 of FIG. 21B) is run a number of times with the calibration device 210 in a number of different locations (e.g., the minimum is about 11 and the most is near 50) spread around the calibration space, the coefficients and constants of the mathematical model can be estimated at 376. In various embodiments, this is done on the host computer 182 which has all of the viewing zone coordinate/beamlet mappings stored therein. The collected mappings and an objective function, such as the one given by Equations 1-5, with a number of unknown coefficients and constants (e.g., calibration parameters ($p_0, p_1, \ldots, p_{15}$) as in Equations 1-5) can be input into a non-linear solver. The non-linear solver, using the data, attempts to iteratively converge on a "best fit" of the supplied data. One of ordinary skill in the art, in view of the present disclosure, will understand how to apply a non-linear solver to complete this task. Once the coefficients and constants are found, the mathematical model (now with determined coefficients and constants for each MV pixel 102) can take as input a viewing zone coordinate and return the ID of the corresponding beamlet. In various embodiments, this model is sent to the display controller 170 of the MV display device 100 for use in transforming coordinates in the viewing zone coordinate system into corresponding coordinates in the beamlet coordinate system of the flat panel display 110.

Modifications

The calibration procedure described can be a time-intensive procedure and prone to noise. For example, in one implementation, calibrating to a 2D camera may requires the calibration device 210 to always be placed within a 2D plane (though this may not be a strict requirement, as the system could be adapted to allow for any 2D surface). To help alleviate some of these issues, a few changes to the process can be made to improve the results.

For example, inverse patterns may be used. When an encoding pattern is captured (while determining the MV pixel IDs and beamlet (display pixel) IDs, as described above), the inverse of the pattern can be captured as well. In other words, if an MV pixel is "on" in the pattern, then it would be "off" in the inverse image and visa-versa. This allows the MV display system 122 to subtract the image of the inverse of the pattern from the image of the pattern to double the signal-to-noise ratio. This is because when the two images are subtracted, any baseline brightness in the image (i.e., light reflecting off the surface of the MV display device 100) is subtracted, and only the signal from the MV pixel 102 is left.

As another example, aperture adjustment may be used. In order for the calibration procedure to work properly, the calibration device 210 may need to be able to tell the difference between when an MV pixel 102 is "on" and when it is "off". Since "off" may not be a total absence of light (for example light leakage from the backlight can cause an MV pixel to look "on") the calibration device 210 may be adjusted to let in the proper amount of light such that "off" MV pixels are read as off and "on" MV pixels are read as on. In order to accomplish this, the MV display device 100 shows a pattern where half of the MV pixels are on and the other half are off. The user then adjusts the aperture ring on the camera until the off MV pixels appear off in the camera feed.

As yet another example, a calibration robot may be used. Since one implementation of the calibration uses a 2D camera 104 attached to the MV display device 100, it may be efficient to calibrate the MV display device 100 to the camera 104 without having to require a user to move the calibration device 210 relative to the camera 104 of the MV display device 100. The MV display devices 100 may be pre-calibrated. A calibration robot may be used to address these issues. The robot is configured to allow a MV display device 100 and/or the calibration device 210 to be placed in it. The robot then moves the MV display device 100 and the calibration device 210 in an automated fashion to capture mappings based on a supplied list of desired locations to place the calibration device 210. Once the robot finishes capturing mappings, it may calculate the coefficients and constants in the mathematical model and save them for use in subsequent processing.

One way this robot could be built is to leave the MV display device 100 stationary and move the calibration device 210 camera around in the viewing space. This may result in a very large robot that would have to take up much of a room. Instead, a robot could be built such that the calibration device 210 camera stays within a constant line, and the MV display device 100 pans and tilts to simulate the calibration device 210 camera moving around the MV display device 100. The calibration device 210 camera must still move back and forth in a line to ensure that the points captured around the MV display device 100 would be on a plane and not a hemisphere. This way the number of actuators required for the robot to function is decreased. The software driving the robot may use a formula to convert physical locations (i.e., x, y, z offsets from the MV display device 100) supplied to it into pan, tilt, and distance coordinates. This enables the calibration robot to calibrate the MV display device 100 to any set of points.

The robot can be placed in a controlled light environment such that the lights can change for different parts of the calibration process. This may ensure the checkerboard is well illuminated on the calibration device 210 (thus making it easier to see for the display sensor 226) to help reduce the noise in the measurements. The lights can be turned off for the part of the calibration process where the calibration device 210 captures the patterns, reducing reflected light on the MV display device 100.

For individual MV display devices 100 with an attached camera 104, the MV display devices 100 can be fully calibrated before it is installed. This is generally true with the MV display device 100 that is relatively small and the camera 104 that cannot move in relation to any of the MV pixels. If multiple MV display devices 100 are used, though, it may be difficult to fully pre-calibrate the MV display devices 100, as the exact location of each MV display device 100 in relation to the display sensor 104 may not be known ahead of time (e.g., before the MV display devices 100 are tiled together). In various embodiments, the robot can be used to partially calibrate a MV display device 100 before finishing its calibration in the field. The calibration robot may determine the intrinsic properties of the MV display device 100, and determine the extrinsic properties in the field. For example, in various embodiments, the radial distortion coefficients and the lens center constants (i.e., which display pixel the lens (lens system) is over) are calibrated with the calibration robot, since these do not change no matter where the MV display device 100 is placed or how it is oriented in relation to the display sensor 104. A fractional linear projective equation is then calibrated in the field that accounts for the location of the lens (lens system) in relation to the display camera 104. Since some of the coefficients and constants are pre-calibrated, there are fewer degrees of freedom that the solver has in determining the remaining coefficients. This allows the capture of fewer points than if performing the entire calibration in the field. Once the fractional linear projective equation coefficients are obtained, they can be combined with the pre-calibrated coefficients to get a full set of coefficients to be used in the mathematical model.

The various embodiments described above can be combined to provide further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of calibrating a multi-view (MV) display device, wherein the MV display device includes one or more MV pixels each including a plurality of display pixels that emit a plurality of beamlets in a plurality of directions, respectively, the MV display device capable of forming different images visible in different viewing zones located relative to the MV display device, the method comprising:
  a) receiving a location of a calibration device in a viewing zone coordinate system in which the different viewing zones are located relative to the MV display device;
  b) determining locations of the MV pixels of the MV display device in one or more images of the MV display device based on image data generated by a camera of the calibration device while the MV display device is in a field of view of the camera of the calibration device;
  c) tagging each of the locations of the MV pixels in the one or more images of the MV display device with an ID of the corresponding MV pixel determined in step b);
  d) per each MV pixel, identifying one of the plurality of display pixels that emits a beamlet to illuminate the location of the calibration device in the viewing zone coordinate system;
  e) repeating steps a)-d) a number of times for a number of locations in the viewing zone coordinate system; and
  f) determining calibration parameters for a mapping that translates between the viewing zone coordinate system and a beamlet coordinate system.

2. The method of claim 1, wherein step d) includes, after identifying one of the plurality of display pixels that emits the beamlet to illuminate the location per each MV pixel, verifying whether the display pixel is the best for the MV pixel by comparing the display pixel with display pixels that surround the display pixel.

3. The method of claim 1, wherein at least one of step c) and step d) includes use of a pattern of the MV pixels and an inverse pattern of said pattern.

4. The method of claim 1, comprising:
  placing the MV display device in a calibration robot; and
  operating the robot to perform steps a) through f).

5. A method in a system including a host computer, a calibration device, a sensor device, and a multi-view (MV) display device configured to project a plurality of images to a plurality of viewing zones located relative to the MV display device, the method comprising:
  transmitting, by the host computer, display pattern data;
  receiving, by the MV display device, the display pattern data;
  emitting, by the MV display device, light forming one or more display patterns corresponding to the display pattern data;
  recording, by the calibration device, data corresponding to a plurality of beamlets received from the MV display device during the emitting of the light forming the one or more display patterns corresponding to the display pattern data;
  detecting, by the sensor device, a location of the calibration device in a viewing zone coordinate system while the calibration device is within a field of view of the sensor device;
  transmitting, by the sensor device, calibration data indicating the location of the calibration device in the viewing zone coordinate system based on the detecting;
  transmitting, by the calibration device, beamlet coordinate data, in a beamlet coordinate system;
  receiving, by the host computer, the beamlet coordinate data, in the beamlet coordinate system;
  determining, by the host computer, a plurality of calibration parameters using data indicating a plurality of locations of the calibration device and the beamlet coordinate data;
  transmitting, by the host computer, the plurality of calibration parameters;
  receiving, by the MV display device, the plurality of calibration parameters;
  transforming, by the MV display device, a plurality of coordinates in the viewing zone coordinate system to a plurality of coordinates in the beamlet coordinate system based on the plurality of calibration parameters;
  presenting, by the MV display device, first content to a first viewer located in a first one of the viewing zones and second content to a second viewer located in a second one of the viewing zones based on the plurality of coordinates in the beamlet coordinate system.

6. The method of claim 5, wherein the calibration data indicates a plurality of coordinates of the calibration device, in the viewing zone coordinate system.

7. The method of claim 5, wherein the one or more display patterns include a checkerboard pattern.

8. The method of claim 5, wherein the sensor device performs sensing in one dimension.

9. The method of claim 5, wherein the sensor device performs sensing in two dimensions.

10. The method of claim 5, wherein the sensor device performs sensing in three dimensions.

11. The method of claim 5, wherein the calibration device is a tablet computer.

12. A method in a system including a host computer, a calibration device, a sensor device, and a multi-view (MV) display device including a plurality of MV pixels each including a plurality of display pixels that emit a plurality of beamlets in a plurality of directions, wherein the MV display device is configured to project a plurality of images to a plurality of viewing zones located relative to the MV display device, the method comprising:
  determining, by the sensor device, a location of the calibration device in a viewing zone coordinate system while the calibration device is within a field of view of the sensor device;
  transmitting, by the sensor device, data indicating the location of the calibration device;
  receiving, by the host computer, the data indicating the location of the calibration device;
  locating, by the calibration device, a plurality of MV pixels of the MV display device in one or more images of the MV display device based on image data generated by a camera of the calibration device while the MV display device is in a field of view of the camera of the calibration device;
  identifying, by the host computer, each of the MV pixels of the MV display device in the one or more images of the MV display device;
  determining, by the host computer, a plurality of identifiers of the display pixels corresponding to the location of the calibration device; and
  determining, by the host computer, a plurality of calibration parameters based on the location of the calibration device and the MV pixels of the MV display device.

13. The method of claim 12, comprising:
transmitting, by the host computer, the plurality of calibration parameters;
receiving, by the MV display device, the plurality of calibration parameters;
transforming, by the MV display device, a plurality of coordinates in the viewing zone coordinate system to a plurality of coordinates in the beamlet coordinate system based on the plurality of calibration parameters;
presenting, by the MV display device, first content to a first viewer located in a first one of the viewing zones and second content to a second viewer located in a second one of the viewing zones based on the plurality of coordinates in the beamlet coordinate system.

14. The method of claim 12, comprising:
capturing, by the sensor device, image data corresponding to an image of a pattern displayed by the calibration device,
wherein the determining of the location of the calibration device is based on the image data.

15. The method of claim 14, wherein the pattern displayed by the calibration device is a checkerboard pattern.

16. The method of claim 12, comprising:
positioning the calibration device at the location.

17. The method of claim 12, comprising:
generating, by the host computer, first display pattern data that cause the MV display device to turn all of the MV pixels on;
generating, by the host computer, second display pattern data that cause the MV display device to turn all of the MV pixels off;
transmitting, by the host computer, the first display pattern and the second display pattern;
capturing, by the camera of the calibration device, first image data corresponding to a first image of the MV display device while the MV display device turns all of the MV pixels on; and
capturing, by the camera of the calibration device, second image data corresponding to a second image of the MV display device while the MV display device turns all of the MV pixels off,
wherein the locating of the MV pixels of the MV display device is based on the first image data and the second image data.

18. The method of claim 12, comprising:
generating, by the host computer, display pattern data that cause the MV display device to turn each of the MV pixels on and off according to a unique code that is assigned to or associated with each of the MV pixels; and
capturing, by the camera of the calibration device, image data corresponding to a plurality of images of the MV display device while the MV display device turns each of the MV pixels on and off according to the unique code that is assigned to or associated with each of the MV pixels,
wherein the identifying of each of the MV pixels of the MV display device is based on the image data.

19. The method of claim 12, comprising:
generating, by the host computer, display pattern data that cause the MV display device to turn each of a plurality of beamlets on and off according to a unique code that is assigned to or associated with each of the beamlets; and
capturing, by the camera of the calibration device, image data corresponding to a plurality of images of the MV display device while the MV display device turns each of the MV pixels on and off according to the unique code that is assigned to or associated with each of the MV pixels,
wherein the determining of the display pixel identifiers corresponding to the location of the calibration device is based on the image data.

20. The method of claim 12, wherein each of the MV pixels comprises a plurality of display pixels controllable to emits a plurality beamlets, and the method further comprises:
capturing, by the camera of the calibration device, image data corresponding to a plurality of images of the MV display device, one of the display pixels comprising one of the MV pixels being turned on in each of the images;
determining, by the calibration device, one of the images having a highest brightness among the plurality of images for each of the MV pixels based on the image data; and determining, by the calibration device, a beamlet for each of the MV pixels based on the one of the images having the highest brightness among the plurality of images for each of the MV pixels based on the image data; and
transmitting, by the calibration device, data indicating a coordinate of each beamlet for each of the MV pixels.

\* \* \* \* \*